(12) United States Patent
Rosenstein et al.

(10) Patent No.: US 8,935,005 B2
(45) Date of Patent: Jan. 13, 2015

(54) OPERATING A MOBILE ROBOT

(75) Inventors: Michael Rosenstein, S. Hadley, MA (US); Steven V. Shamlian, Bedford, MA (US); Chikyung Won, Tewksbury, MA (US); Michael Halloran, Waltham, MA (US); Mark Chiappetta, Chelmsford, MA (US); Thomas P. Allen, Reading, MA (US)

(73) Assignee: iRobot Corporation, Bedford, MA (US)

( * ) Notice: Subject to any disclaimer, the term of this patent is extended or adjusted under 35 U.S.C. 154(b) by 685 days.

(21) Appl. No.: 13/032,390

(22) Filed: Feb. 22, 2011

(65) Prior Publication Data

US 2012/0185096 A1 Jul. 19, 2012

Related U.S. Application Data

(60) Provisional application No. 61/346,612, filed on May 20, 2010, provisional application No. 61/356,910, filed on Jun. 21, 2010, provisional application No. 61/428,717, filed on Dec. 30, 2010, provisional (Continued)

(51) Int. Cl.
*G06F 19/00* (2011.01)
*G05B 15/00* (2006.01)

(Continued)

(52) U.S. Cl.
CPC .............. *B25J 5/007* (2013.01); *B25J 11/009* (2013.01); *G05D 1/0246* (2013.01); *G05D 1/0272* (2013.01); *G05D 1/0274* (2013.01); *G05D 1/0227* (2013.01); *G05D 1/024* (2013.01);

(Continued)

(58) Field of Classification Search
USPC ....................... 700/245, 259; 901/1
See application file for complete search history.

(56) References Cited

U.S. PATENT DOCUMENTS 4,413,693 A 11/1983 Derby
4,638,445 A 1/1987 Mattaboni (Continued)

FOREIGN PATENT DOCUMENTS

CA 2289697 A1 11/1998
CN 101866396 10/2010

(Continued)

OTHER PUBLICATIONS

International Search Report for Application No. PCT/US2011/060935 Dated May 27, 2013.

(Continued)

*Primary Examiner* — Khoi Tran
*Assistant Examiner* — Robert Nguyen
(74) *Attorney, Agent, or Firm* — Honigman Miller Schwartz and Cohn LLP

(57) ABSTRACT

A method of operating a mobile robot to traverse a threshold includes detecting a threshold proximate the robot. The robot includes a holonomic drive system having first, second, and third drive elements configured to maneuver the robot omni-directionally. The method further includes moving the first drive element onto the threshold from a first side and moving the second drive element onto the threshold to place both the first and second drive elements on the threshold. The method includes moving the first drive element off a second side of the threshold, opposite to the first side of the threshold, and moving the third drive element onto the threshold, placing both the second and third drive elements on the threshold. The method includes moving both the second and third drive elements off the second side of the threshold.

34 Claims, 40 Drawing Sheets

Related U.S. Application Data application No. 61/428,734, filed on Dec. 30, 2010, provisional application No. 61/428,759, filed on Dec. 30, 2010, provisional application No. 61/429,863, filed on Jan. 5, 2011.

(51) Int. Cl.
*G05B 19/00* (2006.01)
*B25J 5/00* (2006.01)
*B25J 11/00* (2006.01)
*G05D 1/02* (2006.01)

(52) U.S. Cl.
CPC ............ *G05D1/0242* (2013.01); *G05D 1/0255* (2013.01); *G05D 1/027* (2013.01); *G05D 2201/0206* (2013.01); *Y10S 901/01* (2013.01)
USPC .............................. 700/259; 700/245; 901/1

(56) References Cited

U.S. PATENT DOCUMENTS

| | | | |
|---|---|---|---|
| 4,657,104 A * | 4/1987 | Holland | 180/211 |
| 4,669,168 A | 6/1987 | Tamura et al. | |
| 4,697,472 A | 10/1987 | Hiyane | |
| 4,709,265 A | 11/1987 | Silverman et al. | |
| 4,751,658 A | 6/1988 | Kadonoff et al. | |
| 4,777,416 A | 10/1988 | George, II et al. | |
| 4,797,557 A | 1/1989 | Ohman | |
| 4,803,625 A | 2/1989 | Fu et al. | |
| 4,847,764 A | 7/1989 | Halvorson | |
| 4,875,172 A | 10/1989 | Kanayama | |
| 4,942,538 A | 7/1990 | Yuan et al. | |
| 4,953,159 A | 8/1990 | Hayden et al. | |
| 4,974,607 A | 12/1990 | Miwa | |
| 4,977,971 A | 12/1990 | Crane, III et al. | |
| 5,006,988 A | 4/1991 | Borenstein et al. | |
| 5,040,116 A | 8/1991 | Evans, Jr. et al. | |
| 5,051,906 A | 9/1991 | Evans, Jr. et al. | |
| 5,073,749 A | 12/1991 | Kanayama | |
| 5,084,828 A | 1/1992 | Kaufman et al. | |
| 5,130,794 A | 7/1992 | Ritchey | |
| 5,148,591 A | 9/1992 | Pryor | |
| 5,153,833 A | 10/1992 | Gordon et al. | |
| 5,155,684 A | 10/1992 | Burke et al. | |
| 5,157,491 A | 10/1992 | Kassatly | |
| 5,193,143 A | 3/1993 | Kaemmerer et al. | |
| 5,217,453 A | 6/1993 | Wilk | |
| 5,224,157 A | 6/1993 | Yamada et al. | |
| 5,231,693 A | 7/1993 | Backes et al. | |
| 5,236,432 A | 8/1993 | Matsen, III et al. | |
| 5,315,287 A | 5/1994 | Sol | |
| 5,319,611 A | 6/1994 | Korba | |
| 5,341,242 A | 8/1994 | Gilboa et al. | |
| 5,341,459 A | 8/1994 | Backes | |
| 5,350,033 A * | 9/1994 | Kraft | 180/167 |
| 5,366,896 A | 11/1994 | Margrey et al. | |
| 5,372,211 A | 12/1994 | Wilcox et al. | |
| 5,374,879 A | 12/1994 | Pin et al. | |
| 5,417,210 A | 5/1995 | Funda et al. | |
| 5,436,542 A | 7/1995 | Petelin et al. | |
| 5,441,047 A | 8/1995 | David et al. | |
| 5,442,728 A | 8/1995 | Kaufman et al. | |
| 5,462,051 A | 10/1995 | Oka et al. | |
| 5,539,741 A | 7/1996 | Barraclough et al. | |
| 5,544,649 A | 8/1996 | David et al. | |
| 5,553,609 A | 9/1996 | Chen et al. | |
| 5,572,229 A | 11/1996 | Fisher | |
| 5,572,999 A | 11/1996 | Funda et al. | |
| 5,594,859 A | 1/1997 | Palmer et al. | |
| 5,636,218 A | 6/1997 | Ishikawa et al. | |
| 5,652,849 A | 7/1997 | Conway et al. | |
| 5,682,199 A | 10/1997 | Lankford | |
| 5,684,695 A | 11/1997 | Bauer | |
| 5,701,904 A | 12/1997 | Simmons et al. | |
| 5,739,657 A | 4/1998 | Takayama et al. | |
| 5,749,058 A | 5/1998 | Hashimoto | |
| 5,749,362 A | 5/1998 | Funda et al. | |
| 5,762,458 A | 6/1998 | Wang et al. | |
| 5,767,897 A | 6/1998 | Howell | |
| 5,786,846 A | 7/1998 | Hiroaki | |
| 5,802,494 A | 9/1998 | Kuno | |
| 5,836,872 A | 11/1998 | Kenet et al. | |
| 5,867,653 A | 2/1999 | Aras et al. | |
| 5,876,325 A | 3/1999 | Mizuno et al. | |
| 5,911,036 A | 6/1999 | Wright et al. | |
| 5,917,958 A | 6/1999 | Nunally et al. | |
| 5,927,423 A | 7/1999 | Wada et al. | |
| 5,949,758 A | 9/1999 | Kober | |
| 5,954,692 A | 9/1999 | Smith et al. | |
| 5,959,423 A | 9/1999 | Nakanishi et al. | |
| 5,966,130 A | 10/1999 | Benman, Jr. | |
| 5,974,446 A | 10/1999 | Sonnenreich et al. | |
| 6,133,944 A | 10/2000 | Braun et al. | |
| 6,135,228 A | 10/2000 | Asada et al. | |
| 6,148,100 A | 11/2000 | Anderson et al. | |
| 6,170,929 B1 | 1/2001 | Wilson et al. | |
| 6,175,779 B1 | 1/2001 | Barrett | |
| 6,201,984 B1 | 3/2001 | Funda et al. | |
| 6,211,903 B1 | 4/2001 | Bullister | |
| 6,219,587 B1 | 4/2001 | Ahlin et al. | |
| 6,232,735 B1 | 5/2001 | Baba et al. | |
| 6,233,504 B1 | 5/2001 | Das et al. | |
| 6,256,556 B1 | 7/2001 | Zenke | |
| 6,259,806 B1 | 7/2001 | Green | |
| 6,259,956 B1 | 7/2001 | Myers et al. | |
| 6,266,162 B1 | 7/2001 | Okamura et al. | |
| 6,266,577 B1 | 7/2001 | Popp et al. | |
| 6,289,263 B1 | 9/2001 | Mukherjee | |
| 6,292,713 B1 | 9/2001 | Jouppi et al. | |
| 6,304,050 B1 | 10/2001 | Skaar et al. | |
| 6,321,137 B1 | 11/2001 | De Smet | |
| 6,323,942 B1 | 11/2001 | Bamji | |
| 6,325,756 B1 | 12/2001 | Webb et al. | |
| 6,327,516 B1 | 12/2001 | Zenke | |
| 6,330,486 B1 | 12/2001 | Padula | |
| 6,330,493 B1 | 12/2001 | Takahashi et al. | |
| 6,346,950 B1 | 2/2002 | Jouppi | |
| 6,346,962 B1 | 2/2002 | Goodridge | |
| 6,369,847 B1 | 4/2002 | James et al. | |
| 6,408,230 B2 | 6/2002 | Wada | |
| 6,430,471 B1 | 8/2002 | Kintou et al. | |
| 6,430,475 B2 | 8/2002 | Okamoto et al. | |
| 6,438,457 B1 | 8/2002 | Yokoo et al. | |
| 6,452,915 B1 | 9/2002 | Jorgensen | |
| 6,463,352 B1 | 10/2002 | Tadokoro et al. | |
| 6,463,361 B1 | 10/2002 | Wang et al. | |
| 6,466,844 B1 | 10/2002 | Ikeda et al. | |
| 6,468,265 B1 | 10/2002 | Evans et al. | |
| 6,491,701 B2 | 12/2002 | Tierney et al. | |
| 6,496,099 B2 | 12/2002 | Wang et al. | |
| 6,496,755 B2 | 12/2002 | Wallach et al. | |
| 6,501,740 B1 | 12/2002 | Sun et al. | |
| 6,507,773 B2 | 1/2003 | Parker et al. | |
| 6,515,740 B2 | 2/2003 | Bamji et al. | |
| 6,522,906 B1 | 2/2003 | Salisbury, Jr. et al. | |
| 6,523,629 B1 | 2/2003 | Buttz et al. | |
| 6,526,332 B2 | 2/2003 | Sakamoto et al. | |
| 6,529,765 B1 | 3/2003 | Franck et al. | |
| 6,529,802 B1 | 3/2003 | Kawakita et al. | |
| 6,532,404 B2 | 3/2003 | Colens | |
| 6,535,182 B2 | 3/2003 | Stanton | |
| 6,535,793 B2 | 3/2003 | Allard | |
| 6,540,039 B1 | 4/2003 | Yu et al. | |
| 6,543,899 B2 | 4/2003 | Covannon et al. | |
| 6,549,215 B2 | 4/2003 | Jouppi | |
| 6,563,533 B1 | 5/2003 | Colby | |
| 6,580,246 B2 | 6/2003 | Jacobs | |
| 6,584,376 B1 | 6/2003 | Van Kommer | |
| 6,604,019 B2 | 8/2003 | Ahlin et al. | |
| 6,604,021 B2 | 8/2003 | Imai et al. | |
| 6,611,120 B2 | 8/2003 | Song et al. | |
| 6,646,677 B2 | 11/2003 | Noro et al. | |
| 6,648,722 B2 * | 11/2003 | Lynders et al. | 446/437 |
| 6,650,748 B1 | 11/2003 | Edwards et al. | |

(56) References Cited

U.S. PATENT DOCUMENTS

| | | |
|---|---|---|
| 6,684,129 B2 | 1/2004 | Salisbury, Jr. et al. |
| 6,691,000 B2 | 2/2004 | Nagai et al. |
| 6,710,797 B1 | 3/2004 | McNelley et al. |
| 6,728,599 B2 | 4/2004 | Wang et al. |
| 6,764,373 B1 | 7/2004 | Osawa et al. |
| 6,769,771 B2 | 8/2004 | Trumbull |
| 6,781,606 B2 | 8/2004 | Jouppi |
| 6,784,916 B2 | 8/2004 | Smith |
| 6,785,589 B2 | 8/2004 | Eggenberger et al. |
| 6,791,550 B2 | 9/2004 | Goldhor et al. |
| 6,799,065 B1 | 9/2004 | Niemeyer |
| 6,799,088 B2 | 9/2004 | Wang et al. |
| 6,804,580 B1 | 10/2004 | Stoddard et al. |
| 6,804,656 B1 | 10/2004 | Rosenfeld et al. |
| 6,810,411 B1 | 10/2004 | Coughlin et al. |
| 6,836,703 B2 | 12/2004 | Wang et al. |
| 6,839,612 B2 | 1/2005 | Sanchez et al. |
| 6,840,904 B2 | 1/2005 | Goldberg |
| 6,845,297 B2 | 1/2005 | Allard |
| 6,852,107 B2 | 2/2005 | Wang et al. |
| 6,853,878 B2 | 2/2005 | Hirayama et al. |
| 6,853,880 B2 | 2/2005 | Sakagami et al. |
| 6,871,117 B2 | 3/2005 | Wang et al. |
| 6,879,879 B2 | 4/2005 | Jouppi et al. |
| 6,892,112 B2 | 5/2005 | Wang et al. |
| 6,895,305 B2 | 5/2005 | Lathan et al. |
| 6,914,622 B1 | 7/2005 | Smith et al. |
| 6,925,357 B2 | 8/2005 | Wang et al. |
| 6,951,535 B2 | 10/2005 | Ghodoussi et al. |
| 6,958,706 B2 | 10/2005 | Chaco et al. |
| 6,965,394 B2 | 11/2005 | Gutta et al. |
| 6,995,664 B1 | 2/2006 | Darling |
| 7,030,757 B2 | 4/2006 | Matsuhira et al. |
| 7,092,001 B2 | 8/2006 | Schulz |
| 7,096,090 B1 | 8/2006 | Zweig |
| 7,115,102 B2 | 10/2006 | Abbruscato |
| 7,115,849 B2 | 10/2006 | Dowski, Jr. et al. |
| 7,117,067 B2 | 10/2006 | McLurkin et al. |
| 7,123,285 B2 | 10/2006 | Smith et al. |
| 7,123,974 B1 | 10/2006 | Hamilton |
| 7,123,991 B2 | 10/2006 | Graf et al. |
| 7,127,325 B2 | 10/2006 | Nagata et al. |
| 7,129,970 B2 | 10/2006 | James et al. |
| 7,133,062 B2 | 11/2006 | Castles et al. |
| 7,142,945 B2 | 11/2006 | Wang et al. |
| 7,142,947 B2 | 11/2006 | Wang et al. |
| 7,151,982 B2 | 12/2006 | Liff et al. |
| 7,154,526 B2 | 12/2006 | Foote et al. |
| 7,155,306 B2 | 12/2006 | Haitin et al. |
| 7,156,809 B2 | 1/2007 | Quy |
| 7,158,317 B2 | 1/2007 | Ben-Eliezer et al. |
| 7,158,859 B2 | 1/2007 | Wang et al. |
| 7,158,860 B2 | 1/2007 | Wang et al. |
| 7,161,322 B2 | 1/2007 | Wang et al. |
| 7,162,338 B2 | 1/2007 | Goncalves et al. |
| 7,164,969 B2 | 1/2007 | Wang et al. |
| 7,171,286 B2 | 1/2007 | Wang et al. |
| 7,174,238 B1 | 2/2007 | Zweig |
| 7,184,559 B2 | 2/2007 | Jouppi |
| 7,188,000 B2 | 3/2007 | Chiappetta et al. |
| 7,206,627 B2 | 4/2007 | Abovitz et al. |
| 7,215,786 B2 | 5/2007 | Nakadai et al. |
| 7,228,203 B2 * | 6/2007 | Koselka et al. ............... 700/245 |
| 7,256,708 B2 | 8/2007 | Rosenfeld et al. |
| 7,262,573 B2 | 8/2007 | Wang et al. |
| 7,289,883 B2 | 10/2007 | Wang et al. |
| 7,321,807 B2 | 1/2008 | Laski |
| 7,340,077 B2 | 3/2008 | Gokturk et al. |
| 7,346,429 B2 | 3/2008 | Goldenberg et al. |
| 7,382,399 B1 | 6/2008 | McCall et al. |
| 7,432,949 B2 | 10/2008 | Remy et al. |
| 7,433,024 B2 | 10/2008 | Garcia et al. |
| 7,441,953 B2 | 10/2008 | Banks |
| 7,624,166 B2 | 11/2009 | Foote et al. |
| 7,706,917 B1 | 4/2010 | Chiappetta et al. |
| 7,924,323 B2 | 4/2011 | Walker et al. |
| 8,025,551 B2 * | 9/2011 | Torres et al. ............... 446/431 |
| 2001/0002448 A1 | 5/2001 | Wilson et al. |
| 2001/0010053 A1 | 7/2001 | Ben-Shachar et al. |
| 2001/0034475 A1 | 10/2001 | Flach et al. |
| 2001/0037163 A1 | 11/2001 | Allard |
| 2001/0051881 A1 | 12/2001 | Filler |
| 2001/0054071 A1 | 12/2001 | Loeb |
| 2002/0015296 A1 | 2/2002 | Howell et al. |
| 2002/0027597 A1 | 3/2002 | Sachau |
| 2002/0049517 A1 | 4/2002 | Ruffner |
| 2002/0055917 A1 | 5/2002 | Muraca |
| 2002/0057279 A1 | 5/2002 | Jouppi |
| 2002/0058929 A1 | 5/2002 | Green |
| 2002/0059587 A1 | 5/2002 | Cofano et al. |
| 2002/0063726 A1 | 5/2002 | Jouppi |
| 2002/0073429 A1 | 6/2002 | Beane et al. |
| 2002/0082498 A1 | 6/2002 | Wendt et al. |
| 2002/0095238 A1 | 7/2002 | Ahlin et al. |
| 2002/0098879 A1 | 7/2002 | Rheey |
| 2002/0104094 A1 | 8/2002 | Alexander et al. |
| 2002/0111988 A1 | 8/2002 | Sato |
| 2002/0120362 A1 | 8/2002 | Lathan et al. |
| 2002/0130950 A1 | 9/2002 | James et al. |
| 2002/0141595 A1 | 10/2002 | Jouppi |
| 2002/0143923 A1 | 10/2002 | Alexander |
| 2002/0177925 A1 | 11/2002 | Onishi et al. |
| 2002/0183894 A1 | 12/2002 | Wang et al. |
| 2002/0184674 A1 | 12/2002 | Xi et al. |
| 2002/0186243 A1 | 12/2002 | Ellis et al. |
| 2003/0030397 A1 | 2/2003 | Simmons |
| 2003/0048481 A1 | 3/2003 | Kobayashi et al. |
| 2003/0050733 A1 | 3/2003 | Wang et al. |
| 2003/0060808 A1 | 3/2003 | Wilk |
| 2003/0069752 A1 | 4/2003 | LeDain et al. |
| 2003/0100892 A1 | 5/2003 | Morley et al. |
| 2003/0104806 A1 | 6/2003 | Ruef et al. |
| 2003/0114962 A1 | 6/2003 | Niemeyer |
| 2003/0135203 A1 | 7/2003 | Wang et al. |
| 2003/0144579 A1 | 7/2003 | Buss |
| 2003/0144649 A1 | 7/2003 | Ghodoussi et al. |
| 2003/0151658 A1 | 8/2003 | Smith |
| 2003/0171710 A1 | 9/2003 | Bassuk et al. |
| 2003/0174285 A1 | 9/2003 | Trumbull |
| 2003/0180697 A1 | 9/2003 | Kim et al. |
| 2003/0199000 A1 | 10/2003 | Valkirs et al. |
| 2003/0216834 A1 | 11/2003 | Allard |
| 2003/0220541 A1 | 11/2003 | Salisbury et al. |
| 2003/0231244 A1 | 12/2003 | Bonilla et al. |
| 2003/0232649 A1 | 12/2003 | Gizis et al. |
| 2004/0012362 A1 | 1/2004 | Tsurumi |
| 2004/0013295 A1 | 1/2004 | Sabe et al. |
| 2004/0019406 A1 | 1/2004 | Wang et al. |
| 2004/0024490 A1 | 2/2004 | McLurkin et al. |
| 2004/0041904 A1 | 3/2004 | Lapalme et al. |
| 2004/0065073 A1 | 4/2004 | Nash |
| 2004/0068657 A1 | 4/2004 | Alexander et al. |
| 2004/0078219 A1 | 4/2004 | Kaylor et al. |
| 2004/0080610 A1 | 4/2004 | James et al. |
| 2004/0088077 A1 | 5/2004 | Jouppi et al. |
| 2004/0093409 A1 | 5/2004 | Thompson et al. |
| 2004/0098167 A1 | 5/2004 | Yi et al. |
| 2004/0102167 A1 | 5/2004 | Shim et al. |
| 2004/0117065 A1 | 6/2004 | Wang et al. |
| 2004/0138547 A1 | 7/2004 | Wang et al. |
| 2004/0143421 A1 | 7/2004 | Wang et al. |
| 2004/0148638 A1 | 7/2004 | Weisman et al. |
| 2004/0153211 A1 | 8/2004 | Kamoto et al. |
| 2004/0157612 A1 | 8/2004 | Kim |
| 2004/0162637 A1 | 8/2004 | Wang et al. |
| 2004/0167666 A1 | 8/2004 | Wang et al. |
| 2004/0167668 A1 | 8/2004 | Wang et al. |
| 2004/0172301 A1 | 9/2004 | Mihai et al. |
| 2004/0174129 A1 | 9/2004 | Wang et al. |
| 2004/0175684 A1 | 9/2004 | Kaasa et al. |
| 2004/0179714 A1 | 9/2004 | Jouppi |
| 2004/0201602 A1 | 10/2004 | Mody et al. |
| 2004/0215490 A1 | 10/2004 | Duchon et al. |
| 2004/0230340 A1 | 11/2004 | Fukuchi et al. |

(56) References Cited

U.S. PATENT DOCUMENTS

| | | |
|---|---|---|
| 2005/0003330 A1 | 1/2005 | Asgarinejad et al. |
| 2005/0021182 A1 | 1/2005 | Wang et al. |
| 2005/0021183 A1 | 1/2005 | Wang et al. |
| 2005/0021187 A1 | 1/2005 | Wang et al. |
| 2005/0021309 A1 | 1/2005 | Alexander et al. |
| 2005/0024485 A1 | 2/2005 | Castles et al. |
| 2005/0027567 A1 | 2/2005 | Taha |
| 2005/0027794 A1 | 2/2005 | Decker |
| 2005/0028221 A1 | 2/2005 | Liu et al. |
| 2005/0035862 A1 | 2/2005 | Wildman et al. |
| 2005/0038416 A1 | 2/2005 | Wang et al. |
| 2005/0038564 A1 | 2/2005 | Burick |
| 2005/0052527 A1 | 3/2005 | Remy et al. |
| 2005/0065435 A1 | 3/2005 | Rauch et al. |
| 2005/0065659 A1 | 3/2005 | Tanaka et al. |
| 2005/0065813 A1 | 3/2005 | Mishelevich et al. |
| 2005/0071046 A1 | 3/2005 | Miyazaki et al. |
| 2005/0099493 A1 | 5/2005 | Chew |
| 2005/0110867 A1 | 5/2005 | Schulz |
| 2005/0154265 A1 | 7/2005 | Miro et al. |
| 2005/0182322 A1 | 8/2005 | Grispo |
| 2005/0192721 A1 | 9/2005 | Jouppi |
| 2005/0204438 A1 | 9/2005 | Wang et al. |
| 2005/0216126 A1 | 9/2005 | Koselka et al. |
| 2005/0219356 A1 | 10/2005 | Smith et al. |
| 2005/0267826 A1 | 12/2005 | Levy et al. |
| 2005/0283414 A1 | 12/2005 | Fernandes et al. |
| 2006/0007943 A1 | 1/2006 | Fellman |
| 2006/0013263 A1 | 1/2006 | Fellman |
| 2006/0013469 A1 | 1/2006 | Wang et al. |
| 2006/0013488 A1 | 1/2006 | Inoue |
| 2006/0029065 A1 | 2/2006 | Fellman |
| 2006/0047365 A1 | 3/2006 | Ghodoussi et al. |
| 2006/0052676 A1 | 3/2006 | Wang et al. |
| 2006/0052684 A1 | 3/2006 | Takahashi et al. |
| 2006/0064212 A1 | 3/2006 | Thorne |
| 2006/0082642 A1 | 4/2006 | Wang et al. |
| 2006/0087746 A1 | 4/2006 | Lipow |
| 2006/0095170 A1 | 5/2006 | Yang et al. |
| 2006/0098573 A1 | 5/2006 | Beer et al. |
| 2006/0103659 A1 | 5/2006 | Karandikar et al. |
| 2006/0104279 A1 | 5/2006 | Fellman et al. |
| 2006/0106493 A1 | 5/2006 | Niemeyer et al. |
| 2006/0122482 A1 | 6/2006 | Mariotti et al. |
| 2006/0142983 A1 | 6/2006 | Sorensen et al. |
| 2006/0161303 A1 | 7/2006 | Wang et al. |
| 2006/0173712 A1 | 8/2006 | Joubert |
| 2006/0178776 A1 | 8/2006 | Feingold et al. |
| 2006/0189393 A1 | 8/2006 | Edery |
| 2006/0195569 A1 | 8/2006 | Barker |
| 2006/0259193 A1 | 11/2006 | Wang et al. |
| 2006/0293788 A1 | 12/2006 | Pogodin |
| 2007/0021871 A1 | 1/2007 | Wang et al. |
| 2007/0046237 A1 | 3/2007 | Lakshmanan et al. |
| 2007/0064092 A1 | 3/2007 | Sandbeg et al. |
| 2007/0078566 A1 | 4/2007 | Wang et al. |
| 2007/0100498 A1 | 5/2007 | Matsumoto et al. |
| 2007/0114075 A1 | 5/2007 | Buehler et al. |
| 2007/0117516 A1 | 5/2007 | Saidi et al. |
| 2007/0120965 A1 | 5/2007 | Sandberg et al. |
| 2007/0135967 A1 | 6/2007 | Jung et al. |
| 2007/0142964 A1 | 6/2007 | Abramson |
| 2007/0152427 A1 | 7/2007 | Olsen |
| 2007/0192910 A1 | 8/2007 | Vu et al. |
| 2007/0197896 A1 | 8/2007 | Moll et al. |
| 2007/0198128 A1 | 8/2007 | Ziegler et al. |
| 2007/0199108 A1 | 8/2007 | Angle et al. |
| 2007/0250212 A1 | 10/2007 | Halloran et al. |
| 2007/0262884 A1 | 11/2007 | Goncalves et al. |
| 2007/0273751 A1 | 11/2007 | Sachau |
| 2007/0291109 A1 | 12/2007 | Wang et al. |
| 2007/0291128 A1 | 12/2007 | Wang et al. |
| 2007/0293985 A1 | 12/2007 | Myeong et al. |
| 2008/0011904 A1 | 1/2008 | Cepollina et al. |
| 2008/0065268 A1 | 3/2008 | Wang et al. |
| 2008/0082211 A1 | 4/2008 | Wang et al. |
| 2008/0105481 A1 | 5/2008 | Hutcheson et al. |
| 2008/0106746 A1 | 5/2008 | Shpunt et al. |
| 2008/0201014 A1 | 8/2008 | Sonoura |
| 2008/0201017 A1 | 8/2008 | Wang et al. |
| 2008/0215987 A1 | 9/2008 | Alexander et al. |
| 2008/0229531 A1 | 9/2008 | Takida |
| 2008/0240502 A1 | 10/2008 | Freedman et al. |
| 2008/0255703 A1 | 10/2008 | Wang et al. |
| 2008/0281467 A1 | 11/2008 | Pinter |
| 2009/0055023 A1 | 2/2009 | Walters et al. |
| 2009/0096783 A1 | 4/2009 | Shpunt et al. |
| 2009/0105882 A1 | 4/2009 | Wang et al. |
| 2009/0125147 A1 | 5/2009 | Wang et al. |
| 2009/0164045 A1 | 6/2009 | Deguire et al. |
| 2009/0177323 A1 | 7/2009 | Ziegler et al. |
| 2009/0185274 A1 | 7/2009 | Shpunt |
| 2009/0226113 A1 | 9/2009 | Matsumoto et al. |
| 2009/0240371 A1 | 9/2009 | Wang et al. |
| 2009/0259339 A1 | 10/2009 | Wright et al. |
| 2010/0010672 A1 | 1/2010 | Wang et al. |
| 2010/0010673 A1 | 1/2010 | Wang et al. |
| 2010/0019715 A1 | 1/2010 | Roe et al. |
| 2010/0020078 A1 | 1/2010 | Shpunt |
| 2010/0034457 A1 | 2/2010 | Berliner et al. |
| 2010/0066587 A1 | 3/2010 | Yamauchi et al. |
| 2010/0070079 A1 | 3/2010 | Mangaser et al. |
| 2010/0073490 A1 | 3/2010 | Wang et al. |
| 2010/0115418 A1 | 5/2010 | Wang et al. |
| 2010/0118123 A1 | 5/2010 | Freedman et al. |
| 2010/0131103 A1 | 5/2010 | Herzog et al. |
| 2010/0191375 A1 | 7/2010 | Wright et al. |
| 2010/0268383 A1 | 10/2010 | Wang et al. |
| 2011/0050841 A1 | 3/2011 | Wang et al. |
| 2011/0071702 A1 | 3/2011 | Wang et al. |
| 2011/0187875 A1 | 8/2011 | Sanchez et al. |
| 2011/0190930 A1 | 8/2011 | Hanrahan et al. |
| 2011/0218674 A1 | 9/2011 | Stuart et al. |
| 2011/0288684 A1 | 11/2011 | Farlow et al. |
| 2011/0292193 A1 | 12/2011 | Wang et al. |
| 2011/0301759 A1 | 12/2011 | Wang et al. |

FOREIGN PATENT DOCUMENTS

| | | |
|---|---|---|
| CN | 101978365 | 2/2011 |
| CN | 101106939 | 11/2011 |
| EP | 0981905 B1 | 1/2002 |
| EP | 1262142 A2 | 12/2002 |
| EP | 1536660 A2 | 6/2005 |
| EP | 1806210 A2 | 7/2007 |
| EP | 1536660 A3 | 4/2008 |
| EP | 2263158 A2 | 12/2010 |
| EP | 2300930 A1 | 3/2011 |
| GB | 2431261 A | 4/2007 |
| JP | 07213753 | 8/1995 |
| JP | 07248823 | 9/1995 |
| JP | 08084328 | 3/1996 |
| JP | 07257422 | 12/1996 |
| JP | 08320727 | 12/1996 |
| JP | 09267276 | 10/1997 |
| JP | 10079097 | 3/1998 |
| JP | 10143243 A | 5/1998 |
| JP | 10288689 | 10/1998 |
| JP | 00032319 | 1/2000 |
| JP | 00049800 | 2/2000 |
| JP | 00079587 | 3/2000 |
| JP | 00196876 | 7/2000 |
| JP | 2000289985 A | 10/2000 |
| JP | 00188124 | 4/2001 |
| JP | 01125641 | 5/2001 |
| JP | 01147718 | 5/2001 |
| JP | 01179663 | 7/2001 |
| JP | 01198865 | 7/2001 |
| JP | 01198868 | 7/2001 |
| JP | 01199356 | 7/2001 |
| JP | 02000574 | 1/2002 |
| JP | 02035423 | 2/2002 |
| JP | 02046088 | 2/2002 |
| JP | 200285305 A | 3/2002 |

(56) References Cited

FOREIGN PATENT DOCUMENTS

| | | |
|---|---|---|
| JP | 02305743 | 10/2002 |
| JP | 02355779 | 12/2002 |
| JP | 04261941 | 9/2004 |
| JP | 04524824 | 9/2004 |
| JP | 05028066 | 2/2005 |
| JP | 2008004078 A | 1/2008 |
| JP | 2009123061 A | 6/2009 |
| JP | 2009217363 A | 9/2009 |
| JP | 10064154 | 3/2010 |
| JP | 10532109 | 9/2010 |
| JP | 10246954 | 11/2010 |
| KR | 100019479 | 2/2010 |
| KR | 100139037 | 12/2010 |
| WO | WO-9306690 A1 | 4/1993 |
| WO | WO-9851078 A1 | 11/1998 |
| WO | WO-9967067 A1 | 12/1999 |
| WO | WO-00033726 A1 | 6/2000 |
| WO | WO-03077745 A1 | 9/2003 |
| WO | WO-03102706 A1 | 12/2003 |
| WO | WO-2004075456 A2 | 9/2004 |
| WO | WO-2006012797 A1 | 2/2006 |
| WO | WO-2006078611 A2 | 7/2006 |
| WO | WO-2007041038 A2 | 4/2007 |
| WO | WO-2007041295 A2 | 4/2007 |
| WO | WO-2008/083489 A1 | 7/2008 |
| WO | WO-2008100272 A2 | 8/2008 |
| WO | WO-2008105634 A1 | 9/2008 |
| WO | WO-2008100272 A3 | 10/2008 |
| WO | WO-2009117274 A2 | 9/2009 |
| WO | WO-2009128997 A1 | 10/2009 |
| WO | WO-2009145958 A2 | 12/2009 |
| WO | WO-2010006205 A1 | 1/2010 |
| WO | WO-2010006211 A1 | 1/2010 |
| WO | WO-2010033666 A1 | 3/2010 |
| WO | WO-2010047881 A1 | 4/2010 |
| WO | WO-2010062798 A1 | 6/2010 |
| WO | WO-2010065257 A1 | 6/2010 |
| WO | WO-2010120407 A1 | 10/2010 |
| WO | WO-2010120707 A1 | 10/2010 |
| WO | WO-2011028589 A2 | 3/2011 |
| WO | WO-2011028589 A3 | 4/2011 |
| WO | WO-2011097130 A2 | 8/2011 |
| WO | WO-2011097132 A2 | 8/2011 |
| WO | WO-2011109336 A2 | 9/2011 |
| WO | WO-2011146254 A2 | 11/2011 |
| WO | WO-2011146259 A2 | 11/2011 |
| WO | WO-2011097132 A3 | 12/2011 |
| WO | WO-2011149902 A2 | 12/2011 |

OTHER PUBLICATIONS

Rajesh, Arumugam et al., "DAvinCi: A cloud computing framework fo service robots", 2010 IEEE International Conference on Robotics and Automation: ICRA 2010; Anchorage, Alaska, USA, May 3-8, 2010, IEEE, Piscataway, NJ, USA, May 3, 2010, all pages.

Bistry, H., et al. "A cloud computing approach to complex robot vision tasks using smart camera systems", Intelligent Robots and Systems (IROS), 2010 IEEE/RSJ International Conference On, Piscataway, NJ, USA, vol. 1-24, Oct. 18, 2010, all pages.

Nimmagadda, Y., et al. "Real-time moving object recognition and tracking using computation offloading", Intelligent Robots and Systems (IROS), 2010 IEEE/RSJ International Conference On, IEEE, Piscataway, NJ, USA, Oct. 18, 2010, all pages.

International Search Report for Application No: PCT/US2011/059910 Dated May 29, 2013.

Ferriere L. et. al., "Design of omnimobile robot wheels", Robotics and Automation, 1996. Proceedings., 1996 IEEE International Conference on Minneapolis, MN, Apr. 22028, 1996, New York, NY, IEEE, Apr. 22, 1996, all pages.

Kanda A. et. al., "Environment Recognition System Based on Multiple Classification Analyses for Mobile Robots", Journal of Bionic Engineering, Sep. 1, 2008, all pages.

International Search Report for Application No. PCT/US2011/035488 dated May 13, 2013.

Muller A., et al. "A model-based object following system", Intelligent Vehicles Symposium, 2009 IEEE, Piscataway, NJ, USA, Jun. 3, 2009, all pages.

Ho Seok Ahn, et. al. "PDA-based mobile robot system with remote monitoring for home environment", IEEE Transactions on Consumer Electronics, IEEE Service Center, New York, NY, USA, vol. 55, No. 3, 1, Aug. 1, 2009, all pages.

Kathryn A Daltorio, et al. "An obstacle-edging reflex for an autonomous lawnmower", Position Location and Navigation Symposium (PLANS), 2010 IEEE/ION, IEEE, Piscataway, NJ, USA, May 4, 2010, all pages.

International Search Report for Application No. PCT/US2011/035476 Dated May 17, 2013.

Jong-Hwan Kim et al., "Ubiquitous Robot: A New Paradigm for Integrated Sciences", 2007 IEEE International Conference on Robotics and Automation—Apr. 10-14, 2007—Roma, Italy, IEEE, Piscataway, NJ, USA, Apr. 10, 2007, all pages.

De F O Araujo T et al, "MaeRobot: An Open Source Test Platform for Prototyping Robots", Robotic Symposium, 2008, LARS '08. IEEE Latin American, IEEE, Piscataway, NJ, USA, Oct. 29, 2008, all pages.

Li Xiaopen et al., "Research an open control architecture of autonomous mobile robot with multi-layer and modularization", Infomatics in Control, Automation and Robotics (Car), 2010 2nd International Asia Conference ON, IEEE, Piscataway, NJ, USA, Mar. 6, 2010, all pages.

Hu Guanshan, "Neutral Networks Based on Information Fusion Using for Avoiding Obstacle Robot", Information Engineering, 2009. ICIE '09. Wase International Conference ON, IEEE, Piscataway, NJ, USA, Jul. 10, 2009, all pages.

Freire E O et al., "Prototyping a wheeled mobile robot embedding multiple sensors and agent-based control system", Proc. 43rd IEEE Midwest Symposium on Circuits and Systems, Aug. 8, 2000, all pages.

Sung-Min Han et al., "Mobile robot navigation by circular path planning algorithm using camera and ultrasonic sensor", Industrial Electronics, 2009. ISIE 2009. IEEE International Symposium ON, IEEE, Piscataway, NJ, USA, Jul. 5, 2009, all pages.

Ruifeng Li et al., "The development of a general type of security robot", Robotics and Biomimetics, 2007. ROBIO 2007. IEEE International Conference ON, IEEE, Piscataway, NJ, USA, Dec. 15, 2007, all pages.

Pil Gyeom Kim el al., "Obstacle Avoidance of a Mobile Robot Using Vision System and Ultrasonic Sensor", Aug. 21, 2007, Advanced Intelligent Computing Theories and Applications, With Aspects of Theoretical and Methodological Issues, all pages.

International Search Report for Application No. PCT/US2011/059980 dated May 14, 2013.

Freire E. O., et al. "Prototyping a wheeled mobile robot embedding multiple sensors and agent-based control system", PROC. 43rd IEEE Midwest Symp. on Circuits and Systems, vol. 2, Aug. 8, 2000, pp. 926-929.

International Search Report and Written Opinion for Application No. PCT/US2013/028208 dated Jul. 9, 2013.

Se, S.; Lowe, David G.; Little, J. (2001). "Vision-based mobile robot localization and mapping using scale-invariant features". *Proceedings of the IEEE International Conference on Robotics and Automation (ICRA)*. 2. pp. 2051.

Rothganger, F; S. Lazebnik, C. Schmid, and J. Ponce: 2004. 3D Object Modeling and Recognition Using Local Affine-Invariant Image Descriptors and Multi-View Spatial Constraints, ICCV.

Laptev, Ivan and Lindeberg, Tony (2004). "Local descriptors for spatio-temporal recognition". *ECCV'04 Workshop on Spatial Coherence for Visual Motion Analysis, Springer Lecture Notes in Computer Science*, vol. 3667. pp. 91-103.

Ivan Laptev, Barbara Caputo, Christian Schuldt and Tony Lindeberg (2007). "Local velocity-adapted motion events for spatio-temporal recognition". *Computer Vision and Image Understanding* 108: 207-229; Scovanner, Paul.

(56) References Cited

OTHER PUBLICATIONS

Ali, S; Shah, M (2007). "A 3-dimensional sift descriptor and its application to action recognition". *Proceedings of the 15th International Conference on Multimedia.* pp. 357-360.

Iryna Gordon and David G. Lowe, "What and where: 3D object recognition with accurate pose," *Toward Category-Level Object Recognition*, (Springer-Verlag, 2006), pp. 67-82.

Niebles, J. C. Wang, H. and Li, Fei-Fei (2006). "Unsupervised Learning of Human Action Categories Using Spatial-Temporal Words". *Proceedings of the British Machine Vision Conference (BMVC).* Edinburgh.

Binotto A P D et al: "Real-time taks reconfiguration support applied to an UAV-based surveillance system", Computer Science and Information Technology, 2008. IMCSIT 2008. International Multiconference ON, IEEE, Piscataway, NJ, USA, Oct. 20, 2008, pp. 581-588, XP031406238, ISBN: 978-83-60810-14-9.

International Search Report for application No. PCT/US2011/059863 dated Nov. 22, 2012.

Japanese Office Action with its English translation for Application No. 2013-547475 dated Dec. 16, 2013.

Goldberg, "More Online Robots, Robots that Manipulate", Internet, Updated Aug. 2001, http://ford.ieor.berkeley.edu/ir/robots_a2.html, Aug. 2001.

Goldenberg, et al., "Telemedicine in Otolaryngology", American Journal of Otolaryngology vol. 23, No. 1, 2002, pp. 35-43.

Goldman, Lea, "Machine Dreams", Entrepreneurs, Forbes, May 27, 2002.

Gump, Michael D., "Robot Technology Improves VA Pharmacies", Internet, 2001, pp. 1-3.

Hameed, Mohammed et al., "A Review of Telemedicine", Journal of Telemedicine and Telecare., vol. 5, Supplement 1, 1999, pp. S1:103-S1:106.

Han, et al., "Construction of an Omnidirectional Mobile Robot Platform Based on Active Dual-Wheel Caster Mechanisms and Development of a Control Simulator", Kluwer Acedemic Publishers, vol. 29, Nov. 2000, pp. 257-275.

Handley, et al., "RFC 2327—SDP:Session Description Protocol", http://www.faqs.org/rfcs/rfc2327.html, Apr. 1998.

Hanebeck, et al., "ROMAN: A mobile Robotic Assistant for Indoor Service Applications", Proceedings of the 1997 IEEE/RSJ International Conference on Intelligent Robots and Systems, 1997.

Harmo, et al., "Moving Eye-Interactive Telepresence Over Internet With a Ball Shaped Mobile Robot", 2000.

Haule, et al., "Control Scheme for Delayed Teleoperation Tasks", Proceedings of the Pacific Rim Conference on Communications, Computer and Signal Processing, May 17, 1995.

Hees, William P., "Communications Design for a Remote Presence Robot", Jan. 14, 2002.

Holmberg, "Development of a Holonomic Mobile Robot for Mobile Manipulation Tasks", International Conference on Field and Service Robotics, Pittsburgh, PA, Aug. 1999.

Int'l Communication Union, "ITU-T H.323 Packet-based multimedia communications", http://www.itu.int/rec/T-REC-H.323-199802-S/en, Feb. 1998.

Ishiguro, "Integrating a Perceptual Information Infrastructure with Robotic Avatars: A Framework for Tele-Existence", Proceeding of IEEE Conference on Intelligent Robots and Systems, 1999, pp. 1032-1038.

Ishihara, et al., "Intelligent Microrobot DDS (Drug Delivery System) Measured and Controlled by Ultrasonics", IEEE/RSJ, vol. 2, Nov. 3-5, 1991, pp. 1145-115.

Ivanova, Natali, "Master's thesis: Internet Based Interface for Control of a Mobile Robot", Department of Numerical Analysis and Computer Science, 2003, 59 pages.

Jenkins, et al., "Telehealth Advancing Nursing Practice", Nursing Outlook, vol. 49, No. 2, Mar./Apr. 2001.

Johanson, "Supporting video-mediated communication over the Internet", Chalmers University of Technology, Dept of Computer Engineering, Gothenburg, Sweden, 2003.

Jouppi, et al., "Mutually-Immersive Audio Telepresence", Audio Engineering Society Convention Paper presented at 113th Convention, Oct. 2002.

Jouppi, Norman et al., "First Steps Towards Mutually-Immersive Mobile Telepresence", CSCW, 02, New Orleans LA, Nov. 16-20, 2002.

Kanehiro, Fumio et al., "Virtual Humanoid Robot Platform to Develop Controllers of Real Humanoid Robots without Porting", IEEE, 2001, pp. 3217-3276.

Kaplan, A. E. et al., "An Internet Accessible Telepresence", {aek keshav nls jhv}@research.att.com, AT&T Bell Laboratories, Murray Hill, N.J., pp. 1-7.

Keller, et al., "Raven Interface Project", http://upclose.lrdc.pitt.edu/people/louw_assets/Raven_Slides.pps, Fall 2001.

Khatib, "Robots in Human Environments", Proc. International Conference on Control, Automation, Robotics, and Vision ICRACV2000, Singapore, Dec. 2000, pp. 454-457.

Kuzuoka, et al., "Can the GestureCam Be A Surrogate?", Proceedings of the Fourth European Conference on Computer-Supported Cooperative Work, Sep. 10-14, pp. 181-196.

Lane, "Automated Aides", Newsday, http://www.cs.cum.edu/nursebot/web/press/nd4380.htm, Oct. 17, 2000.

Lee, et al., "A novel method of surgical instruction: International telementoring", Internet, 1998, pp. 1-4.

Lim, Hun-Ok et al., "Control to Realize Human-like Walking of a Biped Humanoid Robot", IEEE, 2000, pp. 3271-3276.

Linebarger, John M. et al., "Concurrency Control Mechanisms for Closely Coupled Collaboration in Multithreaded Virtual Environments", Presence, Special Issue on Advances in Collaborative VEs, 2004.

Loeb, et al., "Virtual Visit: Improving Communication for Those Who Need It Most", Stud Health Technol Inform.; 94: 2003 pp. 302-308.

Australian examination report for related Application No. 2011256720 dated Mar. 27, 2014.

Long, "HelpMate Robotics, Inc. (Formerly Transitions Research Corporation) Robot Navigation Technology", NIST Special Publication, http://www.atp.nist.gov/eao/sp950-1/helpmate.htm, Mar. 1999, pp. 950-951.

Luna, Nancy, "Robot a new face on geriatric care", OC Register, Aug. 6, 2003.

Mack, "Minimally invasive and robotic surgery", Internet IEEE, 2001, pp. 568-572.

Mair, "Telepresence—The Technology. And Its Economic and Social Implications", IEEE Technology and Society, 1997.

Martin, Anya, "Days Ahead", Assisted Living Today, vol. 9, Nov./Dec. 2002, pp. 19-22.

McCardle, et al., "The challenge of utilizing new technology in design education", Internet, 2000, pp. 122-127.

Meng, et al., "E-Service Robot in Home Healthcare", Proceedings of the 2000 IEEE/RSJ, International Conference on Intelligent Robots and Systems, 2000, pp. 832-837.

Michaud, "Introducing Nursebot", The Boston Globe, http://www.cs.cmu.edu/nursebot/web/press/globe_3_01/index.html, Sep. 11, 2001, pp. 1-5.

Montemerlo, "Telepresence: Experiments in Next Generation Internet", CMU Robotics Institute, http://www.ri.cmu.edu/creative/archives.htm (Video/Transcript), Oct. 20, 1998.

Murphy, "Introduction to AI Robotics", A Bradford Book, 2000, p. 487.

Nakajima, et al., "A Multimedia Teleteaching System using an Electronic Whiteboard for Two Way Communication of Motion Videos and Chalkboards", IEEE, 1993, pp. 436-441.

Nomadic Technologies Inc., "Nomad XR4000 Hardware Manual", Release 1.0, Mar. 1999.

Nt'l Energy Res Sci Comp Ctr, "Berkeley Lab's Rage Telepresence Robot Captures R&D100 Award", http://www.nersc.gov/news/newsroom/RAGE070202.php, Jul. 2, 2002.

Ogata, et al., "Development of Emotional Communication Robot: WAMOEBA-2r-Experimental evaluation.", IEEE, 2000, pp. 175-180.

(56) References Cited

OTHER PUBLICATIONS

Ogata, et al., "Emotional Communication Robot: WAMOEBA-2R—Emotion Model and Evaluation Experiments", Internet, 1999, pp. 1-16.
Oh, et al., "Autonomous Battery Recharging for Indoor Mobile Robots", Proceedings of Australian Conference on Robotics and Automation, http://users.rsise.anu.edu.au/rsl/rsl_papers/ACRA2000/Auto_Recharge_Paper.pdf, 2000.
Ojha, A. K., "An application of Virtual Reality in Rehabilitation", IEEE, Apr. 10-13, 1994, pp. 4-6.
Paulos, et al., "A World Wide Web Telerobotic Remote Environment Browser", http://vive.cs.berkeley.edu/capek, 1995.
Paulos, "Designing Personal Tele-embodiment", IEEE International Conference on Robotics and Automation http://www.prop.org/papers/icra98.pdf, 1998.
Paulos, "PRoP: Personal Roving Presence", ACM:CHI Proceedings of CHI '98, http://www.prop.org/papers/chi98.pdf, 1998, p. 6.
Paulos, et al., "Ubiquitous Tele-embodiment: Applications and Implications", International Journal of Human Computer Studies, vol. 46, No. 6, Jun. 1997, pp. 861-877.
Paulos, "Video of PRoP 2 at Richmond Field Station", www.prop.org Printout of Home Page of Website and two-page Transcript of the audio portion of said PRoP Video, May 2001.
Paulos, Eric J., "Personal Tele-Embodiment", UC Berkeley, Fall 2001.
Pin, et al., "A New Family of Omnidirectional and Holonomic Wheeled Platforms for Mobile Robots", IEEE, vol. 10, No. 4, Aug. 1994.
Rovetta, et al., "A New Telerobotic Application: Remote Laparoscopic Surgery Using Satellites and and optical fiber Networks for Data Exchange", International Journal of Robotics Research, Jun. 1, 1996, pp. 267-279.
Roy, et al., "Towards Personal Service Robots for the Elderly", Internet, Mar. 7, 2002, 7 pgs.
Salemi, et al., "MILO: Personal robot platform", Internet, 2005, pp. 1-6.
Sandt, Frederic et al., "Perceptions for a Transport Robot in Public Environments", IROS, 1997.
Schaeffer, "Care-O-bot: A System for Assisting Elderly or Disabled Persons in Home Environments", Proceedings of AAATE-99, http://morpha.de/download/publications/IPA, 1999.
Schulz, "Web Interfaces for Mobile Robots in Public Places", Robotics & Automation Magazine, IEEE, vol. 7, Issue 1, Mar. 2000.
Shimoga, et al., "Touch and force reflection for telepresence surgery", IEEE, 1994, pp. 1049-1050.
Siegwart, "Interacting Mobile Robots on the Web", Proceedings of the 1999 IEEE International Conference on Robotics and Automation, May 1999.
Simmons, "Xavier: An Autonomous Mobile Robot on the Web", IEEE Robotics and Automation Magazine, 1999, pp. 43-48.
Spawar Systems Center, "Robart", San Diego, CA, http://www.nosc.mil/robots/land/robart/robart.html, 1998, pp. 1-8.
Stephenson, Gary, "Dr. Robot Tested at Hopkins", Internet, Aug. 5, 2003, pp. 1-2.
Stoianovici, et al., "Robotic Tools for Minimally Invasive Urologic Surgery", Internet, Dec. 2002, pp. 1-17.
Suplee, "Mastering the Robot", The Washington Post, http://www.cs.cmu.edu-nursebotlweb/press/wash/index.html, Sep. 17, 2000, p. A01.
Tahboub, Karim a. et al., "Dynamics Analysis and Control of a Holonomic Vehicle With Continously Variable Transmission", Journal of Dynamic Systems, Measurement and Control ASME vol. 124, Mar. 2002, pp. 118-126.
Tendick, et al., "Human-Machine Interfaces for Minimally Invasive Surgery", IEEE, 1997, pp. 2771-2776.
Thrun, et al., "Probabilistic Algorithms and the Interactive Museum Tour-Guide Robot Minerva", Internet, 2000, pp. 1-35.
Tzafestas, et al., "VR-based Teleoperation of a Mobile Robotic Assistant: Progress Report", Internet, Nov. 2000, pp. 1-23.
Urquhart, Kim, "InTouch's robotic Companion 'beams up' healthcare experts", Medical Device Daily, vol. 7, No. 39, Feb. 27, 2003, p. 1,4.
Weiss, et al., "Telework and video-mediated communication: Importance of real-time, interactive communication for workers with disabilities", California State University Northridge http://www.csun.edu/cod/conf/1999/proceedings/session0238.html, pp. 1-4.
West, et al., "Design of Ball Wheel Mechanisms for Omnidirectional Vehicles with Full Mobility and Invariant Kinematics", Journal of Mechanical Design, vol. 119, Jun. 1997, pp. 153-161.
Yamasaki, et al., "Applying Personal Robots and Active Interface to Video Conference Systems", Internet, 1995, pp. 243-248.
Yamauchi, "PackBot: A Versatile Platform for Military Robotics", Internet, 2004, pp. 1-10.
Yong, et al., "Robot task execution with telepresence using virtual reality technology", Internet, 1998, pp. 1-8.
Zamrazil, Kristie, "Telemedicine in Texas: Public Policy Concerns", House Research Organization Focus Report, Texas House of Representatives, http://www.hro.house.state.tx.us/focus/telemed.pdf, May 5, 2000, pp. 76-22.
Zipperer, Lorri, "Robotic dispensing system", 1999, pp. 1-2.
Zorn, Benjamin G., "Ubiquitous Telepresence", http://www.cs.colorado.edu/-zorn/utlivision/vision.html, May 5, 1996.
Adams, Chris, "Mobile Robotics Research Group", Mobile Robotics Research Group, Edinburgh University, http://www.dai.ed.ac.uk/groups/mrg/MRG.html, Internet, Edinburgh. duplicate of 575084, 2000, pp. 1-2.
Ando, et al., "A Multimedia Self-service Terminal with Conferencing Functions", IEEE, Jul. 5-7, 1995, pp. 357-362.
Android Amusement Corp., "What Marketing Secret . . . . Renting Robots from Android Amusement Corp!", (Advertisement), 1982.
Applebome, "Planning Domesticated Robots for Tomorrow's Household", New York Times, http://www.theoldrobots.com/images17/dc17.JPG, Mar. 4, 1982, pp. 21, 23.
Baltus, et al., "Towards Personal Service Robots for the Elderly, Proceedings for the Elderly Workshop on Interactive Robots and Entertainment", Computer Science and Robotics, 2000.
Bar-Cohen, et al., "Virtual reality robotic telesurgery simulations using MEMICA haptic system", Internet, Mar. 5, 2001, pp. 1-7.
Bartholomew, "An Apothecary's Pharmacy", http://classes.bnf.fr/ema/grands/034.htm, pp. 1230-1240.
Bauer, Jeffrey C. et al., "Service Robots in Health Care: The Evolution of Mechanical Solutions to Human Resource Problems", Jun. 2003.
Bauer, John et al., "Remote telesurgical mentoring: feasibility and efficacy", IEEE, 2000, pp. 1-9.
Bischoff, "Design Concept and Realization of the Humanoid Service Robot HERMES", Field and Service Robotics, Springer, London, 1998, pp. 485-492.
Blackwell, Gerry, "Video: A Wireless LAN Killer App?", Internet, Apr. 16, 2002, pp. 1-3.
Breslow, Michael J. et al., "Effect of a multiple-site intensive care unit telemedicine program on clinical and economic outcome an alternative paradigm for intensivist staffing", Critical Care Med; vol. 32 No. 1, Jan. 2004, pp. 31-38.
Brooks, Rodney, "Remote Presence", Abstracts from Flesh & Machines, How Robots Will Change Us, Feb. 2002, pp. 131-147.
Candelas, Herias et al., "Flexible virtual and remote laboratory for teaching Robotics", FORMATEX 2006; Proc. Advance in Control Education Madrid, Spain, Jun. 2006, pp. 21-23.
Celi, et al., "The EICU: Its not just telemedicine", Critical Care Medicine vol. 29, No. 8 (Supplement), Aug. 2001.
Cheetham, Anastasia et al., "Interface Development for a Child's Video Conferencing Robot", 2000, pp. 1-4.
Cleary, et al., "State of the art in surgical robotics: Clinical applications and technology challenges", Internet, Feb. 24, 2002, pp. 1-26.
CNN, "Floating 'droids' to roam space corridors of the future", Internet, Jan. 12, 2000, pp. 1-4.
CNN.Com/Technology, "Paging R.Robot: Machine helps doctors with patients", Internet, Sep. 30, 2003, 1-3.
Crowley, Susan L., "Hello to Our Future", AARP Bulletin, http://www.cs.cmu.ed/-nursebot/web/press/aarp 99_14/millennium.html, Jan. 2000.

(56) References Cited

OTHER PUBLICATIONS

Dalton, "Techniques for Web Telerobotics", PhD Thesis, University of Western Australia, http://telerobot.mech.uwa.edu.au/information.html, http://catalogue.library.uwa.edu.au/search, 2001, 27-62 pp. 149-191.

Davies, "Robotics in Minimally Invasive Surgery", Internet, 1995, pp. 5/1-5/2.

DiGiorgio, James, "Is Your Emergency Department of the 'Leading Edge?", Internet, 2005, pp. 1-4.

Discovery Channel Canada, "Inventing the Future: 2000 Years of Discovery", (Video Transcript), Jan. 2, 2000.

Elhajj, et al., "Supermedia in Internet-based telerobotic operations", Internet, 2001, pp. 1-14.

Elhajj, et al., "Synchronization and Control of Supermedia Transmission Via the Internet", Proceedings of 2001 International Symposium on Intelligent Multimedia Video and Speech Processing., Hong Kong, May 2-4, 2001.

Ellison, et al., "Telerounding and Patient Satisfaction Following Surgery", pp. 523-530.

Fels, "Developing a Video-Mediated Communication System for Hospitalized Children", Telemedicine Journal, vol. 5,vol. 5, No. 2, 1999.

Fetterman, "Videoconferencing over the Internet", Internet, 2001, pp. 1-8.

Fiorini, P., et al, "Health Care Robotics: A Progress Report", IEEE International Conference on Robotics and Automation, Apr. 1997, pp. 1271-1276.

Ghiasi, et al., "A Generic Web-based Teleoperations Architecture: Details and Experience", SPIE Conference on Telemanipulator and Telepresence Technologies VI, Sep. 1999.

Goldberg, et al., "Collaborative Teleoperation via the Internet", IEEE International Conference on Robotics and Automation, San Francisco, California, Apr. 2000.

Goldberg, "Desktop Teleoperation via the World Wide Web, Proceedings of the IEEE International Conference on Robotics and Automation", htto://citeseer.ist.osu.edu/cache/oaoers/cs/5/fto:zSzzSzusc.eduzSzoubzSziriszSzraiders.odf/aol, 1995, pp. 654-659.

\* cited by examiner

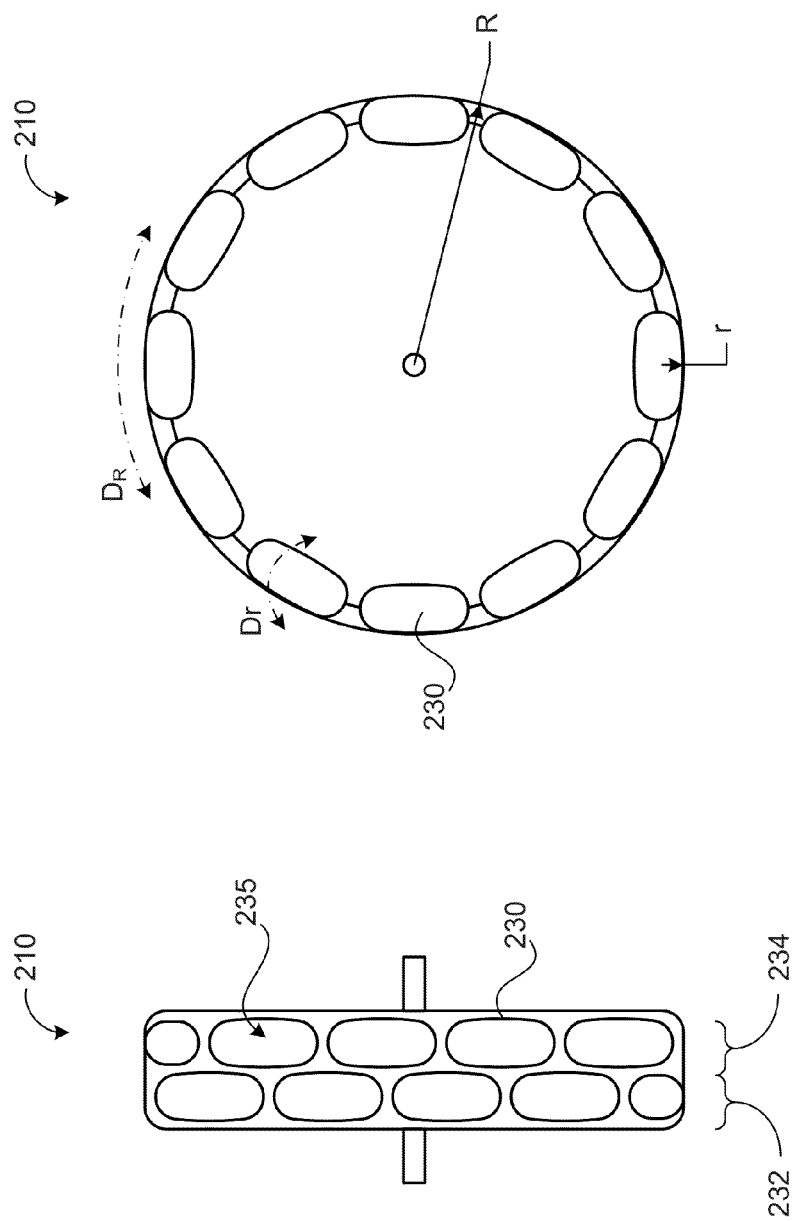

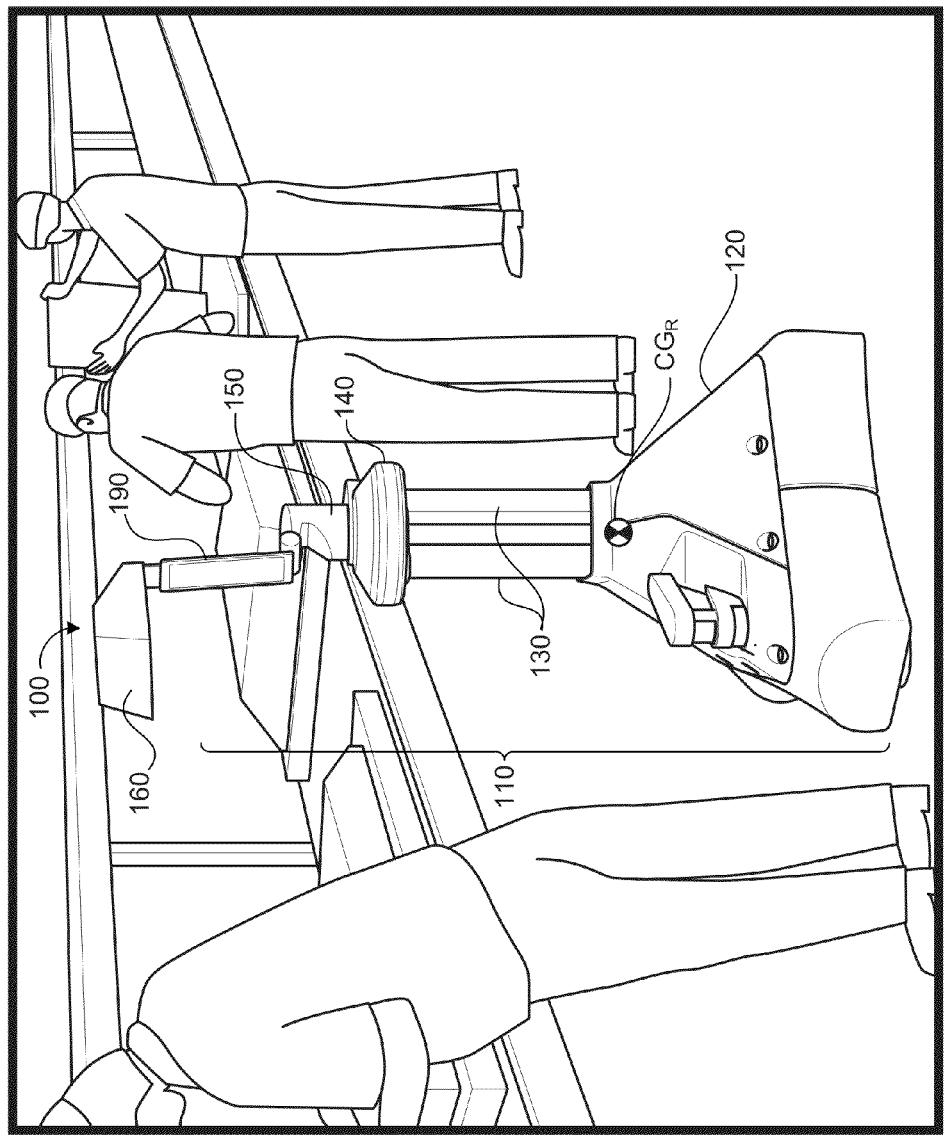

OPERATING A MOBILE ROBOT

CROSS REFERENCE TO RELATED APPLICATIONS

This U.S. patent application claims priority under 35 U.S.C. §119(e) to U.S. Provisional Application 61/346,612, filed on May 20, 2010; U.S. Provisional Application 61/356,910, filed on Jun. 21, 2010; U.S. Provisional Application 61/428,717, filed on Dec. 30, 2010; U.S. Provisional Application 61/428,734, filed on Dec. 30, 2010; U.S. Provisional Application 61/428,759, filed on Dec. 30, 2010; and U.S. Provisional Application 61/429,863, filed on Jan. 5, 2011. The disclosures of these prior applications are considered part of the disclosure of this application and are hereby incorporated by reference in their entireties.

TECHNICAL FIELD

This disclosure relates to mobile robots.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products, for entertainment or to perform certain tasks like vacuum cleaning and home assistance.

SUMMARY

One aspect of the disclosure provides a method of operating a mobile robot to traverse a threshold includes detecting a threshold proximate the robot. The robot includes a holonomic drive system having first, second, and third drive elements configured to maneuver the robot omni-directionally. The method further includes moving the first drive element onto the threshold from a first side and moving the second drive element onto the threshold to place both the first and second drive elements on the threshold. The method includes moving the first drive element off a second side of the threshold, opposite to the first side of the threshold, and moving the third drive element onto the threshold, placing both the second and third drive elements on the threshold. The method includes moving both the second and third drive elements off the second side of the threshold.

Implementations of the disclosure may include one or more of the following features. In some implementations, the method includes determining an elevation change associated with the threshold and continuing to traverse the threshold when the elevation change is within a threshold elevation range. The threshold elevation range may prevent high centering of the robot and/or is less than a radius of the drive elements. The method may include maneuvering the first and second drive elements to approach a first side of the threshold at least substantially equidistantly before moving the first drive element onto the threshold. Moreover, the method may include pivoting about the second drive element to move the first drive element onto the threshold. In some examples, the method includes holding the first drive element stationary while moving the second drive element onto the threshold to place both the first and second drive elements on the threshold. The method may include holding the second drive element stationary while moving the first drive element off the second side of the threshold. The method, in some examples includes continuing to pivot the robot about the second drive element after moving the first drive element off the second side of the threshold to move the third drive element onto the threshold. The method may include moving both the second and third drive elements off the second side of the threshold at substantially the same time. In some instances the method includes moving the first and second drive elements off the threshold at the same time, pulling the third drive element over the threshold.

The holonomic drive system may include first, second, and third drive wheels. Each drive wheel is trilaterally spaced about a vertical center axis and has a drive direction perpendicular to a radial axis with respect to the vertical center axis. In some examples, the holonomic drive system includes first, second, and third drive balls, each drive ball trilaterally spaced about a vertical center axis. For instance, the holonomic drive system may include first, second, and third drive ball assemblies. Each drive ball assembly includes a drive ball, a transmission rollers in continuous contact with the respective drive ball, and a drive mechanism. The transmission roller actively rotates about a first axis and passively rotates about a second axis. The drive mechanism rotates the transmission roller to rotate the drive ball.

In another aspect of the disclosure, a mobile robot includes a holonomic drive system having first, second, and third drive elements configured to maneuver the robot omni-directionally and a controller in communication with the drive system. Upon detecting a threshold proximate the robot, the controller issues commands to the drive system to move the first drive element onto the threshold from a first side, move the second drive element onto the threshold to place both the first and second drive elements on the threshold, move the first drive element off a second side of the threshold, opposite to the first side of the threshold, move the third drive element onto the threshold, placing both the second and third drive elements on the threshold, and move both the second and third drive elements off the second side of the threshold.

In some implementations, the mobile robot includes a base supporting the drive system, a leg extending upward from the base and having a variable height, and a torso supported by the leg. The torso defines a shoulder having a bottom surface overhanging the base. A torso imaging sensor disposed on the bottom surface of the torso points downward along a forward drive direction of the drive system. The torso imaging sensor captures three-dimensional images of a scene about the robot. In some examples, the torso imaging sensor is recessed within a body of the torso while maintaining its downward field of view.

The mobile robot may include a volumetric point cloud imaging device in communication with the controller and is capable of obtaining a point cloud from a volume of space adjacent the robot. The volumetric point cloud imaging device may scan side-to-side with respect to the forward drive direction to increase a lateral field of view of the volumetric point cloud imaging device. In some examples, the volumetric point cloud imaging device is positioned at a height of greater than 2 feet above the ground and directed to be capable of obtaining a point cloud from a volume of space that includes a floor plane in a direction of movement of the robot. The mobile robot may include a laser scanner in communication with the controller and having a field of view centered on the forward drive direction and substantially parallel to a work surface supporting the robot.

The controller may determine an elevation change associated with the threshold based on a sensor signal of at least one sensor (e.g., a volumetric point cloud imaging device) in communication with the controller and issues a command to the drive system to continue to traverse the threshold when the elevation change is within a threshold elevation range. The threshold elevation range may prevent high centering of the robot. Moreover, the threshold elevation range may be less than a radius of the drive elements.

In some implementations, the controller issues a command to the drive system to maneuver the first and second drive elements to approach a first side of the threshold at least substantially equidistantly before moving the first drive element onto the threshold. The controller may issue a command to the drive system to pivot the robot about the second drive element to move the first drive element onto the threshold. In some examples, the controller issues a command to the drive system to hold the first drive element stationary while moving the second drive element onto the threshold to place both the first and second drive elements on the threshold. Similarly, the controller may issue a command to the drive system to hold the second drive element stationary while moving the first drive element off the second side of the threshold.

In some implementations, the controller issues a command to the drive system to continue to pivot the robot about the second drive element after moving the first drive element off the second side of the threshold to move the third drive element onto the threshold. The controller may issue a command to the drive system to move both the second and third drive elements off the second side of the threshold at substantially the same time. In some examples, the controller issues a command to the drive system to move the first and second drive elements off the threshold at the same time, pulling the third drive element over the threshold.

The holonomic drive system may include first, second, and third drive wheels. Each drive wheel trilaterally spaced about a vertical center axis and has a drive direction perpendicular to a radial axis with respect to the vertical center axis. In some examples, the holonomic drive system includes first, second, and third drive balls. Each drive ball is trilaterally spaced about a vertical center axis.

In some implementations, the holonomic drive system includes first, second, and third drive ball assemblies. Each drive ball assembly includes a drive ball, a transmission rollers in continuous contact with the respective drive ball, and a drive mechanism. The transmission roller actively rotates about a first axis and passively rotates about a second axis. The drive mechanism rotates the transmission roller to rotate the drive ball.

In another aspect, a method of operating a mobile robot to open a door includes grasping a doorknob of the door with an end effector of a manipulator arm mounted on a body of the robot, disengaging the door knob, driving holonomically through a doorway of the door while continuing to grasp the doorknob, and releasing the doorknob after passing through the doorway.

In some implementations the method includes altering a height of the manipulator arm to disengage the doorknob (e.g., for lever type doorknobs). The method may include altering a length of the manipulator arm while passing through the doorway. In some examples, the method includes sensing a person near the doorway, holding the door open to allow the person to pass through the doorway, detecting when the person has passed through the doorway, and releasing the doorknob after detection of the person having passed through the doorway.

In some implementations, the robot drives holonomically using a holonomic drive system having first, second, and third drive wheels, each drive wheel trilaterally spaced about a vertical center axis of the robot and having a drive direction perpendicular to a radial axis with respect to the vertical center axis.

In another aspect, a method of operating a mobile robot includes driving the robot holonomically along a forward drive direction using a holonomic drive system having first, second, and third drive elements configured to maneuver the robot omni-directionally. The forward drive direction is coincident with an angled bisector of an angle formed between the first drive element and the second drive element and the first drive element and the third drive element. The first drive element leads the second and third drive elements along the forward drive direction. The method includes accelerating the drive system while monitoring an inertial measurement unit of the drive system to maintain vertical stability of the robot and decelerating the drive system by applying a braking force to the second and third drive elements while allowing the first drive element to slip on a supporting surface of the robot along the forward drive direction.

The holonomic drive system may include first, second, and third drive wheels. Each drive wheel trilaterally spaced about a vertical center axis and has a drive direction perpendicular to a radial axis with respect to the vertical center axis. In some examples, the holonomic drive system includes first, second, and third drive balls. Each drive ball is trilaterally spaced about a vertical center axis.

In some implementations, the holonomic drive system includes first, second, and third drive ball assemblies. Each drive ball assembly includes a drive ball, a transmission rollers in continuous contact with the respective drive ball, and a drive mechanism. The transmission roller actively rotates about a first axis and passively rotates about a second axis. The drive mechanism rotates the transmission roller to rotate the drive ball.

In another aspect, a method of operating a mobile robot to open a door includes grasping a doorknob of the door with an end effector of a manipulator arm mounted on a body of the robot, disengaging the door knob, driving holonomically through a doorway of the door while continuing to grasp the doorknob, and releasing the doorknob after passing through the doorway.

In some implementations the method includes altering a height of the manipulator arm to disengage the doorknob (e.g., for lever type doorknobs). The method may include altering a length of the manipulator arm while passing through the doorway. In some examples, the method includes sensing a person near the doorway, holding the door open to allow the person to pass through the doorway, detecting when the person has passed through the doorway, and releasing the doorknob after detection of the person having passed through the doorway.

In some implementations, the robot drives holonomically using a holonomic drive system having first, second, and third drive wheels, each drive wheel trilaterally spaced about a vertical center axis of the robot and having a drive direction perpendicular to a radial axis with respect to the vertical center axis.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5C is a front view of an exemplary holonomic wheel for a mobile human interface robot.

FIG. 5D is a side view of the wheel shown in FIG. 5C.

FIG. 20 is a perspective view of an exemplary mobile human interface robot with an arm supporting a head away from a torso of the robot.

Like reference symbols in the various drawings indicate like elements.

DETAILED DESCRIPTION

Mobile robots can interact or interface with humans to provide a number of services that range from home assistance to commercial assistance and more. In the example of home assistance, a mobile robot can assist elderly people with everyday tasks, including, but not limited to, maintaining a medication regime, mobility assistance, communication assistance (e.g., video conferencing, telecommunications, Internet access, etc.), home or site monitoring (inside and/or outside), person monitoring, and/or providing a personal emergency response system (PERS). For commercial assistance, the mobile robot can provide videoconferencing (e.g., in a hospital setting), a point of sale terminal, interactive information/marketing terminal, etc.

Figure 1:
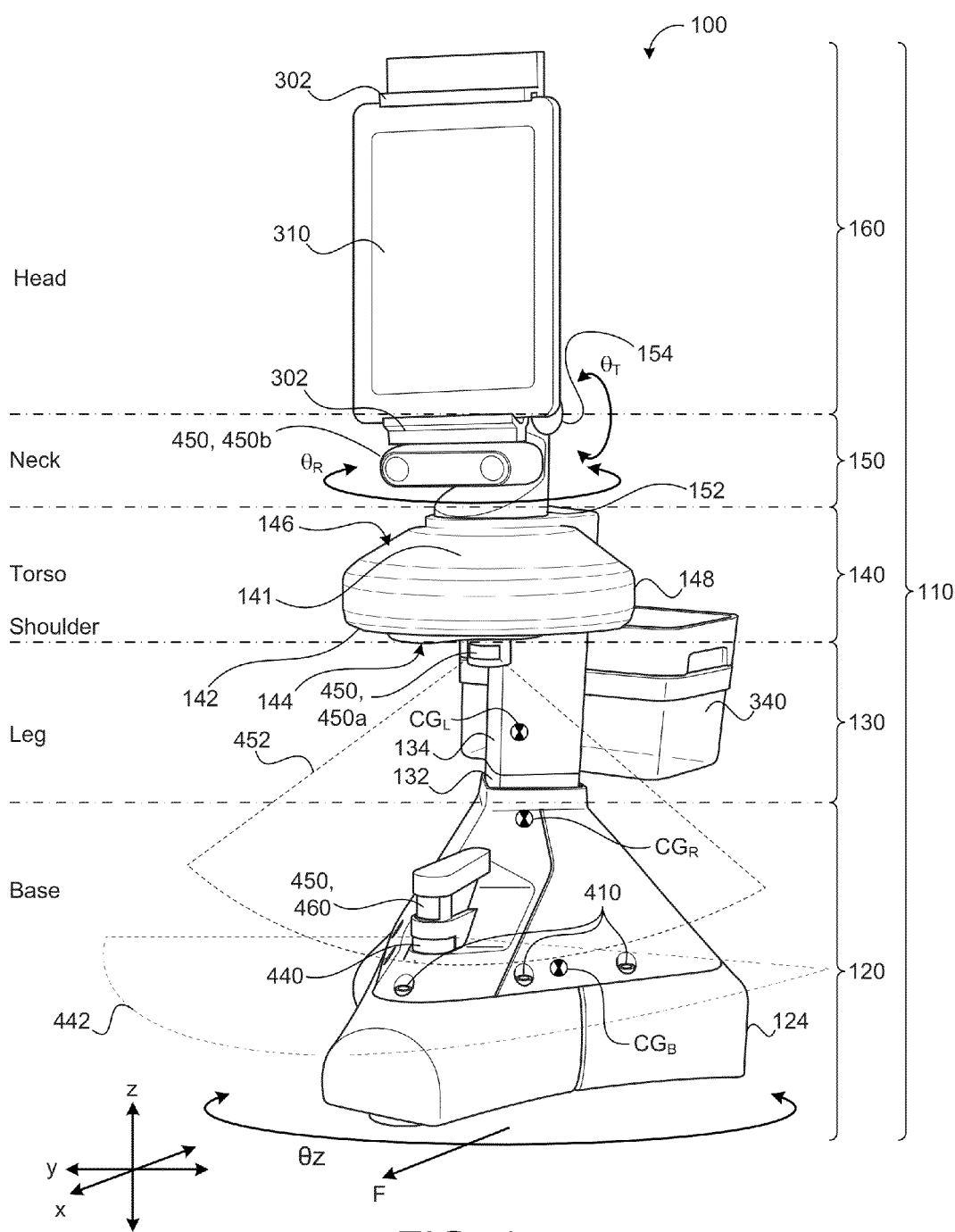
FIG. 1 is a perspective view of an exemplary mobile human interface robot.
Figure 2:
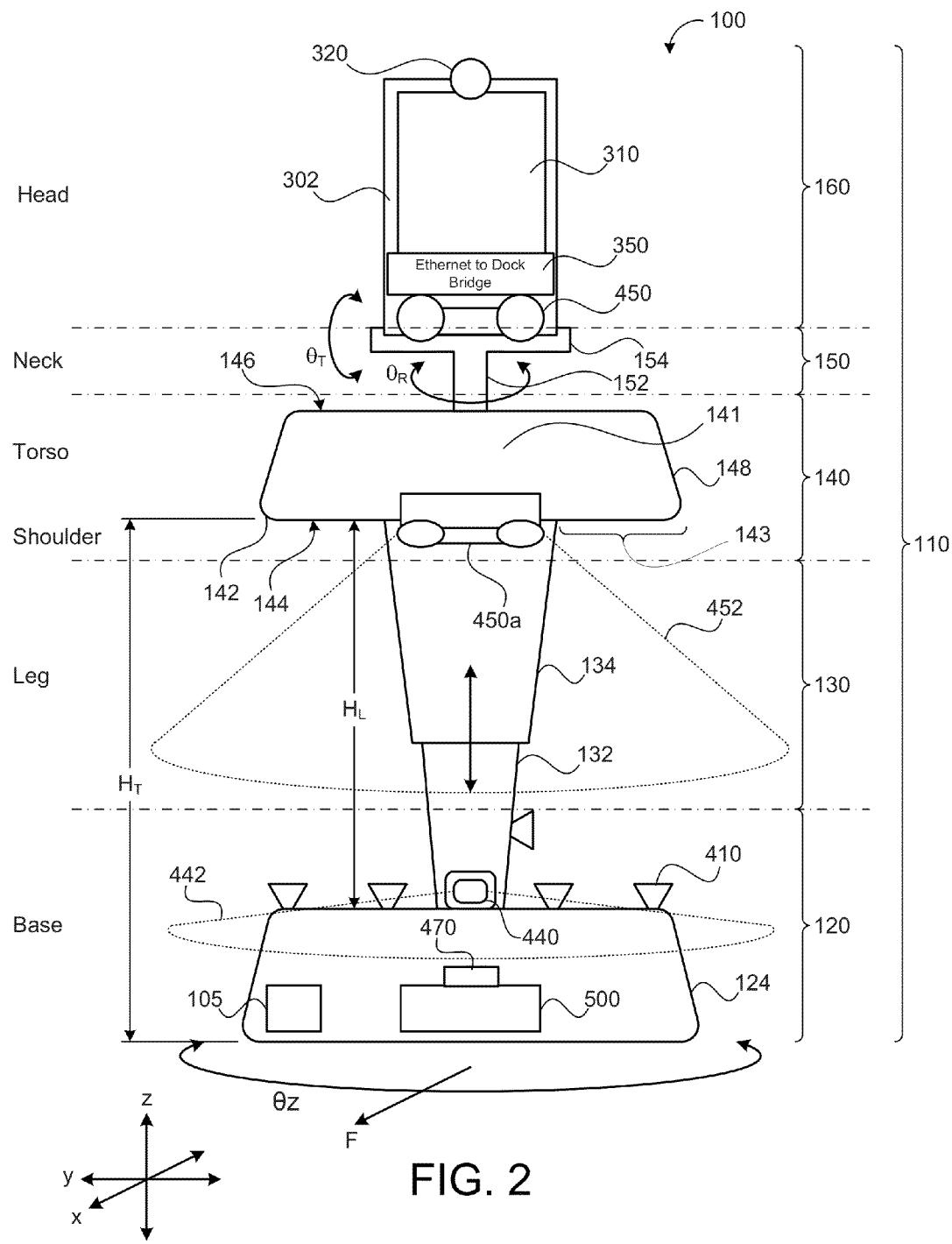
FIG. 2 is a schematic view of an exemplary mobile human interface robot.

Referring to FIGS. 1-2, in some implementations, a mobile robot 100 includes a robot body 110 (or chassis) that defines a forward drive direction F. The robot 100 also includes a drive system 200, an interfacing module 300, and a sensor system 400, each supported by the robot body 110 and in communication with a controller 500 that coordinates operation and movement of the robot 100. A power source 105 (e.g., battery or batteries) can be carried by the robot body 110 and in electrical communication with, and deliver power to, each of these components, as necessary. For example, the controller 500 may include a computer capable of >1000

MIPS (million instructions per second) and the power source 1058 provides a battery sufficient to power the computer for more than three hours.

The robot body 110, in the examples shown, includes a base 120, at least one leg 130 extending upwardly from the base 120, and a torso 140 supported by the at least one leg 130. The base 120 may support at least portions of the drive system 200. The robot body 110 also includes a neck 150 supported by the torso 140. The neck 150 supports a head 160, which supports at least a portion of the interfacing module 300. The base 120 includes enough weight (e.g., by supporting the power source 105 (batteries) to maintain a low center of gravity $CG_B$ of the base 120 and a low overall center of gravity $CG_R$ of the robot 100 for maintaining mechanical stability.

Referring to FIGS. 3 and 4A-4C, in some implementations, the base 120 defines a trilaterally symmetric shape (e.g., a triangular shape from the top view). For example, the base 120 may include a base chassis 122 that supports a base body 124 having first, second, and third base body portions 124a, 124b, 124c corresponding to each leg of the trilaterally shaped base 120 (see e.g., FIG. 4A). Each base body portion 124a, 124b, 124c can be movably supported by the base chassis 122 so as to move independently with respect to the base chassis 122 in response to contact with an object. The trilaterally symmetric shape of the base 120 allows bump detection 360° around the robot 100. Each base body portion 124a, 124b, 124c can have an associated contact sensor e.g., capacitive sensor, read switch, etc.) that detects movement of the corresponding base body portion 124a, 124b, 124c with respect to the base chassis 122.

In some implementations, the drive system 200 provides omni-directional and/or holonomic motion control of the robot 100. As used herein the term "omni-directional" refers to the ability to move in substantially any planar direction, i.e., side-to-side (lateral), forward/back, and rotational. These directions are generally referred to herein as x, y, and θz, respectively. Furthermore, the term "holonomic" is used in a manner substantially consistent with the literature use of the term and refers to the ability to move in a planar direction with three planar degrees of freedom, i.e., two translations and one rotation. Hence, a holonomic robot has the ability to move in a planar direction at a velocity made up of substantially any proportion of the three planar velocities (forward/back, lateral, and rotational), as well as the ability to change these proportions in a substantially continuous manner.

Figure 5A:
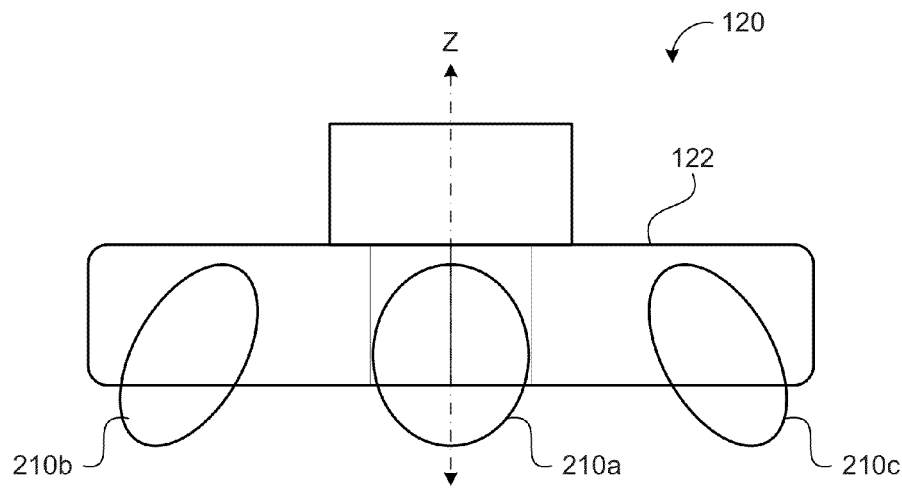
FIG. 5A is a front schematic view of an exemplary base for a mobile human interface robot.
Figure 5B:
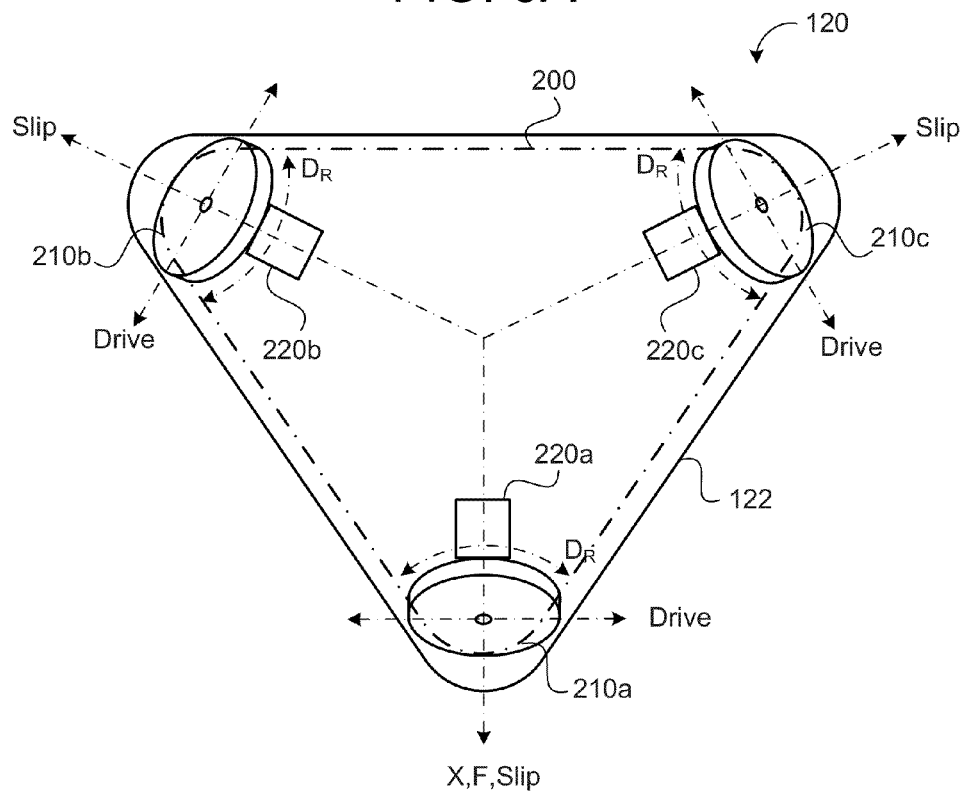
FIG. 5B is a top schematic view of an exemplary base for a mobile human interface robot.
Figure 5E:
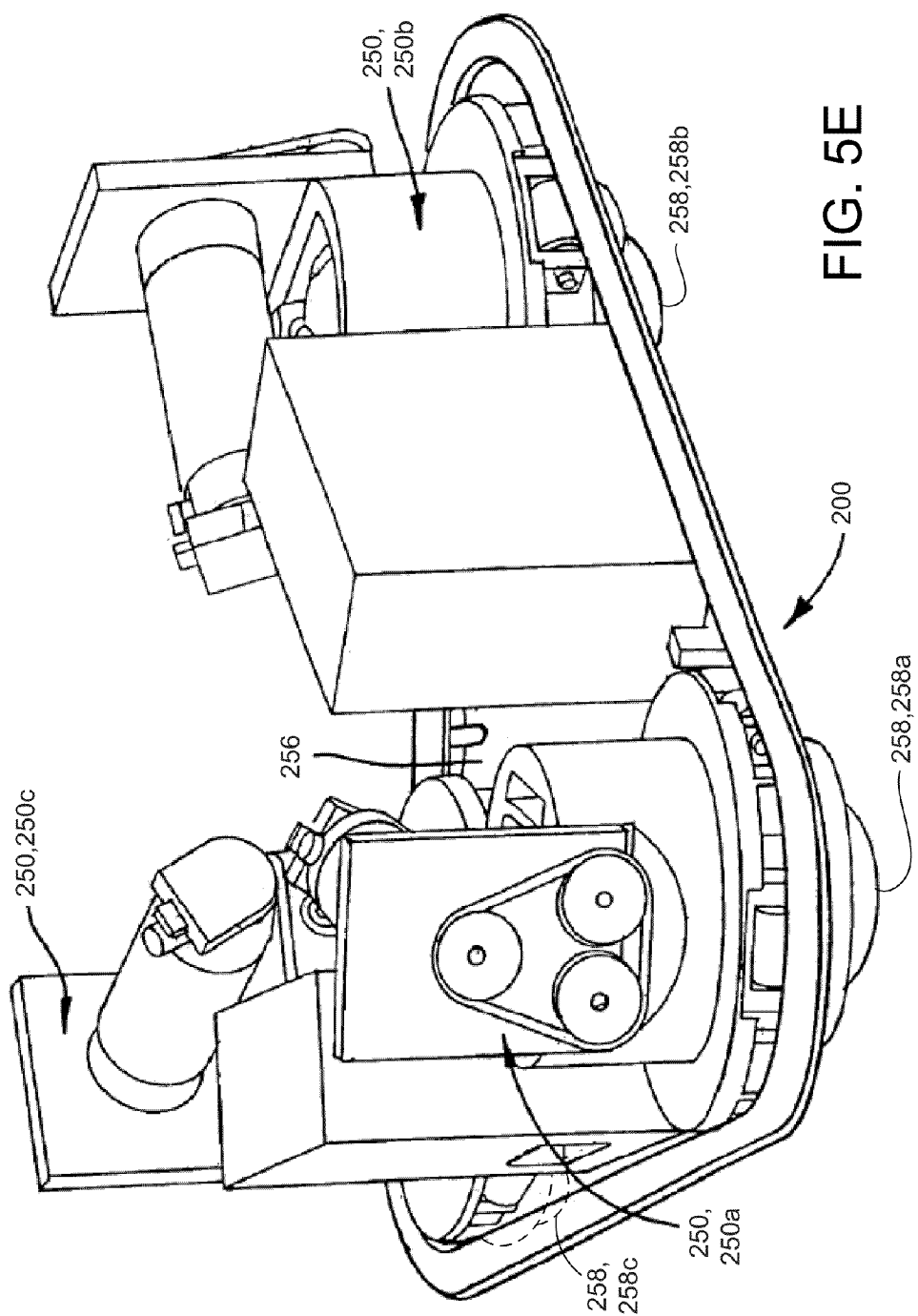
FIG. 5E is a top perspective view of an exemplary holonomic drive system for a mobile human interface robot.

The robot 100 can operate in human environments (e.g., environments typically designed for bipedal, walking occupants) using wheeled mobility. In some implementations, the drive system 200 includes first, second, and third drive wheels 210a, 210b, 210c equally spaced (i.e., trilaterally symmetric) about the vertical axis Z (e.g., 120 degrees apart); however, other arrangements are possible as well. Referring to FIGS. 5A and 5B, the drive wheels 210a, 210b, 210c may define a transverse arcuate rolling surface (i.e., a curved profile in a direction transverse or perpendicular to the rolling direction $D_R$), which may aid maneuverability of the holonomic drive system 200. Each drive wheel 210a, 210b, 210c is coupled to a respective drive motor 220a, 220b, 220c that can drive the drive wheel 210a, 210b, 210c in forward and/or reverse directions independently of the other drive motors 220a, 220b, 220c. Each drive motor 220a-c can have a respective encoder 212 (FIG. 8C), which provides wheel rotation feedback to the controller 500. In some examples, each drive wheels 210a, 210b, 210c is mounted on or near one of the three points of an equilateral triangle and having a drive direction (forward and reverse directions) that is perpendicular to an angle bisector of the respective triangle end. Driving the trilaterally symmetric holonomic base 120 with a forward driving direction F, allows the robot 100 to transition into non forward drive directions for autonomous escape from confinement or clutter and then rotating and/or translating to drive along the forward drive direction F after the escape has been resolved.

Referring to FIGS. 5C and 5D, in some implementations, each drive wheel 210 includes inboard and outboard rows 232, 234 of rollers 230, each have a rolling direction $D_r$, perpendicular to the rolling direction $D_R$ of the drive wheel 210. The rows 232, 234 of rollers 230 can be staggered (e.g., such that one roller 230 of the inboard row 232 is positioned equally between two adjacent rollers 230 of the outboard row 234. The rollers 230 provide infinite slip perpendicular to the drive direction the drive wheel 210. The rollers 230 define an arcuate (e.g., convex) outer surface 235 perpendicular to their rolling directions $D_r$, such that together the rollers 230 define the circular or substantially circular perimeter of the drive wheel 210. The profile of the rollers 230 affects the overall profile of the drive wheel 210. For example, the rollers 230 may define arcuate outer roller surfaces 235 that together define a scalloped rolling surface of the drive wheel 210 (e.g., as treads for traction). However, configuring the rollers 230 to have contours that define a circular overall rolling surface of the drive wheel 210 allows the robot 100 to travel smoothly on a flat surface instead of vibrating vertically with a wheel tread. When approaching an object at an angle, the staggered rows 232, 234 of rollers 230 (with radius r) can be used as treads to climb objects as tall or almost as tall as a wheel radius R of the drive wheel 210.

Referring to FIGS. 5E-5J, in some implementations, the holonomic drive system 200 includes three roller assemblies 250a, 250b, 250c mounted to a base plate 256. Each roller assembly 250a, 250b, 250c has a respective drive ball 258a, 258b, 258c. The roller assemblies 250a, 250b, 250c allow for movement in any direction.

Figure 5F:
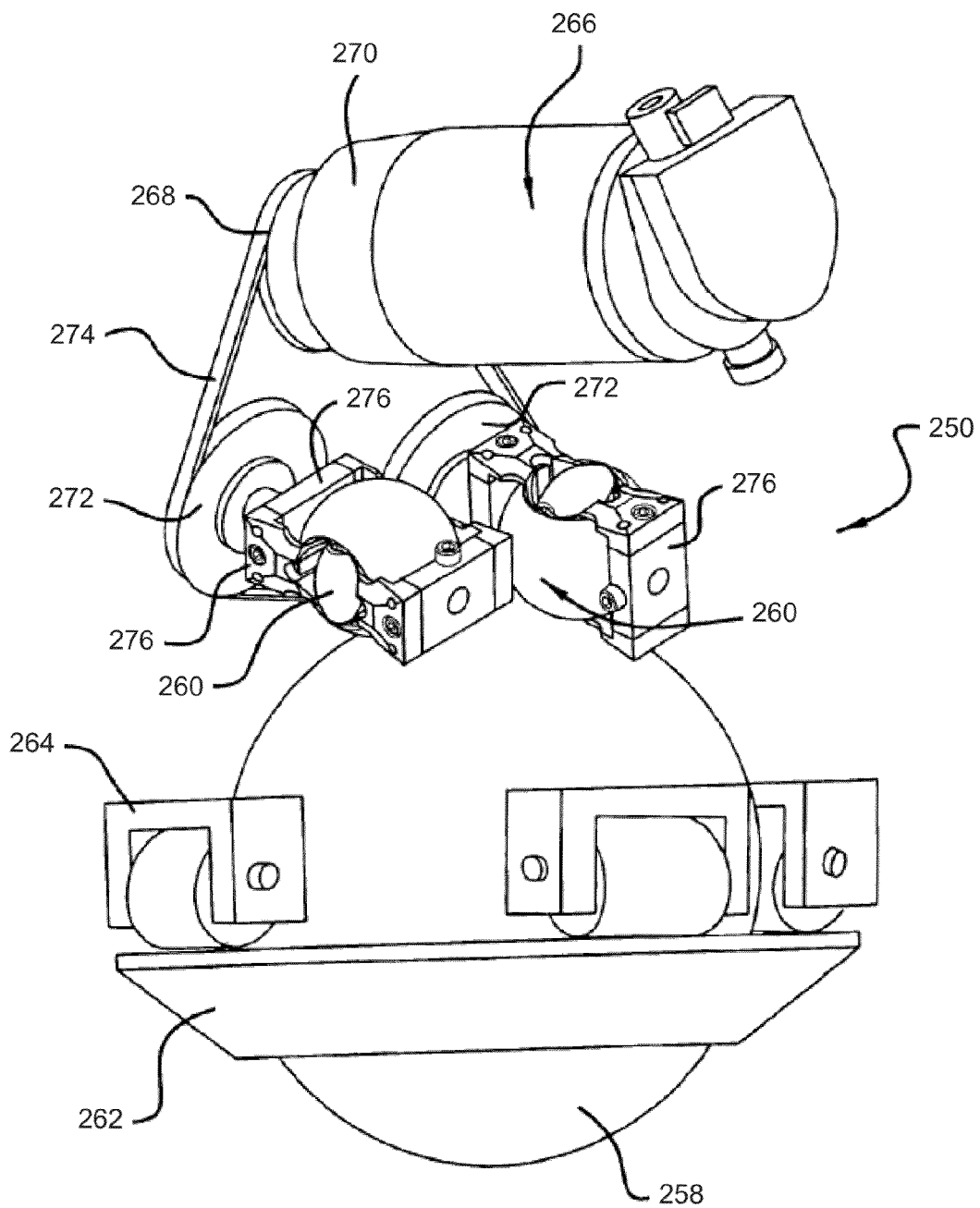
FIG. 5F is a side perspective view of an exemplary roller assembly for a holonomic drive system.

FIG. 5F provides a perspective view of an exemplary roller assembly 250. Each assembly 250 may include a pair of transmission rollers 260 for driving a drive ball 258 as well as a retainer ring 262 and a plurality of bushings 264 that allow the drive ball 258 to rotate while preventing movement in the Z direction. The transmission rollers 260 are coupled to a motor assembly 266, which includes an output pulley 268 attached to a motor 270. A drive belt 274 couples the output pulley 268 to a pair of ball pulleys 272 attached to a transmission bracket 276. The motor assembly 266 receives output signals from the controller 500 that energizes the motor 270 and rotates the output pulley 268.

Rotation of the output pulley 268 rotates the ball pulleys 272 causing the transmission rollers 260 to rotate and spin the drive ball 258 through frictional forces. The transmission rollers 260 may remain in continuous contact with the drive ball 258. Spinning the drive ball 258 moves the robot 100. The bracket 276 allows the transmission rollers 260 to freely spin and allow orthogonal directional passive movement when one of the other roller assemblies 260 is driving and moving the robot 100.

Figure 5G:
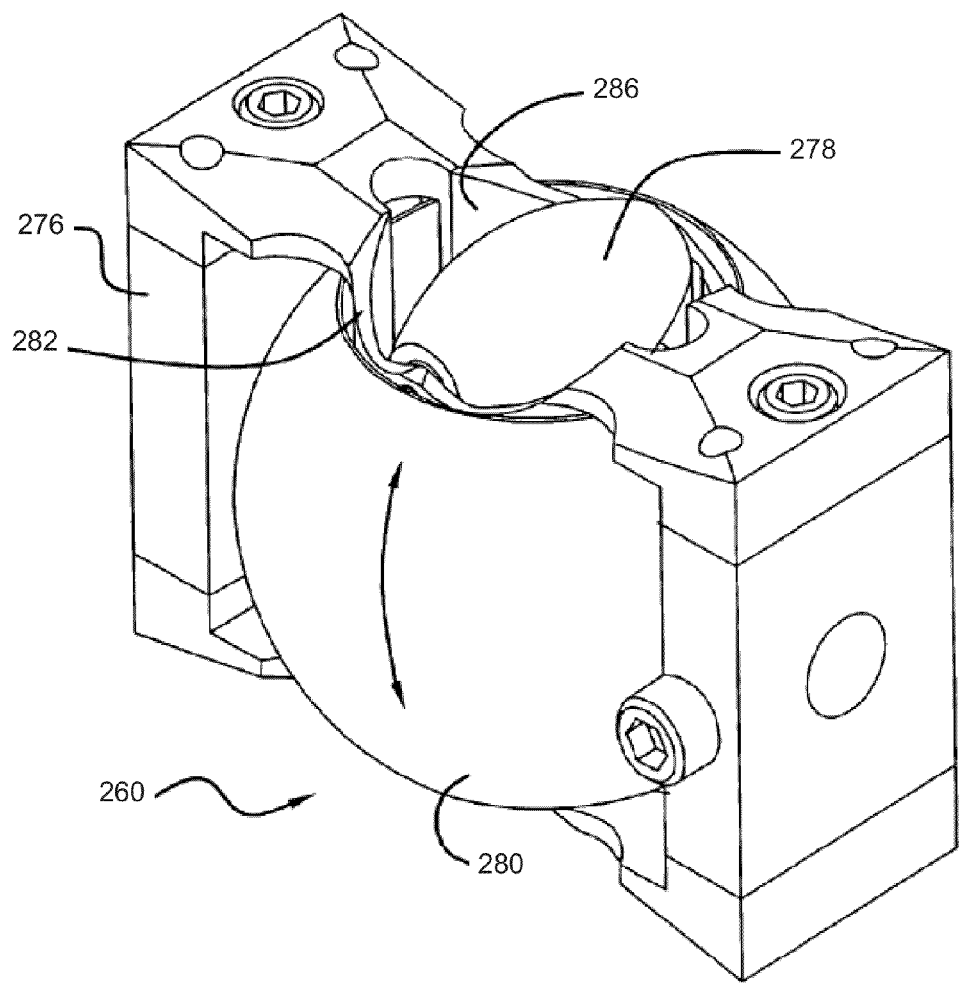
FIG. 5G is a perspective view of an exemplary transmission roller of the roller assembly shown in FIG. 5F.
Figure 5H:
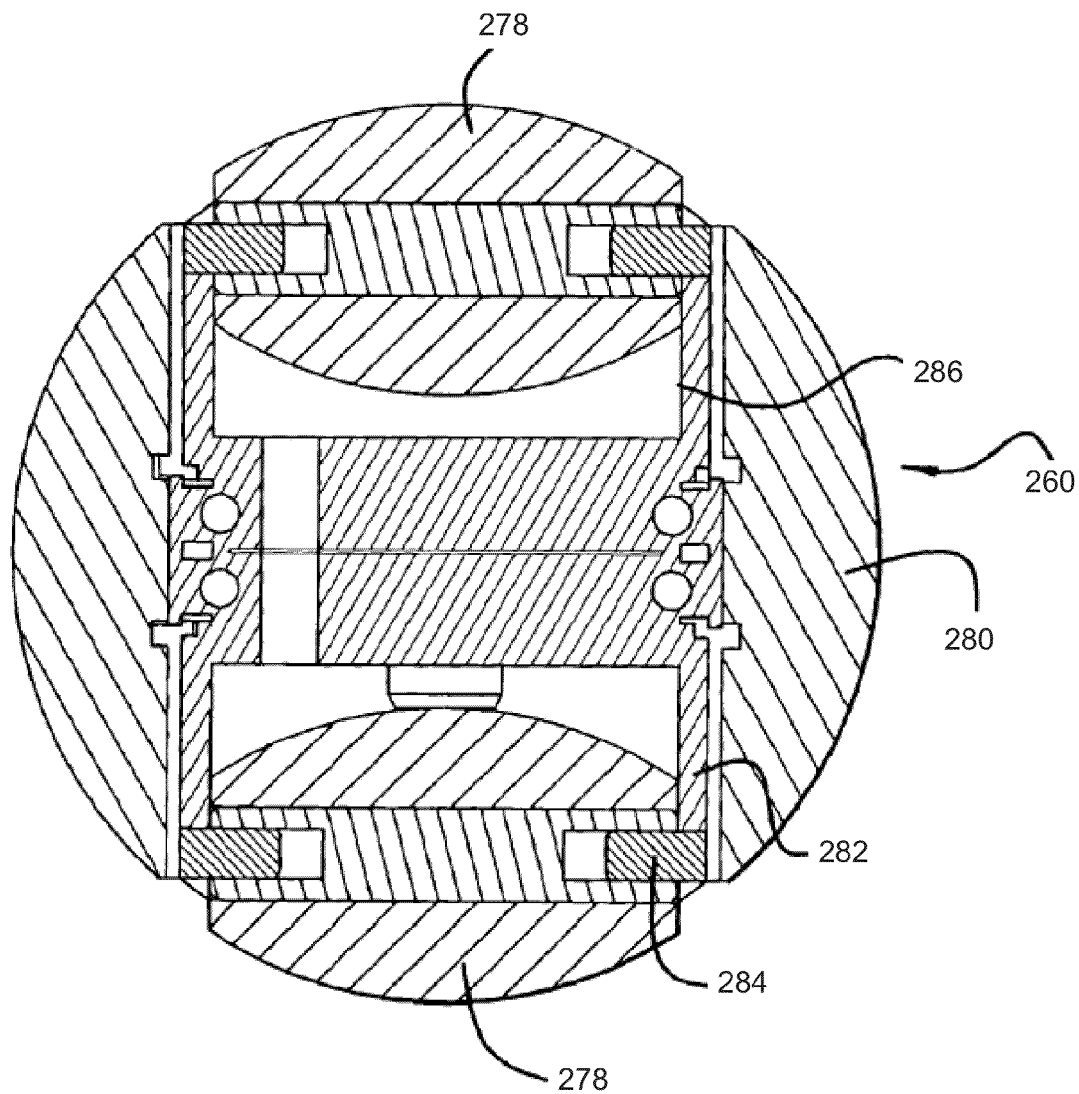
FIG. 5H is a cross-sectional view of the transmission roller shown in FIG. 5G.
Figure 5I:
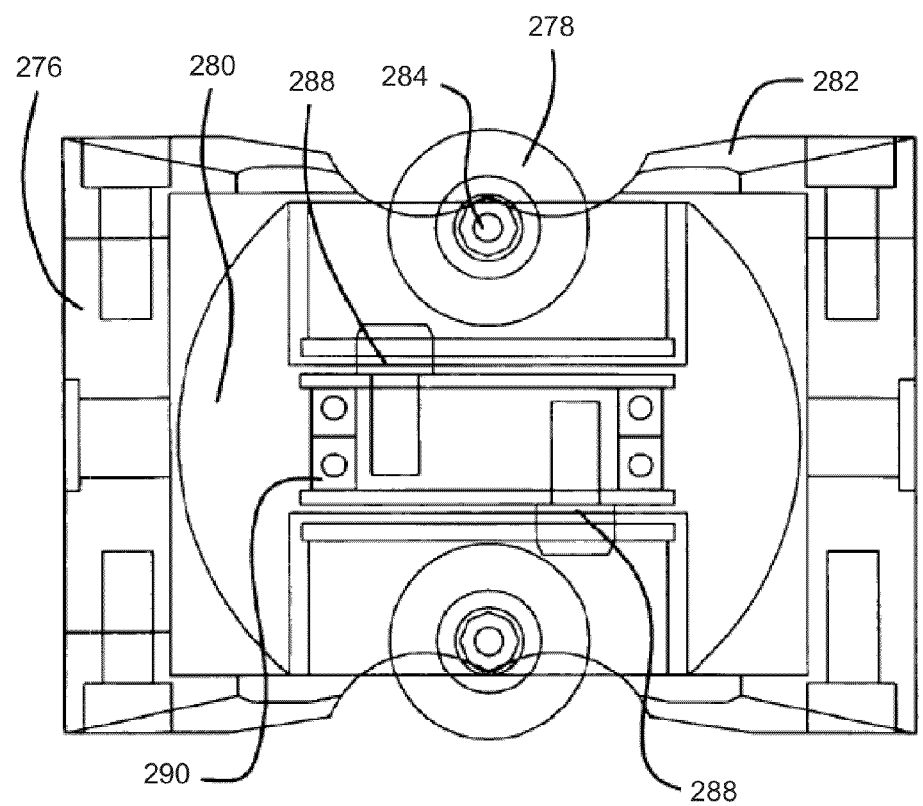
FIG. 5I is a cross-sectional view of the transmission roller shown in FIG. 5G.

FIGS. 5G-5I illustrate an exemplary transmission roller 260. Each transmission roller 260 may include a pair of addendum rollers 278 attached to a primary roller 280. The addendum rollers 278 may be attached to extension plates 282 of the bracket 276 by pins 284. The extension plates 282 of the bracket 276 may extend into an inner bore 286 of the primary roller 278 and be attached within the roller 278 by fasteners 288. The transmission roller 260 may have bearings 290 that allow the primary roller 280 to roll while the bracket 272 is stationary.

Figure 5J:
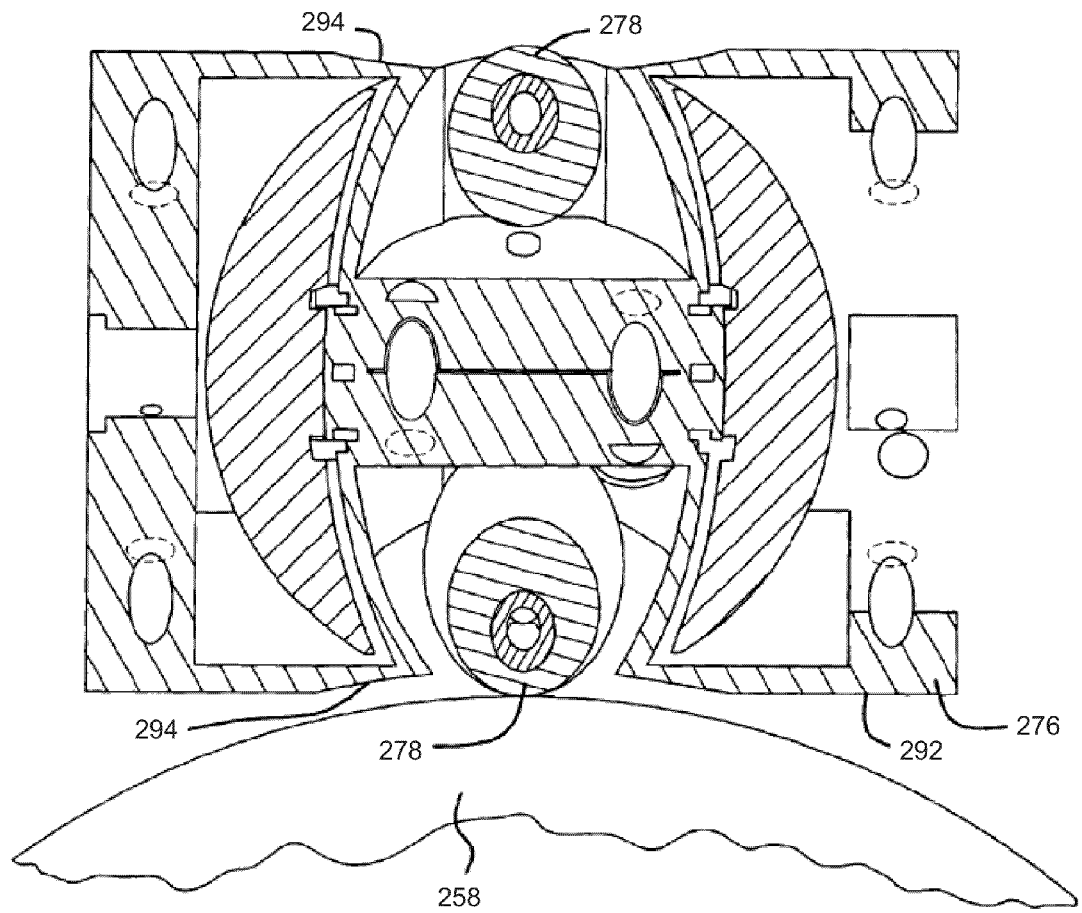
FIG. 5J is a cross-sectional view of the transmission roller in contact with a drive ball.

As shown in FIG. 5J, the addendum rollers 278 may extend beyond an outer surface 292 of the bracket 276 so that the primary rollers 278 are in contact with the drive ball 258. The bracket 276 may define a pair of grooves 294 having a radius that provides a sufficient clearance between the drive ball 258 and the bracket outer surface 292. Alternatively, the grooves 294 may have a radius so that the addendum rollers 278 may be placed at or below the outer bracket surface 290 and still not have interference between the bracket 276 and the drive ball 258.

Referring again to FIG. 5G, the transmission roller 260 can be rotated as indicated by the arrows. Either the primary roller 280, or one of the addendum rollers 278, may be in continuous contact with the drive ball 258 (not shown in FIG. 5G). Consequently, the transmission rollers 260 can be in continuous contact with the drive ball 258. In the example shown, the roller assemblies 250 fail to incur impact forces or phase changing wobble issues. Moreover, a relatively compliant drive ball 258 may be used to further reduce impact forces.

In the examples shown in FIGS. 3-5B, the first drive wheel 210a is arranged as a leading drive wheel along the forward drive direction F with the remaining two drive wheels 210b, 210c trailing behind. In this arrangement, to drive forward, the controller 500 may issue a drive command that causes the second and third drive wheels 210b, 210c to drive in a forward rolling direction at an equal rate while the first drive wheel 210a slips along the forward drive direction F. Moreover, this drive wheel arrangement allows the robot 100 to stop short (e.g., incur a rapid negative acceleration against the forward drive direction F). This is due to the natural dynamic instability of the three wheeled design. If the forward drive direction F were along an angle bisector between two forward drive wheels, stopping short would create a torque that would force the robot 100 to fall, pivoting over its two "front" wheels. Instead, travelling with one drive wheel 210a forward naturally supports or prevents the robot 100 from toppling over forward, if there is need to come to a quick stop. When accelerating from a stop, however, the controller 500 may take into account a moment of inertia I of the robot 100 from its overall center of gravity $CG_R$.

In some implementations of the drive system 200, each drive wheel 210a, 210b, 210 has a rolling direction $D_R$ radially aligned with a vertical axis Z, which is orthogonal to X and Y axes of the robot 100. The first drive wheel 210a can be arranged as a leading drive wheel along the forward drive direction F with the remaining two drive wheels 210b, 210c trailing behind. In this arrangement, to drive forward, the controller 500 may issue a drive command that causes the first drive wheel 210a to drive in a forward rolling direction and the second and third drive wheels 210b, 210c to drive at an equal rate as the first drive wheel 210a, but in a reverse direction.

In other implementations, the drive system 200 can be arranged to have the first and second drive wheels 210a, 210b positioned such that an angle bisector of an angle between the two drive wheels 210a, 210b is aligned with the forward drive direction F of the robot 100. In this arrangement, to drive forward, the controller 500 may issue a drive command that causes the first and second drive wheels 210a, 210b to drive in a forward rolling direction and an equal rate, while the third drive wheel 210c drives in a reverse direction or remains idle and is dragged behind the first and second drive wheels 210a, 210b. To turn left or right while driving forward, the controller 500 may issue a command that causes the corresponding first or second drive wheel 210a, 210b to drive at relatively quicker/slower rate. Other drive system 200 arrangements can be used as well. The drive wheels 210a, 210b, 210c may define a cylindrical, circular, elliptical, or polygonal profile.

Figure 10A:
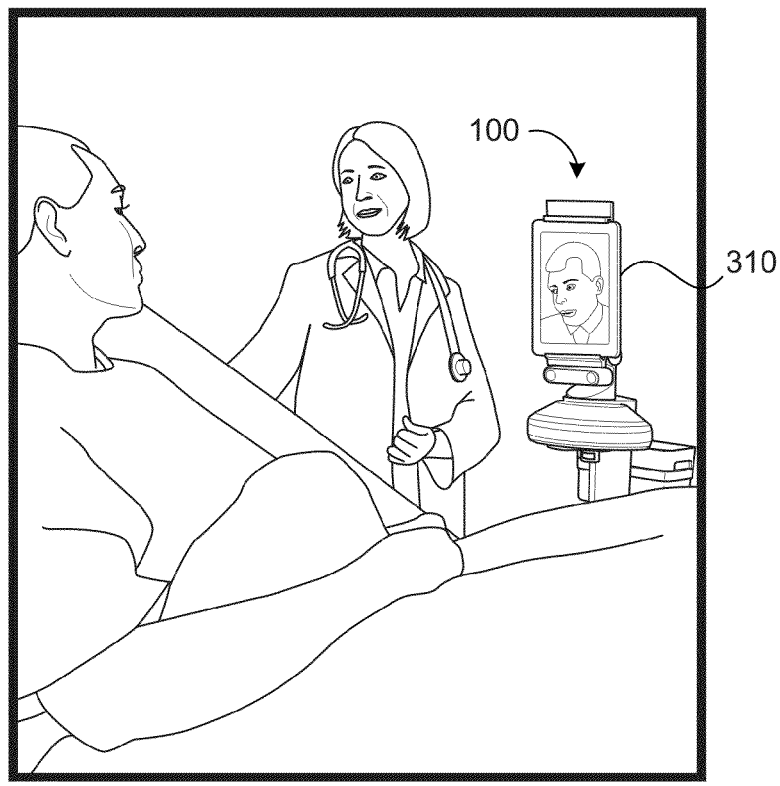
FIGS. 10A-10E perspective views of people interacting with an exemplary mobile human interface robot.

Referring again to FIGS. 1-3, the base 120 supports at least one leg 130 extending upward in the Z direction from the base 120. The leg(s) 130 may be configured to have a variable height for raising and lowering the torso 140 with respect to the base 120. In some implementations, each leg 130 includes first and second leg portions 132, 134 that move with respect to each other (e.g., telescopic, linear, and/or angular movement). Rather than having extrusions of successively smaller diameter telescopically moving in and out of each other and out of a relatively larger base extrusion, the second leg portion 134, in the examples shown, moves telescopically over the first leg portion 132, thus allowing other components to be placed along the second leg portion 134 and potentially move with the second leg portion 134 to a relatively close proximity of the base 120. The leg 130 may include an actuator assembly 136 (FIG. 10C) for moving the second leg portion 134 with respect to the first leg portion 132. The actuator assembly 136 may include a motor driver 138a in communication with a lift motor 138b and an encoder 138c, which provides position feedback to the controller 500.

Generally, telescopic arrangements include successively smaller diameter extrusions telescopically moving up and out of relatively larger extrusions at the base 120 in order to keep a center of gravity $CG_L$ of the entire leg 130 as low as possible. Moreover, stronger and/or larger components can be placed at the bottom to deal with the greater torques that will be experienced at the base 120 when the leg 130 is fully extended. This approach, however, offers two problems. First, when the relatively smaller components are placed at the top of the leg 130, any rain, dust, or other particulate will tend to run or fall down the extrusions, infiltrating a space between the extrusions, thus obstructing nesting of the extrusions. This creates a very difficult sealing problem while still trying to maintain full mobility/articulation of the leg 130. Second, it may be desirable to mount payloads or accessories on the robot 100. One common place to mount accessories is at the top of the torso 140. If the second leg portion 134 moves telescopically in and out of the first leg portion, accessories and components could only be mounted above the entire second leg portion 134, if they need to move with the torso 140. Otherwise, any components mounted on the second leg portion 134 would limit the telescopic movement of the leg 130.

By having the second leg portion 134 move telescopically over the first leg portion 132, the second leg portion 134 provides additional payload attachment points that can move vertically with respect to the base 120. This type of arrangement causes water or airborne particulate to run down the torso 140 on the outside of every leg portion 132, 134 (e.g., extrusion) without entering a space between the leg portions 132, 134. This greatly simplifies sealing any joints of the leg 130. Moreover, payload/accessory mounting features of the torso 140 and/or second leg portion 134 are always exposed and available no matter how the leg 130 is extended.

Figure 3:
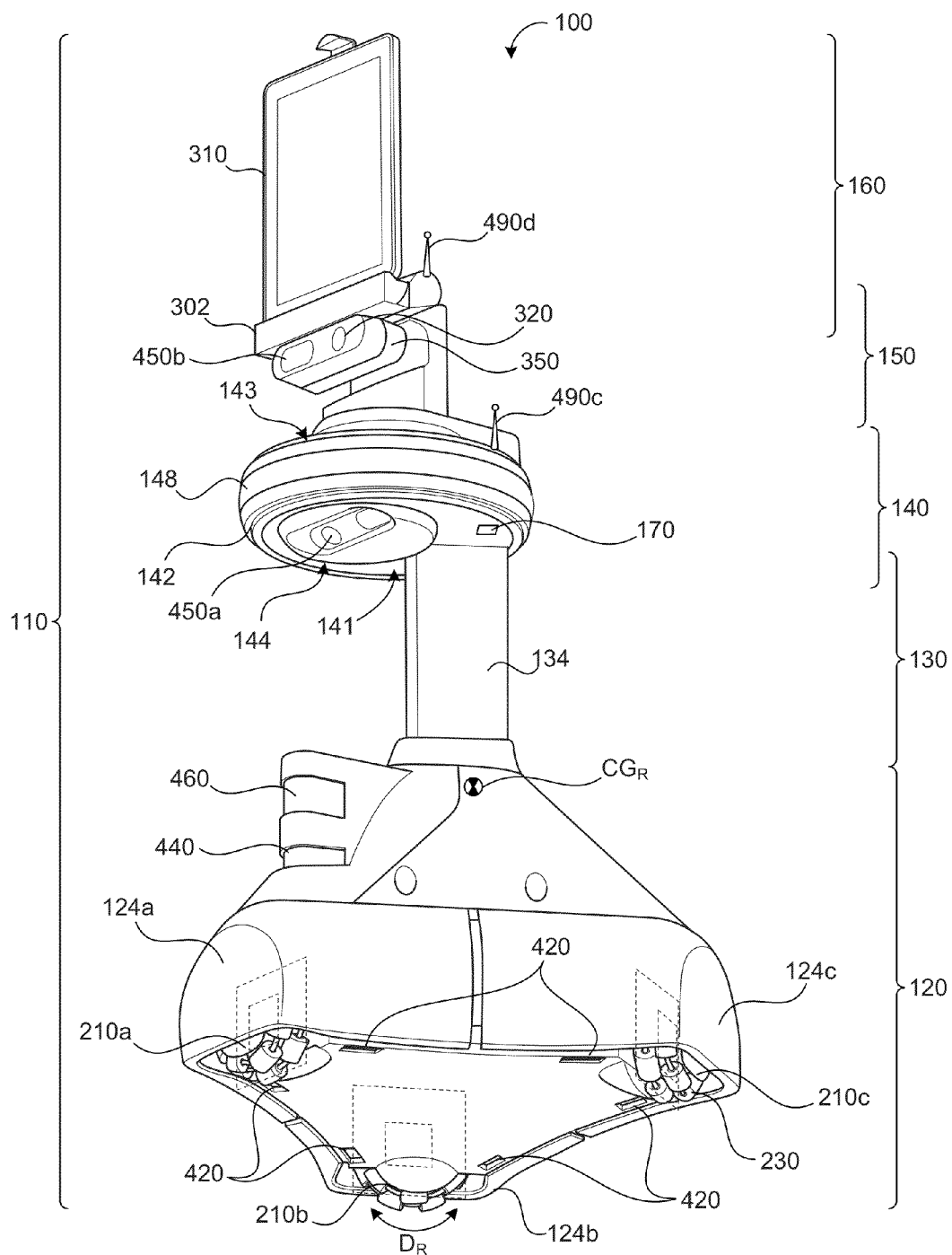
FIG. 3 is an elevated perspective view of an exemplary mobile human interface robot.
Figure 6:
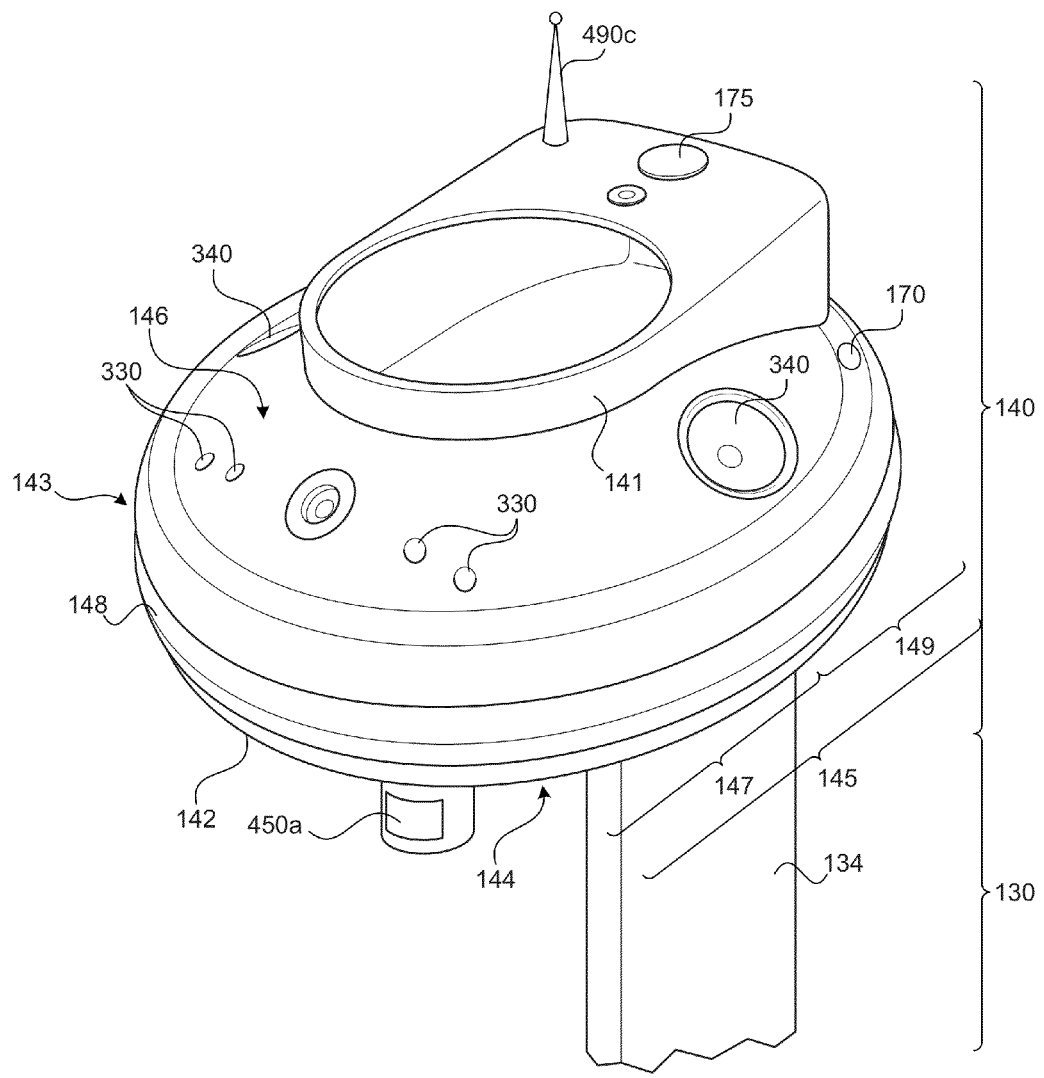
FIG. 6 is a front perspective view of an exemplary torso for a mobile human interface robot.
Figure 7:
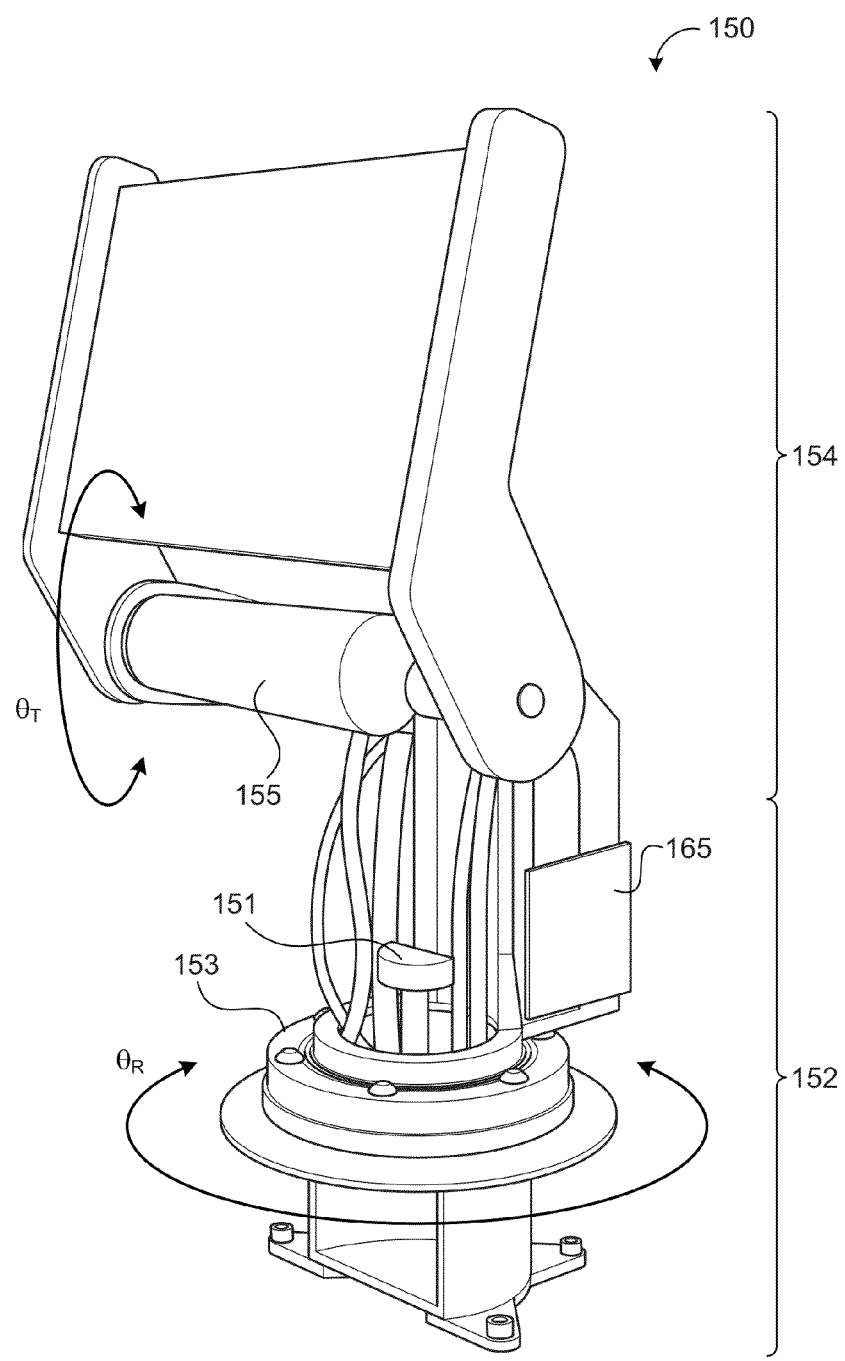
FIG. 7 is a front perspective view of an exemplary neck for a mobile human interface robot.

Referring to FIGS. 3 and 6, the leg(s) 130 support the torso 140, which may have a shoulder 142 extending over and above the base 120. In the example shown, the torso 140 has a downward facing or bottom surface 144 (e.g., toward the base) forming at least part of the shoulder 142 and an opposite upward facing or top surface 146, with a side surface 148 extending therebetween. The torso 140 may define various shapes or geometries, such as a circular or an elliptical shape having a central portion 141 supported by the leg(s) 130 and a peripheral free portion 143 that extends laterally beyond a lateral extent of the leg(s) 130, thus providing an overhanging portion that defines the downward facing surface 144. In some examples, the torso 140 defines a polygonal or other complex shape that defines a shoulder, which provides an overhanging portion that extends beyond the leg(s) 130 over the base 120.

The robot 100 may include one or more accessory ports 170 (e.g., mechanical and/or electrical interconnect points) for receiving payloads. The accessory ports 170 can be located so that received payloads do not occlude or obstruct sensors of the sensor system 400 (e.g., on the bottom and/or top surfaces 144, 146 of the torso 140, etc.). In some implementations, as shown in FIG. 6, the torso 140 includes one or more accessory ports 170 on a rearward portion 149 of the torso 140 for receiving a payload in the basket 340, for example, and so as not to obstruct sensors on a forward portion 147 of the torso 140 or other portions of the robot body 110.

Referring again to FIGS. 1-3 and 7, the torso 140 supports the neck 150, which provides panning and tilting of the head 160 with respect to the torso 140. In the examples shown, the neck 150 includes a rotator 152 and a tilter 154. The rotator 152 may provide a range of angular movement $\theta_R$ (e.g., about the Z axis) of between about 90° and about 360°. Other ranges are possible as well. Moreover, in some examples, the rotator 152 includes electrical connectors or contacts that allow continuous 360° rotation of the head 150 with respect to the torso 140 in an unlimited number of rotations while maintaining electrical communication between the head 150 and the remainder of the robot 100. The tilter 154 may include the same or similar electrical connectors or contacts allow rotation of the head 150 with respect to the torso 140 while maintaining electrical communication between the head 150 and the remainder of the robot 100. The rotator 152 may include a rotator motor 151 coupled to or engaging a ring 153 (e.g., a toothed ring rack). The tilter 154 may move the head at an angle $\theta_T$ (e.g., about the Y axis) with respect to the torso 140 independently of the rotator 152. In some examples that tilter 154 includes a tilter motor 155, which moves the head 150 between an angle $\theta_T$ of ±90° with respect to Z-axis. Other ranges are possible as well, such as ±45°, etc. The robot 100 may be configured so that the leg(s) 130, the torso 140, the neck 150, and the head 160 stay within a perimeter of the base 120 for maintaining stable mobility of the robot 100. In the exemplary circuit schematic shown in FIG. 10F, the neck 150 includes a pan-tilt assembly 151 that includes the rotator 152 and a tilter 154 along with corresponding motor drivers 156a, 156b and encoders 158a, 158b.

The head 160 may be sensitive to contact or touching by a user, so as to receive touch commands from the user. For example, when the user pulls the head 160 forward, the head 160 tilts forward with passive resistance and then holds the position. More over, if the user pushes/pulls the head 160 vertically downward, the torso 140 may lower (via a reduction in length of the leg 130) to lower the head 160. The head 160 and/or neck 150 may include strain gauges and/or contact sensors 165 (FIG. 7) that sense user contact or manipulation.

Figure 8A:
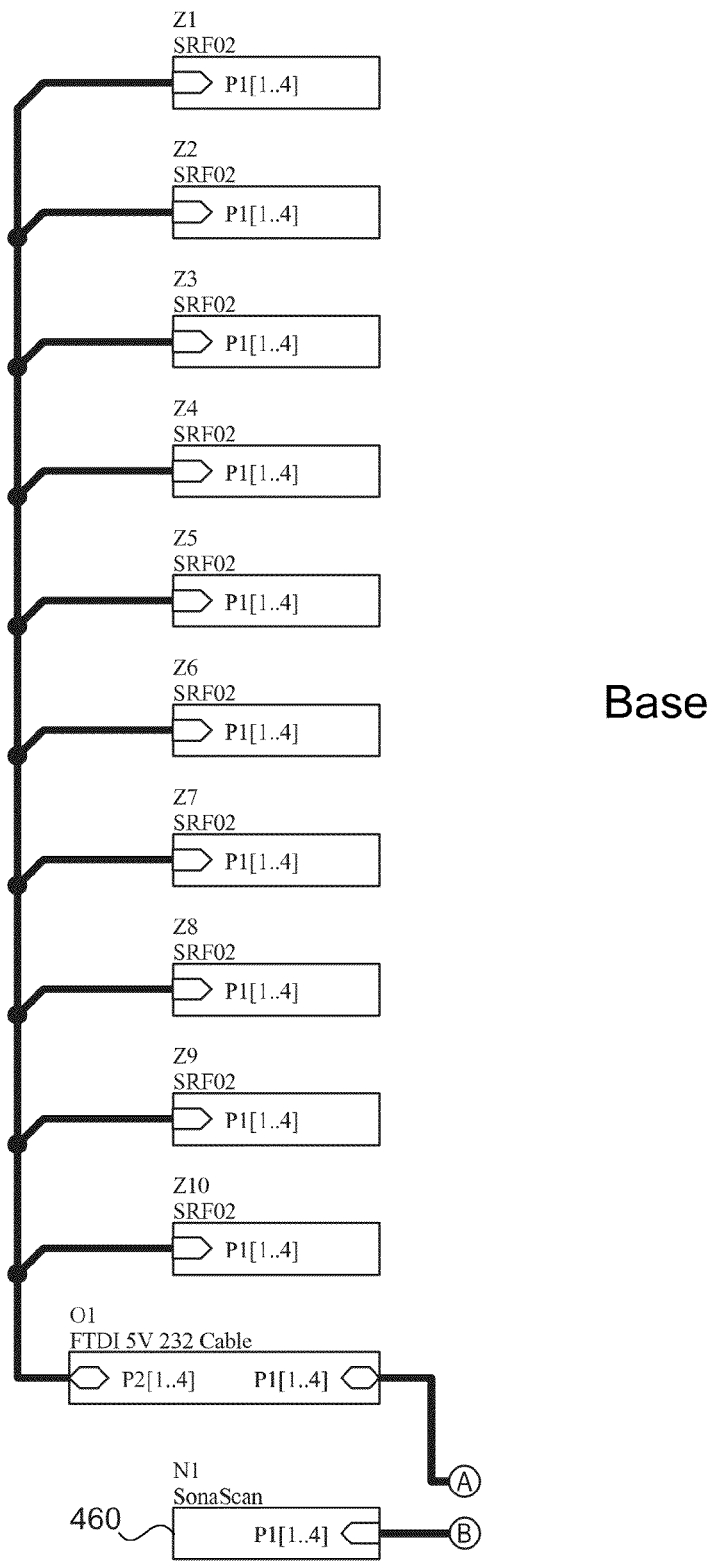
FIGS. 8A-8G are schematic views of exemplary circuitry for a mobile human interface robot.
Figure 8B:
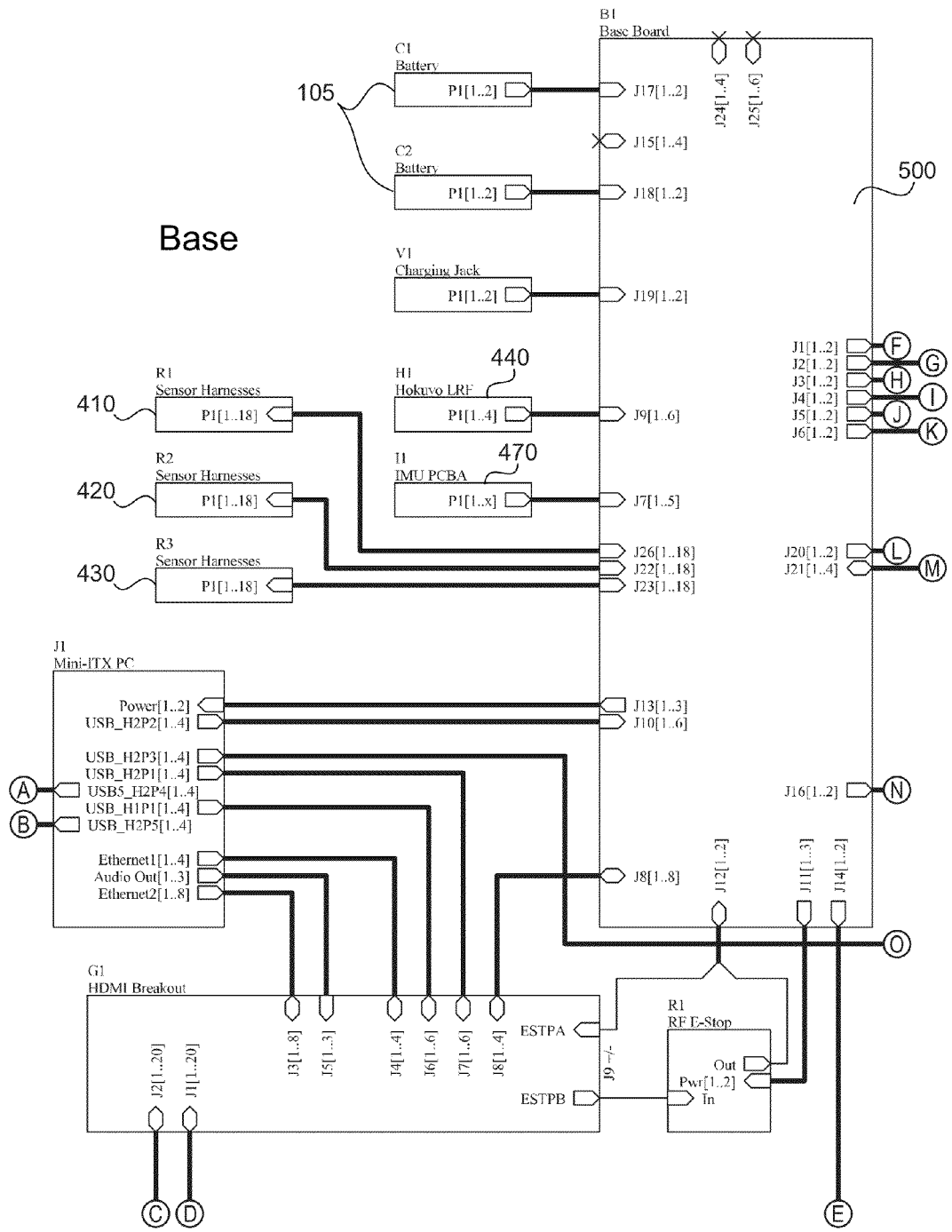
Figure 8C:
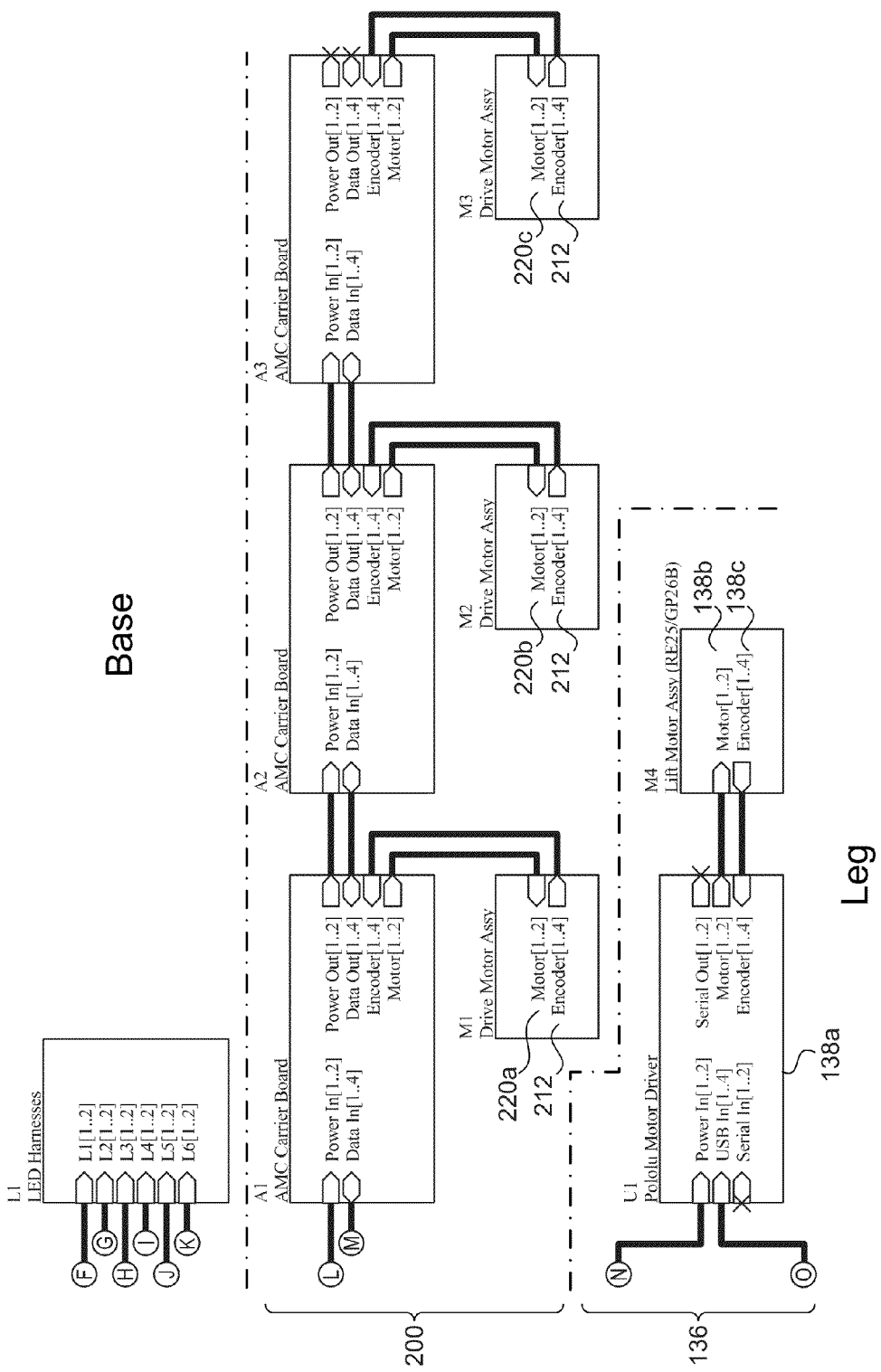
Figure 8D:
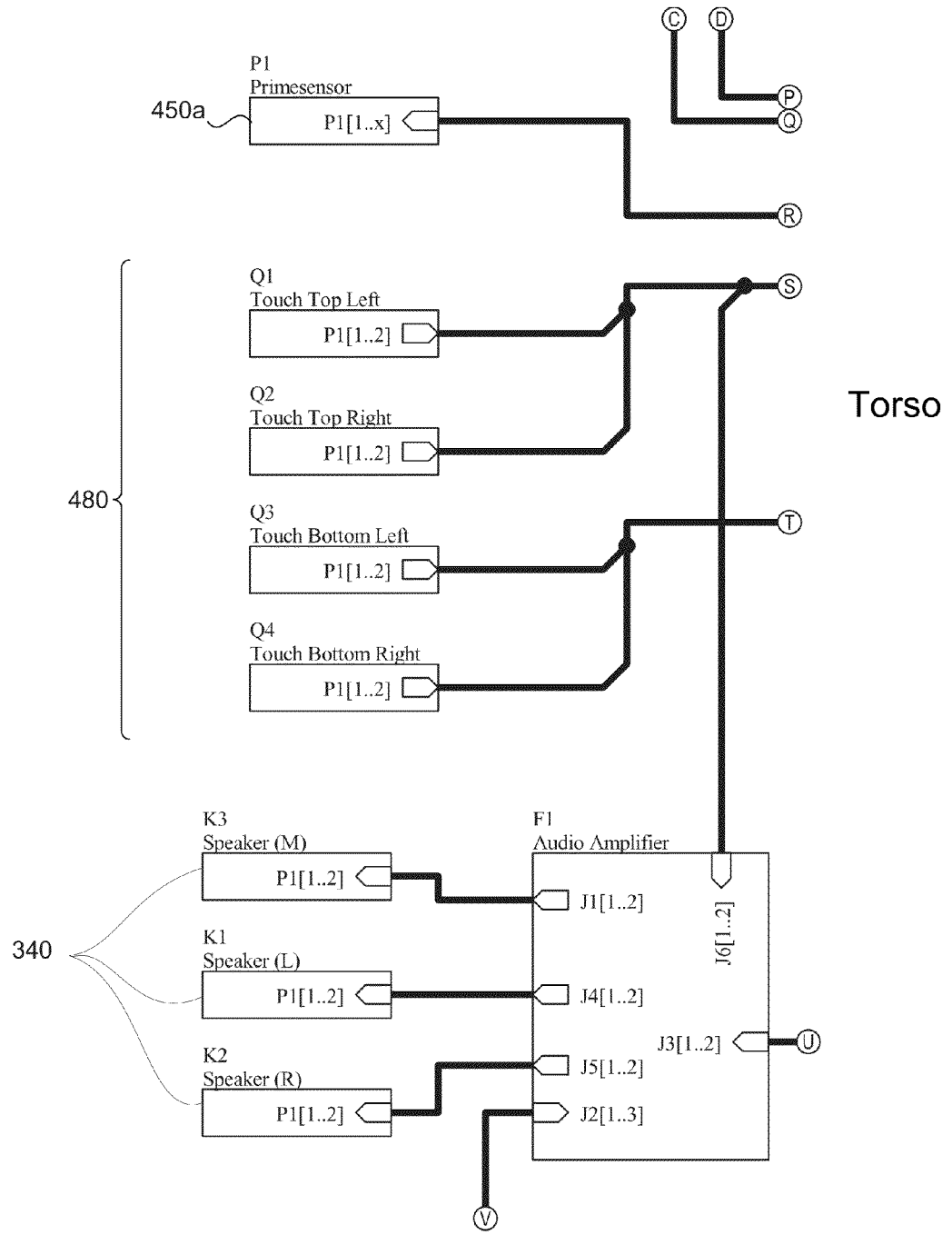
Figure 8E:
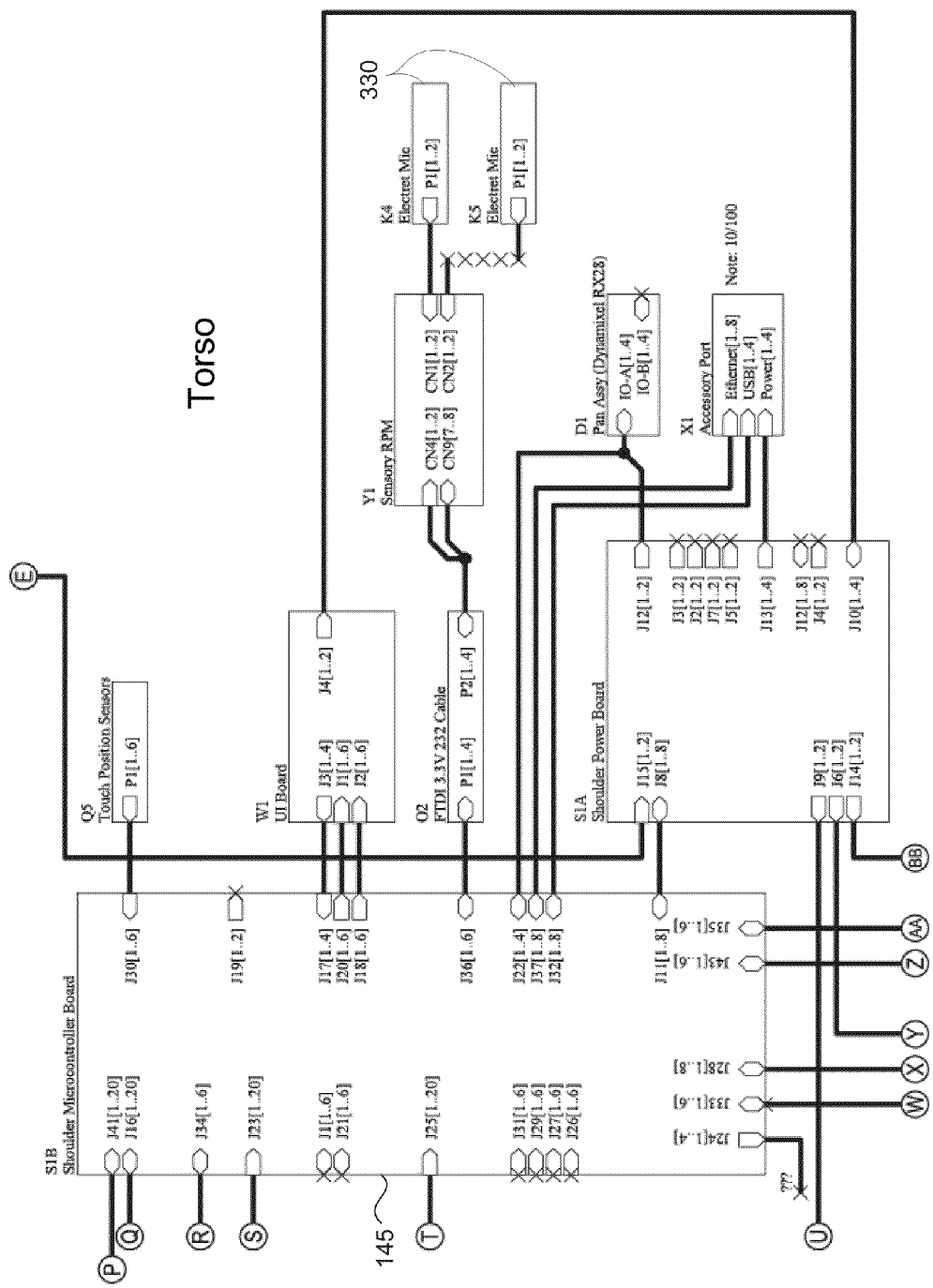
Figure 8F:
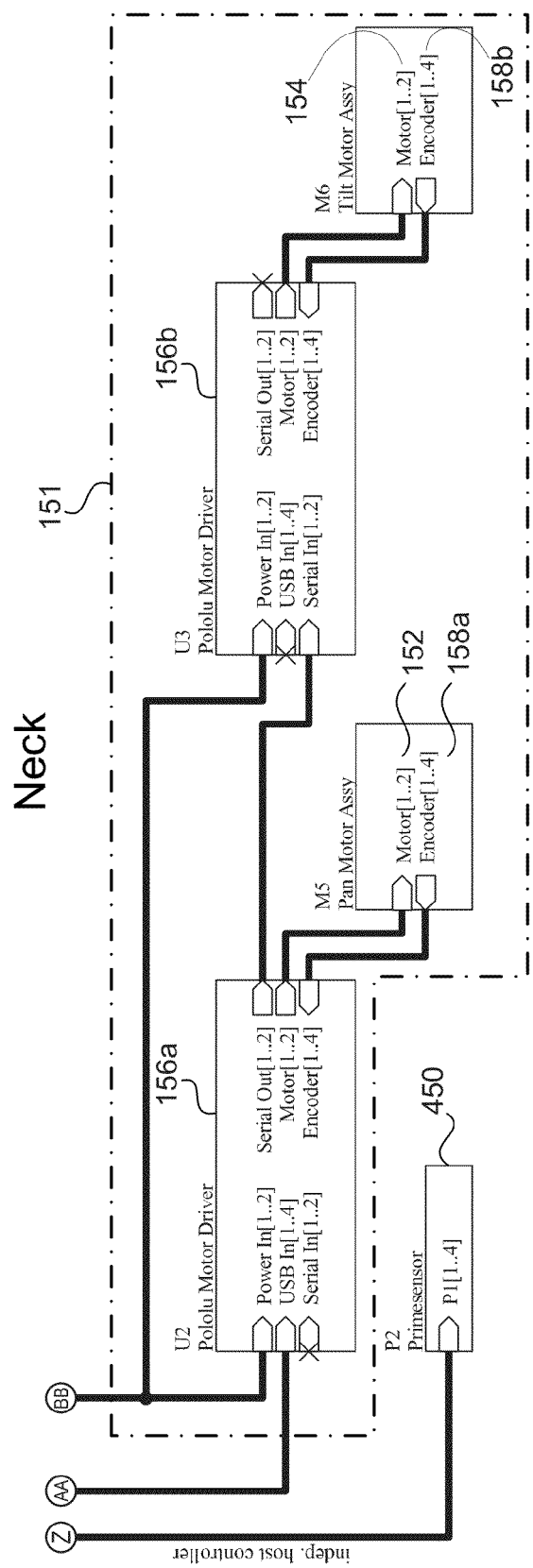
Figure 8G:
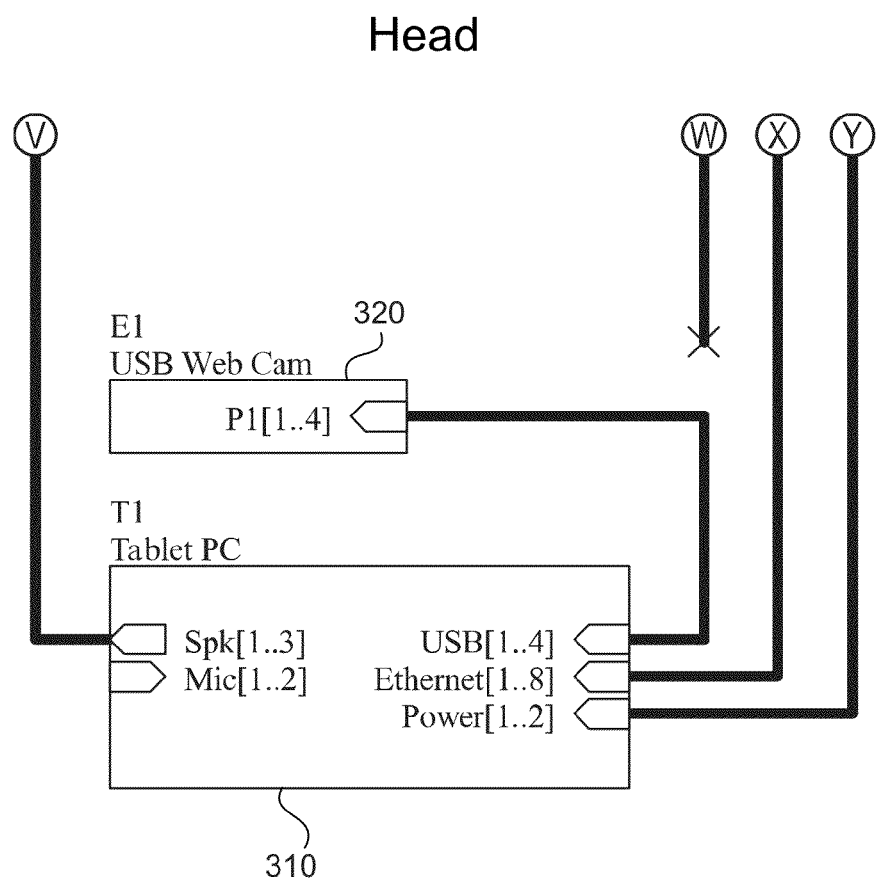

FIGS. 8A-8G provide exemplary schematics of circuitry for the robot 100. FIGS. 8A-8C provide exemplary schematics of circuitry for the base 120, which may house the proximity sensors, such as the sonar proximity sensors 410 and the cliff proximity sensors 420, contact sensors 430, the laser scanner 440, the sonar scanner 460, and the drive system 200. The base 120 may also house the controller 500, the power source 105, and the leg actuator assembly 136. The torso 140 may house a microcontroller 145, the microphone(s) 330, the speaker(s) 340, the scanning 3-D image sensor 450a, and a torso touch sensor system 480, which allows the controller 500 to receive and respond to user contact or touches (e.g., as by moving the torso 140 with respect to the base 120, panning and/or tilting the neck 150, and/or issuing commands to the drive system 200 in response thereto). The neck 150 may house a pan-tilt assembly 151 that may include a pan motor 152 having a corresponding motor driver 156a and encoder 138a, and a tilt motor 154 152 having a corresponding motor driver 156b and encoder 138b. The head 160 may house one or more web pads 310 and a camera 320.

Figure 9:
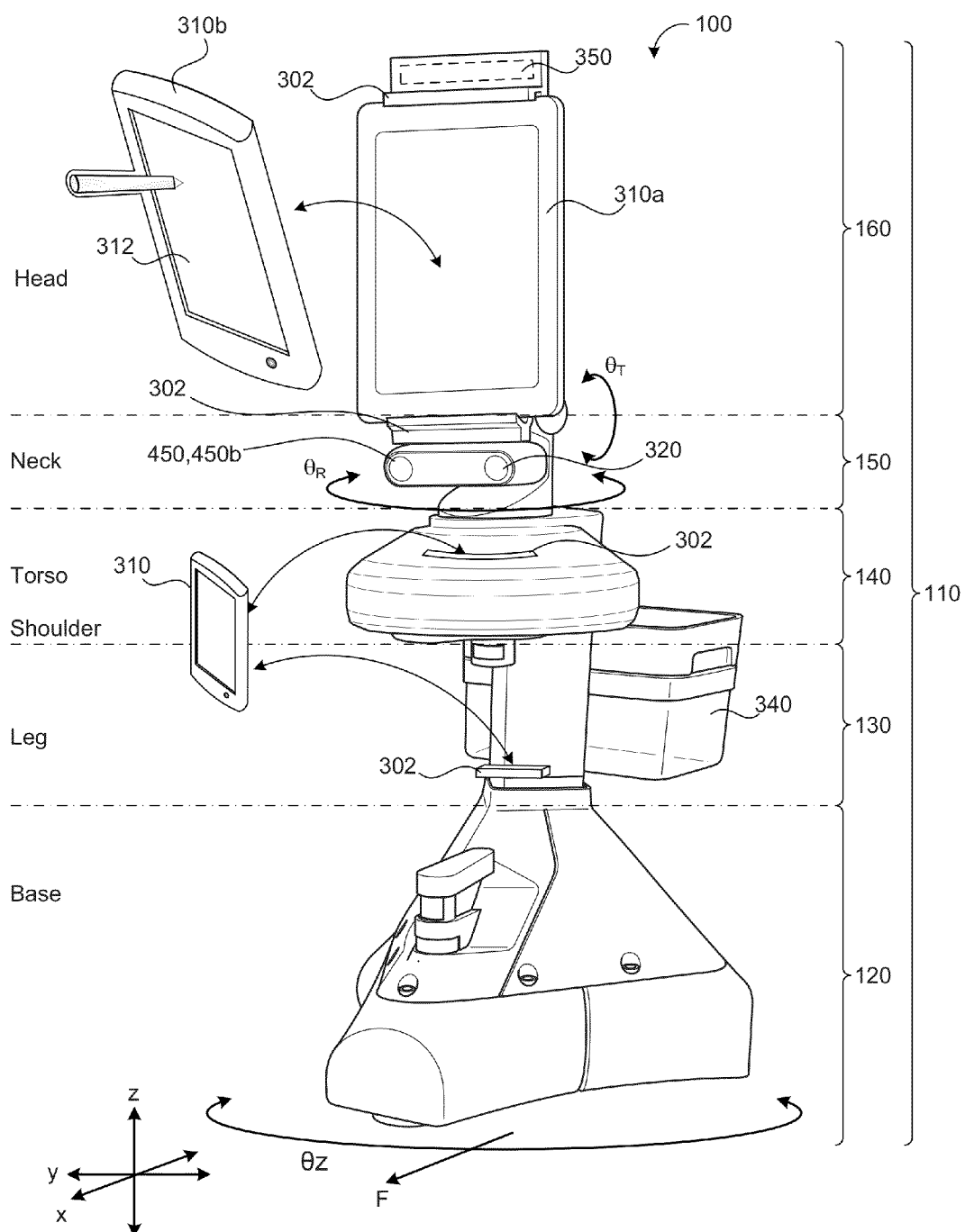
FIG. 9 is a perspective view of an exemplary mobile human interface robot having detachable web pads.

With reference to FIGS. 1-3 and 9, in some implementations, the head 160 supports one or more portions of the interfacing module 300. The head 160 may include a dock 302 for releasably receiving one or more computing tablets 310, also referred to as a web pad or a tablet PC, each of which may have a touch screen 312. The web pad 310 may be oriented forward, rearward or upward. In some implementations, web pad 310 includes a touch screen, optional I/O (e.g., buttons and/or connectors, such as micro-USB, etc.) a processor, and memory in communication with the processor. An exemplary web pad 310 includes the Apple iPad is by Apple, Inc. In some examples, the web pad and 10 functions as the controller 500 or assist the controller 500 and controlling the robot 100. In some examples, the dock 302 includes a first computing tablet 310a fixedly attached thereto (e.g., a wired interface for data transfer at a relatively higher bandwidth, such as a gigabit rate) and a second computing tablet 310b removably connected thereto. The second web pad 310b may be received over the first web pad 310a as shown in FIG. 9, or the second web pad 310b may be received on an opposite facing side or other side of the head 160 with respect to the first web pad 310a. In additional examples, the head 160 supports a single web pad 310, which may be either fixed or removably attached thereto. The touch screen 312 may detected, monitor, and/or reproduce points of user touching thereon for receiving user inputs and providing a graphical user interface that is touch interactive. In some examples, the web pad 310 includes a touch screen caller that allows the user to find it when it has been removed from the robot 100.

In some implementations, the robot 100 includes multiple web pad docks 302 on one or more portions of the robot body 110. In the example shown in FIG. 9, the robot 100 includes a web pad dock 302 optionally disposed on the leg 130 and/or the torso 140. This allows the user to dock a web pad 310 at different heights on the robot 100, for example, to accommodate users of different height, capture video using a camera of the web pad 310 in different vantage points, and/or to receive multiple web pads 310 on the robot 100.

The interfacing module 300 may include a camera 320 disposed on the head 160 (see e.g., FIG. 2), which can be used to capture video from elevated vantage point of the head 160 (e.g., for videoconferencing). In the example shown in FIG. 3, the camera 320 is disposed on the neck 150. In some examples, the camera 320 is operated only when the web pad 310, 310a is detached or undocked from the head 160. When the web pad 310, 310a is attached or docked on the head 160 in the dock 302 (and optionally covering the camera 320), the robot 100 may use a camera of the web pad 310a for capturing video. In such instances, the camera 320 may be disposed behind the docked web pad 310 and enters an active state when the web pad 310 is detached or undocked from the head 160 and an inactive state when the web pad 310 is attached or docked on the head 160.

The robot 100 can provide videoconferencing (e.g., at 24 fps) through the interface module 300 (e.g., using a web pad 310, the camera 320, the microphones 320, and/or the speakers 340). The videoconferencing can be multiparty. The robot 100 can provide eye contact between both parties of the videoconferencing by maneuvering the head 160 to face the user. Moreover, the robot 100 can have a gaze angle of <5 degrees (e.g., an angle away from an axis normal to the forward face of the head 160). At least one 3-D image sensor 450 and/or the camera 320 on the robot 100 can capture life size images including body language. The controller 500 can synchronize audio and video (e.g., with the difference of <50 ms). In the example shown in FIGS. 10A-10E, robot 100 can provide videoconferencing for people standing or sitting by adjusting the height of the web pad 310 on the head 160 and/or the camera 320 (by raising or lowering the torso 140) and/or panning and/or tilting the head 160. The camera 320 may be movable within at least one degree of freedom separately from the web pad 310. In some examples, the camera 320 has an objective lens positioned more than 3 feet from the ground, but no more than 10 percent of the web pad height from a top edge of a display area of the web pad 310. Moreover, the robot 100 can zoom the camera 320 to obtain close-up pictures or video about the robot 100. The head 160 may include one or more speakers 340 so as to have sound emanate from the head 160 near the web pad 310 displaying the videoconferencing.

Figure 10B:
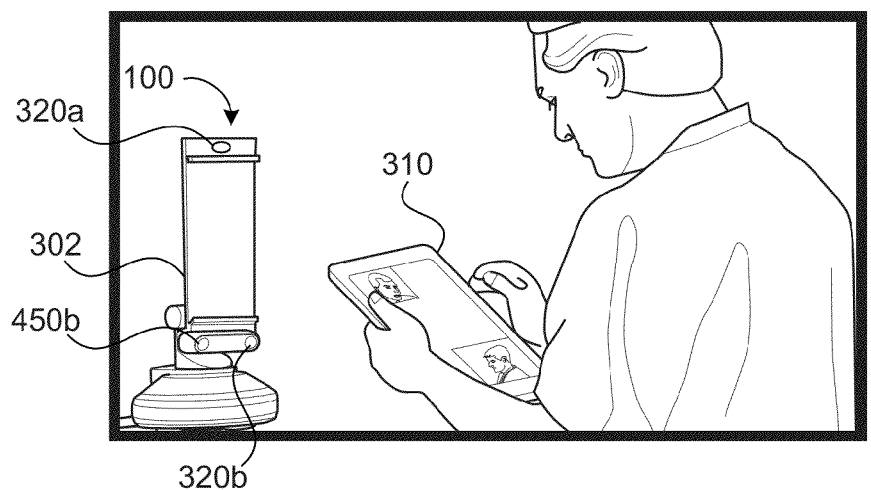
Figure 10C:
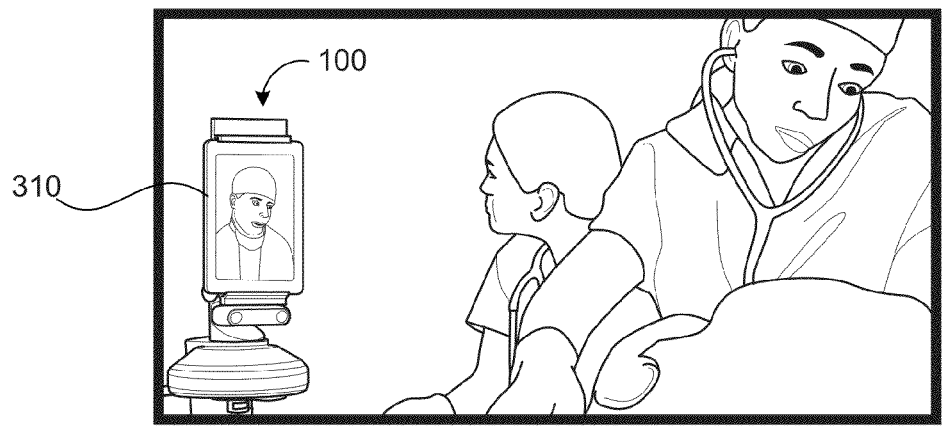
Figure 10D:
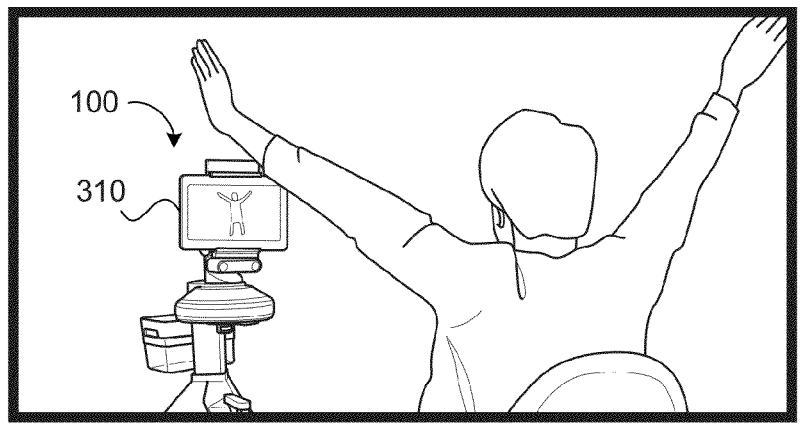
Figure 10E:
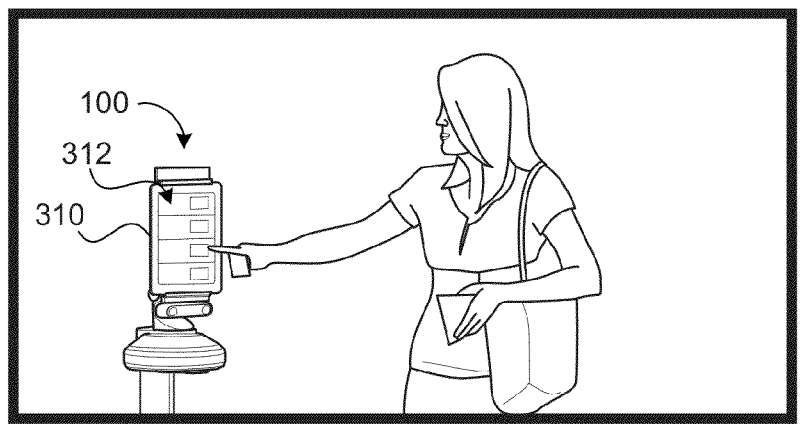

In some examples, the robot 100 can receive user inputs into the web pad 310 (e.g., via a touch screen), as shown in FIG. 10E. In some implementations, the web pad 310 is a display or monitor, while in other implementations the web pad 310 is a tablet computer. The web pad 310 can have easy and intuitive controls, such as a touch screen, providing high interactivity. The web pad 310 may have a monitor display 312 (e.g., touch screen) having a display area of 150 square inches or greater movable with at least one degree of freedom.

The robot 100 can provide EMR integration, in some examples, by providing video conferencing between a doctor and patient and/or other doctors or nurses. The robot 100 may include pass-through consultation instruments. For example, the robot 100 may include a stethoscope configured to pass listening to the videoconferencing user (e.g., a doctor). In other examples, the robot includes connectors 170 that allow direct connection to Class II medical devices, such as electronic stethoscopes, otoscopes and ultrasound, to transmit medical data to a remote user (physician).

In the example shown in FIG. 10B, a user may remove the web pad 310 from the web pad dock 302 on the head 160 for remote operation of the robot 100, videoconferencing (e.g., using a camera and microphone of the web pad 310), and/or usage of software applications on the web pad 310. The robot 100 may include first and second cameras 320a, 320b on the head 160 to obtain different vantage points for videoconferencing, navigation, etc., while the web pad 310 is detached from the web pad dock 302.

Interactive applications executable on the controller 500 and/or in communication with the controller 500 may require more than one display on the robot 100. Multiple web pads 310 associated with the robot 100 can provide different combinations of "FaceTime", Telestration, HD look at this-cam (e.g., for web pads 310 having built in cameras), can act as a remote operator control unit (OCU) for controlling the robot 100 remotely, and/or provide a local user interface pad.

In some implementations, the robot 100 includes a mediating security device 350 (FIG. 9), also referred to as a bridge, for allowing communication between a web pad 310 and the controller 500 (and/or other components of the robot 100). For example, the bridge 350 may convert communications of the web pad 310 from a web pad communication protocol to a robot communication protocol (e.g., Ethernet having a gigabit capacity). The bridge 350 may authenticate the web pad 310 and provided communication conversion between the web pad 310 and the controller 500. In some examples, the bridge 350 includes an authorization chip which authorizes/validates any communication traffic between the web pad 310 and the robot 100. The bridge 350 may notify the controller 500 when it has checked an authorized a web pad 310 trying to communicate with the robot 100. Moreover, after authorization, the bridge 350 notify the web pad 310 of the communication authorization. The bridge 350 may be disposed on the neck 150 or head (as shown in FIGS. 2 and 3) or elsewhere on the robot 100.

The Session Initiation Protocol (SIP) is an IETF-defined signaling protocol, widely used for controlling multimedia communication sessions such as voice and video calls over Internet Protocol (IP). The protocol can be used for creating, modifying and terminating two-party (unicast) or multiparty (multicast) sessions including one or several media streams. The modification can involve changing addresses or ports, inviting more participants, and adding or deleting media streams. Other feasible application examples include video conferencing, streaming multimedia distribution, instant messaging, presence information, file transfer, etc. Voice over Internet Protocol (Voice over IP, VoIP) is part of a family of methodologies, communication protocols, and transmission technologies for delivery of voice communications and multimedia sessions over Internet Protocol (IP) networks, such as the Internet. Other terms frequently encountered and often used synonymously with VoIP are IP telephony, Internet telephony, voice over broadband (VoBB), broadband telephony, and broadband phone.

Figure 11:
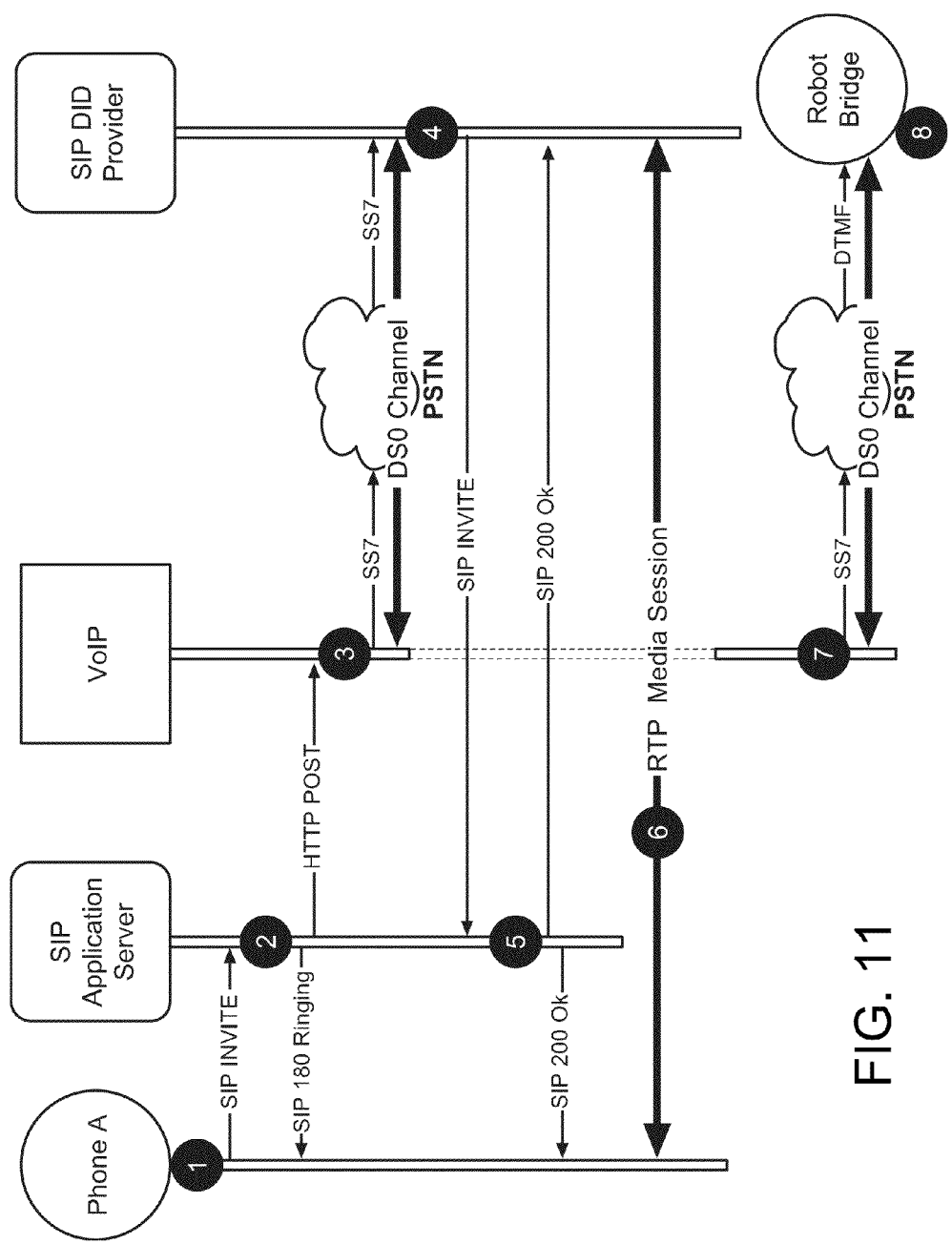
FIG. 11 provides an exemplary telephony schematic for initiating and conducting communication with a mobile human interface robot.
Figure 12:
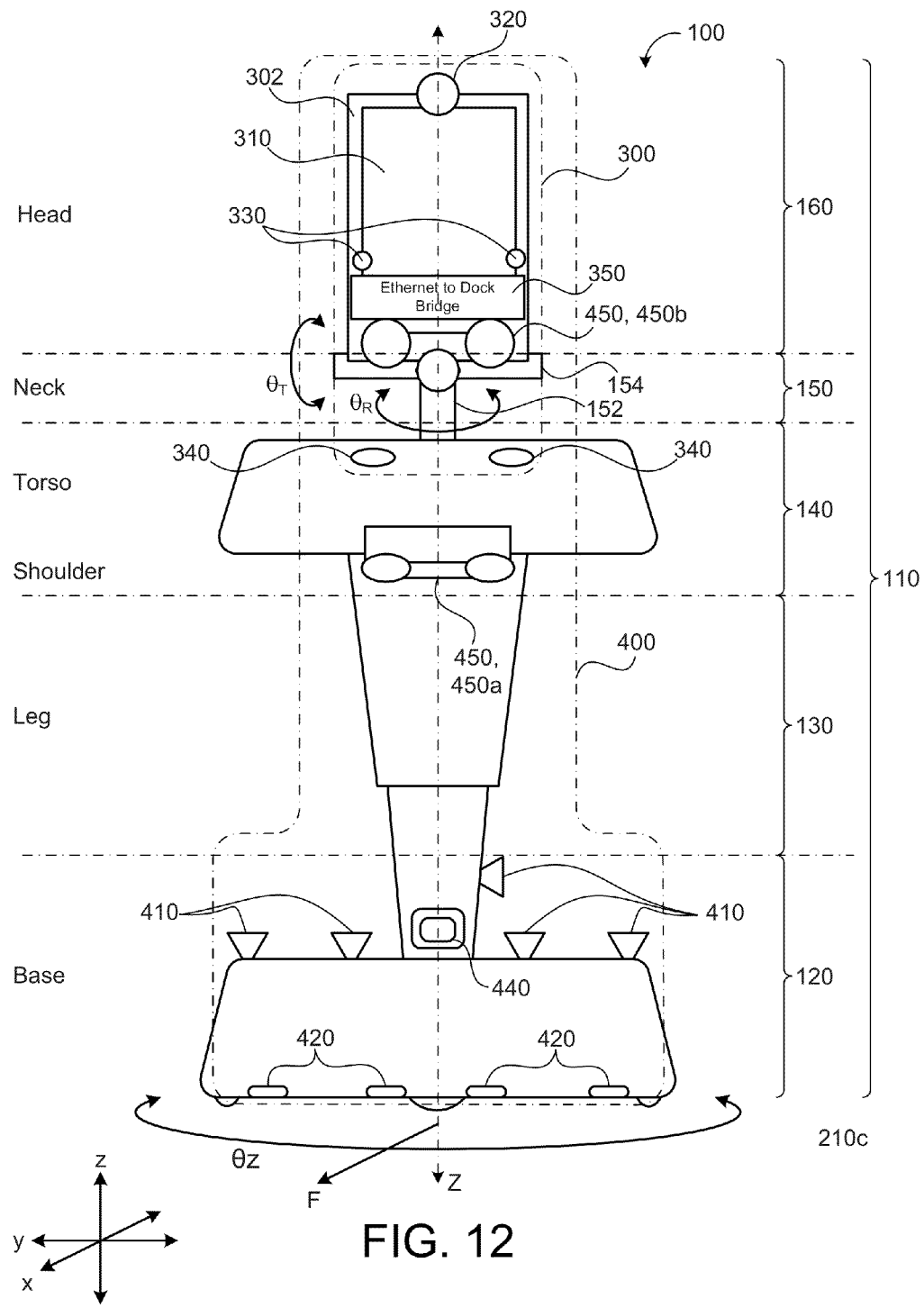
FIG. 12 is a schematic view of an exemplary mobile human interface robot.

FIG. 11 provides a telephony example that includes interaction with the bridge 350 for initiating and conducting communication through the robot 100. An SIP of Phone A places a call with the SIP application server. The SIP invokes a dial function of the VoIP, which causes a HTTP post request to be sent to a VoIP web server. The HTTP Post request may behave like a callback function. The SIP application server sends a ringing to phone A, indicating that the call has been initiated. A VoIP server initiates a call via a PSTN to a callback number contained in the HTTP post request. The callback number terminates on a SIP DID provider which is configured to route calls back to the SIP application server. The SIP application server matches an incoming call with the original call of phone A and answers both calls with an OK response. A media session is established between phone A and the SIP DID provider. Phone A may hear an artificial ring generated by the VoIP. Once the VoIP has verified that the callback leg has been answered, it initiates the PSTN call to the destination, such as the robot 100 (via the bridge 350). The robot 100 answers the call and the VoIP server bridges the media from the SIP DID provider with the media from the robot 100.

Referring again to FIG. 6, the interfacing module 300 may include a microphone 330 (e.g., or micro-phone array) for receiving sound inputs and one or more speakers 330 disposed on the robot body 110 for delivering sound outputs. The microphone 330 and the speaker(s) 340 may each communicate with the controller 500. In some examples, the interfacing module 300 includes a basket 360, which may be configured to hold brochures, emergency information, household items, and other items.

Referring to FIGS. 1-4C, 12 and 13, to achieve reliable and robust autonomous movement, the sensor system 400 may include several different types of sensors which can be used in conjunction with one another to create a perception of the robot's environment sufficient to allow the robot 100 to make intelligent decisions about actions to take in that environment. The sensor system 400 may include one or more types of sensors supported by the robot body 110, which may include obstacle detection obstacle avoidance (ODOA) sensors, communication sensors, navigation sensors, etc. For example, these sensors may include, but not limited to, proximity sensors, contact sensors, three-dimensional (3D) imaging/depth map sensors, a camera (e.g., visible light and/or infrared camera), sonar, radar, LIDAR (Light Detection And Ranging, which can entail optical remote sensing that measures properties of scattered light to find range and/or other information of a distant target), LADAR (Laser Detection and Ranging), etc. In some implementations, the sensor system 400 includes ranging sonar sensors 410 (e.g., nine about a perimeter of the base 120), proximity cliff detectors 420, contact sensors 430, a laser scanner 440, one or more 3-D imaging/depth sensors 450, and an imaging sonar 460.

There are several challenges involved in placing sensors on a robotic platform. First, the sensors need to be placed such that they have maximum coverage of areas of interest around the robot 100. Second, the sensors may need to be placed in such a way that the robot 100 itself causes an absolute minimum of occlusion to the sensors; in essence, the sensors cannot be placed such that they are "blinded" by the robot itself. Third, the placement and mounting of the sensors should not be intrusive to the rest of the industrial design of the platform. In terms of aesthetics, it can be assumed that a robot with sensors mounted inconspicuously is more "attractive" than otherwise. In terms of utility, sensors should be mounted in a manner so as not to interfere with normal robot operation (snagging on obstacles, etc.).

In some implementations, the sensor system 400 includes a set or an array of proximity sensors 410, 420 in communication with the controller 500 and arranged in one or more zones or portions of the robot 100 (e.g., disposed on or near the base body portion 124a, 124b, 124c of the robot body 110) for detecting any nearby or intruding obstacles. The proximity sensors 410, 420 may be converging infrared (IR) emitter-sensor elements, sonar sensors, ultrasonic sensors, and/or imaging sensors (e.g., 3D depth map image sensors) that provide a signal to the controller 500 when an object is within a given range of the robot 100.

Figure 4A:
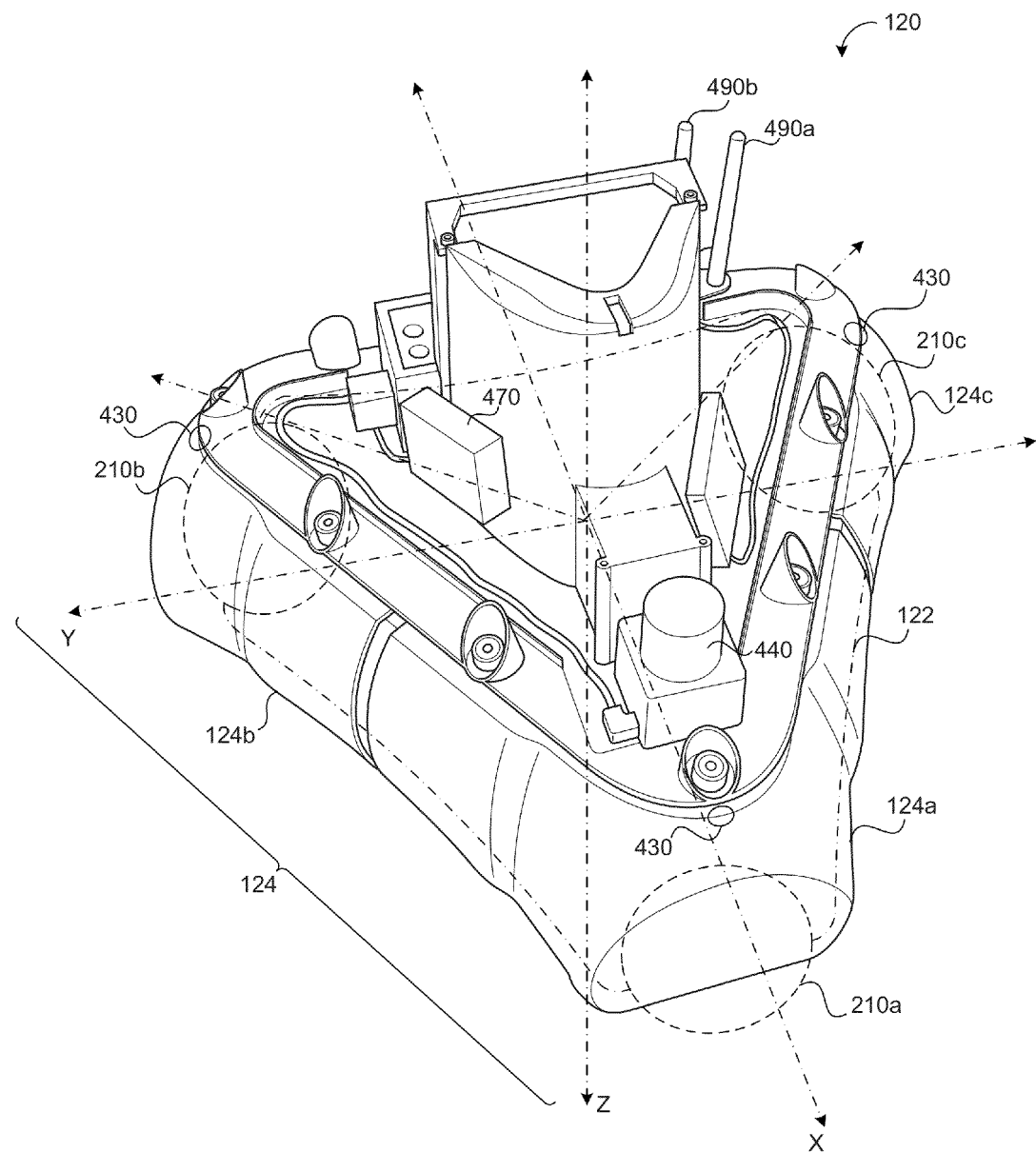
FIG. 4A is a front perspective view of an exemplary base for a mobile human interface robot.
Figure 4B:
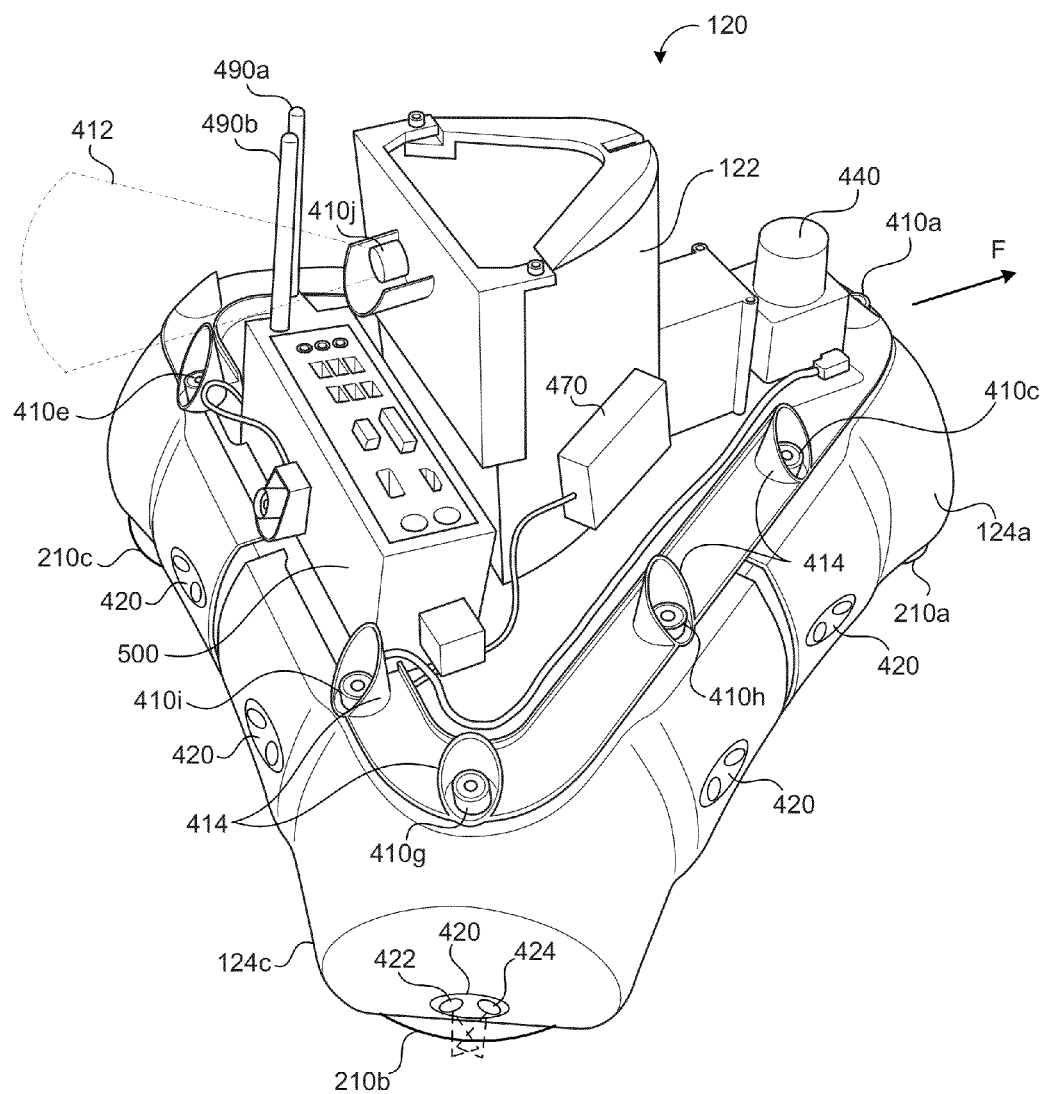
FIG. 4B is a rear perspective view of the base shown in FIG. 4A.
Figure 4C:
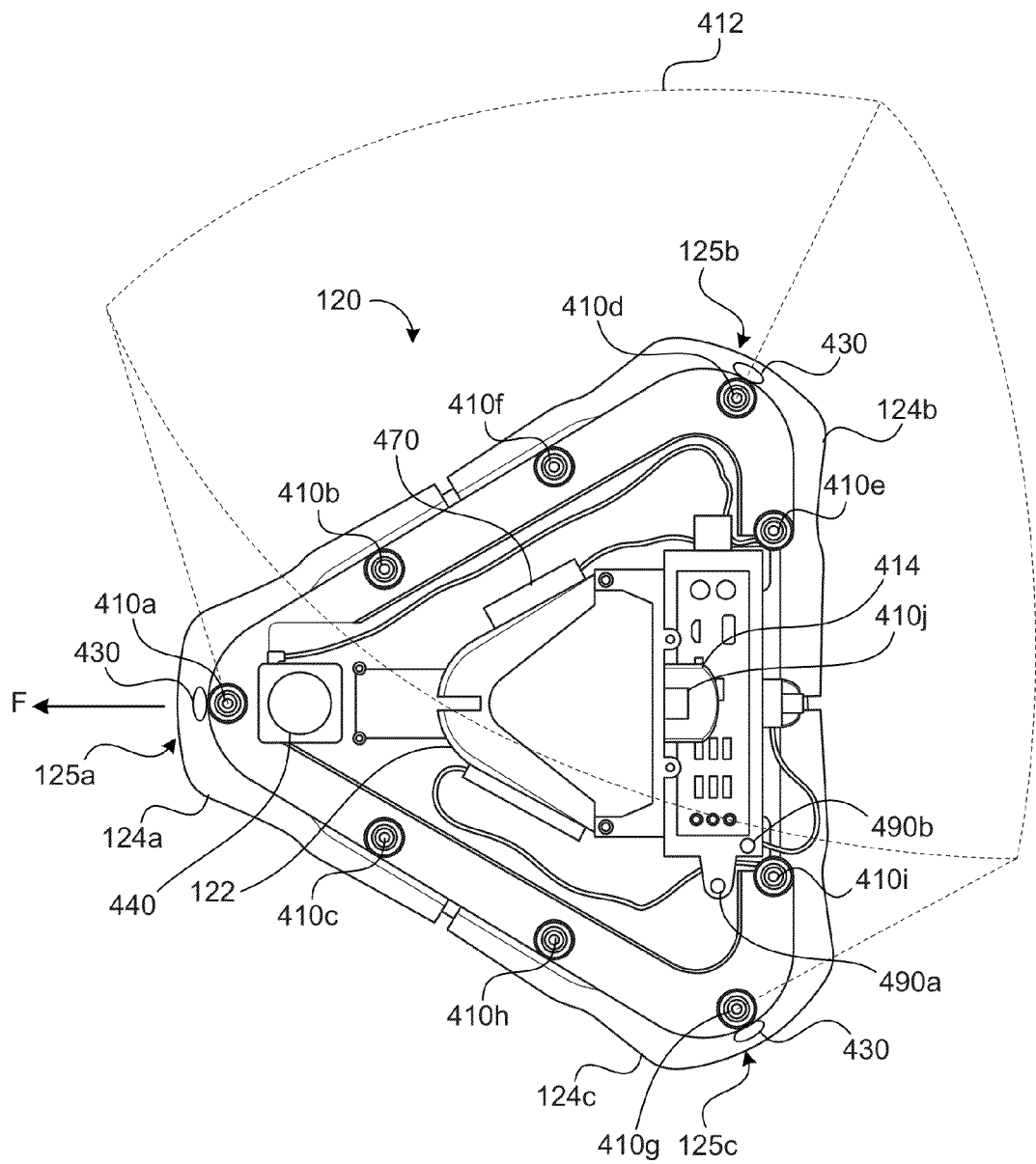
FIG. 4C is a top view of the base shown in FIG. 4A.

In the example shown in FIGS. 4A-4C, the robot 100 includes an array of sonar-type proximity sensors 410 disposed (e.g., substantially equidistant) around the base body 120 and arranged with an upward field of view. First, second, and third sonar proximity sensors 410a, 410b, 410c are disposed on or near the first (forward) base body portion 124a, with at least one of the sonar proximity sensors near a radially outer-most edge 125a of the first base body 124a. Fourth, fifth, and sixth sonar proximity sensors 410d, 410e, 410f are disposed on or near the second (right) base body portion 124b, with at least one of the sonar proximity sensors near a radially outer-most edge 125b of the second base body 124b. Seventh, eighth, and ninth sonar proximity sensors 410g, 410h, 410i are disposed on or near the third (right) base body portion 124c, with at least one of the sonar proximity sensors near a radially outer-most edge 125c of the third base body 124c. This configuration provides at least three zones of detection.

In some examples, the set of sonar proximity sensors 410 (e.g., 410a-410i) disposed around the base body 120 are arranged to point upward (e.g., substantially in the Z direction) and optionally angled outward away from the Z axis, thus creating a detection curtain 412 around the robot 100. Each sonar proximity sensor 410a-410i may have a shroud or emission guide 414 that guides the sonar emission upward or at least not toward the other portions of the robot body 110 (e.g., so as not to detect movement of the robot body 110 with respect to itself). The emission guide 414 may define a shell or half shell shape. In the example shown, the base body 120 extends laterally beyond the leg 130, and the sonar proximity sensors 410 (e.g., 410a-410i) are disposed on the base body 120 (e.g., substantially along a perimeter of the base body 120) around the leg 130. Moreover, the upward pointing sonar proximity sensors 410 are spaced to create a continuous or substantially continuous sonar detection curtain 412 around the leg 130. The sonar detection curtain 412 can be used to detect obstacles having elevated lateral protruding portions, such as table tops, shelves, etc.

The upward looking sonar proximity sensors 410 provide the ability to see objects that are primarily in the horizontal plane, such as table tops. These objects, due to their aspect ratio, may be missed by other sensors of the sensor system, such as the laser scanner 440 or imaging sensors 450, and as such, can pose a problem to the robot 100. The upward viewing sonar proximity sensors 410 arranged around the perimeter of the base 120 provide a means for seeing or detecting those type of objects/obstacles. Moreover, the sonar proximity sensors 410 can be placed around the widest points of the base perimeter and angled slightly outwards, so as not to be occluded or obstructed by the torso 140 or head 160 of the robot 100, thus not resulting in false positives for sensing portions of the robot 100 itself In some implementations, the sonar proximity sensors 410 are arranged (upward and outward) to leave a volume about the torso 140 outside of a field of view of the sonar proximity sensors 410 and thus free to receive mounted payloads or accessories, such as the basket 340. The sonar proximity sensors 410 can be recessed into the base body 124 to provide visual concealment and no external features to snag on or hit obstacles.

The sensor system 400 may include or more sonar proximity sensors 410 (e.g., a rear proximity sensor 410j) directed rearward (e.g., opposite to the forward drive direction F) for detecting obstacles while backing up. The rear sonar proximity sensor 410j may include an emission guide 414 to direct its sonar detection field 412. Moreover, the rear sonar proximity sensor 410j can be used for ranging to determine a distance between the robot 100 and a detected object in the field of view of the rear sonar proximity sensor 410j (e.g., as "back-up alert"). In some examples, the rear sonar proximity sensor 410j is mounted recessed within the base body 120 so as to not provide any visual or functional irregularity in the housing form.

Referring to FIGS. 3 and 4B, in some implementations, the robot 100 includes cliff proximity sensors 420 arranged near or about the drive wheels 210a, 210b, 210c, so as to allow cliff detection before the drive wheels 210a, 210b, 210c encounter a cliff (e.g., stairs). For example, a cliff proximity sensors 420 can be located at or near each of the radially outer-most edges 125a-c of the base bodies 124a-c and in locations therebetween. In some cases, cliff sensing is implemented using infrared (IR) proximity or actual range sensing, using an infrared emitter 422 and an infrared detector 424 angled toward each other so as to have an overlapping emission and detection fields, and hence a detection zone, at a location where a floor should be expected. IR proximity sensing can have a relatively narrow field of view, may depend on surface albedo for reliability, and can have varying range accuracy from surface to surface. As a result, multiple discrete sensors can be placed about the perimeter of the robot 100 to adequately detect cliffs from multiple points on the robot 100. Moreover, IR proximity based sensors typically cannot discriminate between a cliff and a safe event, such as just after the robot 100 climbs a threshold.

The cliff proximity sensors 420 can detect when the robot 100 has encountered a falling edge of the floor, such as when it encounters a set of stairs. The controller 500 (executing a control system) may execute behaviors that cause the robot 100 to take an action, such as changing its direction of travel, when an edge is detected. In some implementations, the sensor system 400 includes one or more secondary cliff sensors (e.g., other sensors configured for cliff sensing and optionally other types of sensing). The cliff detecting proximity sensors 420 can be arranged to provide early detection of cliffs, provide data for discriminating between actual cliffs and safe events (such as climbing over thresholds), and be positioned down and out so that their field of view includes at least part of the robot body 110 and an area away from the robot body 110. In some implementations, the controller 500 executes cliff detection routine that identifies and detects an edge of the supporting work surface (e.g., floor), an increase in distance past the edge of the work surface, and/or an increase in distance between the robot body 110 and the work surface. This implementation allows: 1) early detection of potential cliffs (which may allow faster mobility speeds in unknown environments); 2) increased reliability of autonomous mobility since the controller 500 receives cliff imaging information from the cliff detecting proximity sensors 420 to know if a cliff event is truly unsafe or if it can be safely traversed (e.g., such as climbing up and over a threshold); 3) a reduction in false positives of cliffs (e.g., due to the use of edge detection versus the multiple discrete IR proximity sensors with a narrow field of view). Additional sensors arranged as "wheel drop" sensors can be used for redundancy and for detecting situations where a range-sensing camera cannot reliably detect a certain type of cliff.

Threshold and step detection allows the robot 100 to effectively plan for either traversing a climb-able threshold or avoiding a step that is too tall. This can be the same for random objects on the work surface that the robot 100 may or may not be able to safely traverse. For those obstacles or thresholds that the robot 100 determines it can climb, knowing their heights allows the robot 100 to slow down appropriately, if deemed needed, to allow for a smooth transition in order to maximize smoothness and minimize any instability due to sudden accelerations. In some implementations, threshold and step detection is based on object height above the work surface along with geometry recognition (e.g., discerning between a threshold or an electrical cable versus a blob, such as a sock). Thresholds may be recognized by edge detection. The controller 500 may receive imaging data from the cliff detecting proximity sensors 420 (or another imaging sensor on the robot 100), execute an edge detection routine, and issue a drive command based on results of the edge detection routine. The controller 500 may use pattern recognition to identify objects as well. Threshold detection allows the robot 100 to change its orientation with respect to the threshold to maximize smooth step climbing ability.

The proximity sensors 410, 420 may function alone, or as an alternative, may function in combination with one or more contact sensors 430 (e.g., bump switches) for redundancy. For example, one or more contact or bump sensors 430 on the robot body 110 can detect if the robot 100 physically encounters an obstacle. Such sensors may use a physical property such as capacitance or physical displacement within the robot 100 to determine when it has encountered an obstacle. In some implementations, each base body portion 124a, 124b, 124c of the base 120 has an associated contact sensor 430 (e.g., capacitive sensor, read switch, etc.) that detects movement of the corresponding base body portion 124a, 124b, 124c with respect to the base chassis 122 (see e.g., FIG. 4A). For example, each base body 124a-c may move radially with respect to the Z axis of the base chassis 122, so as to provide 3-way bump detection.

Referring again to FIGS. 1-4C, 12 and 13, in some implementations, the sensor system 400 includes a laser scanner 440 mounted on a forward portion of the robot body 110 and in communication with the controller 500. In the examples shown, the laser scanner 440 is mounted on the base body 120 facing forward (e.g., having a field of view along the forward drive direction F) on or above the first base body 124a (e.g., to have maximum imaging coverage along the drive direction F of the robot). Moreover, the placement of the laser scanner on or near the front tip of the triangular base 120 means that the external angle of the robotic base (e.g., 300 degrees) is greater than a field of view 442 of the laser scanner 440 (e.g., ~285 degrees), thus preventing the base 120 from occluding or obstructing the detection field of view 442 of the laser scanner 440. The laser scanner 440 can be mounted recessed within the base body 124 as much as possible without occluding its fields of view, to minimize any portion of the laser scanner sticking out past the base body 124 (e.g., for aesthetics and to minimize snagging on obstacles).

The laser scanner 440 scans an area about the robot 100 and the controller 500, using signals received from the laser scanner 440, creates an environment map or object map of the scanned area. The controller 500 may use the object map for navigation, obstacle detection, and obstacle avoidance. Moreover, the controller 500 may use sensory inputs from other sensors of the sensor system 400 for creating object map and/or for navigation.

In some examples, the laser scanner 440 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning). In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 400 may include one or more three-dimensional (3-D) image sensors 450 in communication with the controller 500. If the 3-D image sensor 450 has a limited field of view, the controller 500 or the sensor system 400 can actuate the 3-D image sensor 450a in a side-to-side scanning manner to create a relatively wider field of view to perform robust ODOA. Referring to FIGS. 1-3 and 13, in some implementations, the robot 100 includes a scanning 3-D image sensor 450a mounted on a forward portion of the robot body 110 with a field of view along the forward drive direction F (e.g., to have maximum imaging coverage along the drive direction F of the robot). The scanning 3-D image sensor 450a can be used primarily for obstacle detection/obstacle avoidance (ODOA). In the example shown, the scanning 3-D image sensor 450a is mounted on the torso 140 underneath the shoulder 142 or on the bottom surface 144 and recessed within the torso 140 (e.g., flush or past the bottom surface 144), as shown in FIG. 3, for example, to prevent user contact with the scanning 3-D image sensor 450a. The scanning 3-D image sensor 450 can be arranged to aim substantially downward and away from the robot body 110, so as to have a downward field of view 452 in front of the robot 100 for obstacle detection and obstacle avoidance (ODOA) (e.g., with obstruction by the base 120 or other portions of the robot body 110). Placement of the scanning 3-D image sensor 450*a* on or near a forward edge of the torso 140 allows the field of view of the 3-D image sensor 450 (e.g., ~285 degrees) to be less than an external surface angle of the torso 140 (e.g., 300 degrees) with respect to the 3-D image sensor 450, thus preventing the torso 140 from occluding or obstructing the detection field of view 452 of the scanning 3-D image sensor 450*a*. Moreover, the scanning 3-D image sensor 450*a* (and associated actuator) can be mounted recessed within the torso 140 as much as possible without occluding its fields of view (e.g., also for aesthetics and to minimize snagging on obstacles). The distracting scanning motion of the scanning 3-D image sensor 450*a* is not visible to a user, creating a less distracting interaction experience. Unlike a protruding sensor or feature, the recessed scanning 3-D image sensor 450*a* will not tend to have unintended interactions with the environment (snagging on people, obstacles, etc.), especially when moving or scanning, as virtually no moving part extends beyond the envelope of the torso 140.

In some implementations, the sensor system 400 includes additional 3-D image sensors 450 disposed on the base body 120, the leg 130, the neck 150, and/or the head 160. In the example shown in FIG. 1, the robot 100 includes 3-D image sensors 450 on the base body 120, the torso 140, and the head 160. In the example shown in FIG. 2, the robot 100 includes 3-D image sensors 450 on the base body 120, the torso 140, and the head 160. In the example shown in FIG. 12, the robot 100 includes 3-D image sensors 450 on the leg 130, the torso 140, and the neck 150. Other configurations are possible as well. One 3-D image sensor 450 (e.g., on the neck 150 and over the head 160) can be used for people recognition, gesture recognition, and/or videoconferencing, while another 3-D image sensor 450 (e.g., on the base 120 and/or the leg 130) can be used for navigation and/or obstacle detection and obstacle avoidance.

A forward facing 3-D image sensor 450 disposed on the neck 150 and/or the head 160 can be used for person, face, and/or gesture recognition of people about the robot 100. For example, using signal inputs from the 3-D image sensor 450 on the head 160, the controller 500 may recognize a user by creating a three-dimensional map of the viewed/captured user's face and comparing the created three-dimensional map with known 3-D images of people's faces and determining a match with one of the known 3-D facial images. Facial recognition may be used for validating users as allowable users of the robot 100. Moreover, one or more of the 3-D image sensors 450 can be used for determining gestures of person viewed by the robot 100, and optionally reacting based on the determined gesture(s) (e.g., hand pointing, waving, and or hand signals). For example, the controller 500 may issue a drive command in response to a recognized hand point in a particular direction.

The 3-D image sensors 450 may be capable of producing the following types of data: (i) a depth map, (ii) a reflectivity based intensity image, and/or (iii) a regular intensity image. The 3-D image sensors 450 may obtain such data by image pattern matching, measuring the flight time and/or phase delay shift for light emitted from a source and reflected off of a target.

In some implementations, reasoning or control software, executable on a processor (e.g., of the robot controller 500), uses a combination of algorithms executed using various data types generated by the sensor system 400. The reasoning software processes the data collected from the sensor system 400 and outputs data for making navigational decisions on where the robot 100 can move without colliding with an obstacle, for example. By accumulating imaging data over time of the robot's surroundings, the reasoning software can in turn apply effective methods to selected segments of the sensed image(s) to improve depth measurements of the 3-D image sensors 450. This may include using appropriate temporal and spatial averaging techniques.

The reliability of executing robot collision free moves may be based on: (i) a confidence level built by high level reasoning over time and (ii) a depth-perceptive sensor that accumulates three major types of data for analysis—(a) a depth image, (b) an active illumination image and (c) an ambient illumination image. Algorithms cognizant of the different types of data can be executed on each of the images obtained by the depth-perceptive imaging sensor 450. The aggregate data may improve the confidence level a compared to a system using only one of the kinds of data.

The 3-D image sensors 450 may obtain images containing depth and brightness data from a scene about the robot 100 (e.g., a sensor view portion of a room or work area) that contains one or more objects. The controller 500 may be configured to determine occupancy data for the object based on the captured reflected light from the scene. Moreover, the controller 500, in some examples, issues a drive command to the drive system 200 based at least in part on the occupancy data to circumnavigate obstacles (i.e., the object in the scene). The 3-D image sensors 450 may repeatedly capture scene depth images for real-time decision making by the controller 500 to navigate the robot 100 about the scene without colliding into any objects in the scene. For example, the speed or frequency in which the depth image data is obtained by the 3-D image sensors 450 may be controlled by a shutter speed of the 3-D image sensors 450. In addition, the controller 500 may receive an event trigger (e.g., from another sensor component of the sensor system 400, such as proximity sensor 410, 420, notifying the controller 500 of a nearby object or hazard. The controller 500, in response to the event trigger, can cause the 3-D image sensors 450 to increase a frequency at which depth images are captured and occupancy information is obtained.

In some implementations, the robot includes a sonar scanner 460 for acoustic imaging of an area surrounding the robot 100. In the examples shown in FIGS. 1 and 3, the sonar scanner 460 is disposed on a forward portion of the base body 120.

Figure 13:
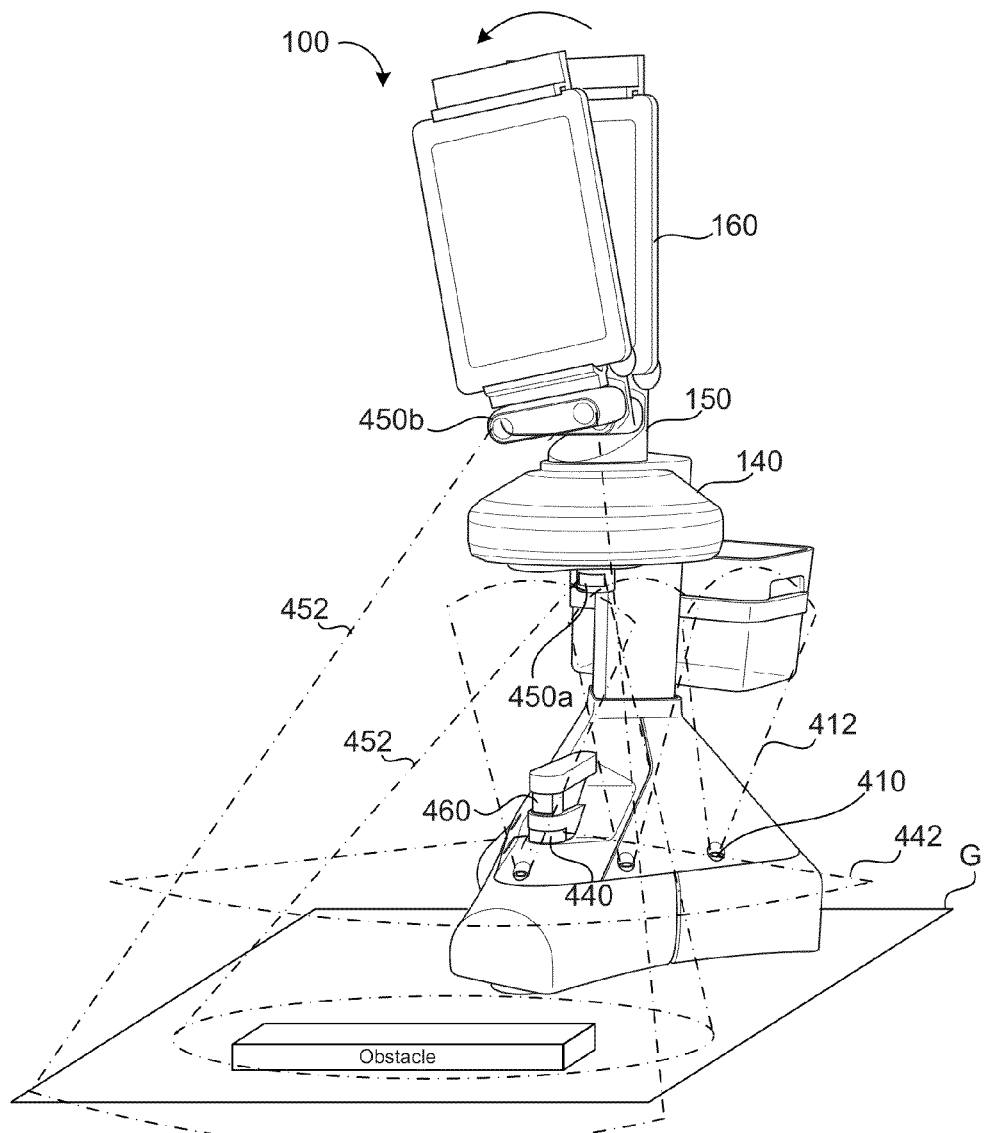
FIG. 13 is a perspective view of an exemplary mobile human interface robot having multiple sensors pointed toward the ground.

Referring to FIGS. 1, 3B and 13, in some implementations, the robot 100 uses the laser scanner or laser range finder 440 for redundant sensing, as well as a rear-facing sonar proximity sensor 410*j* for safety, both of which are oriented parallel to the ground G. The robot 100 may include first and second 3-D image sensors 450*a*, 450*b* (depth cameras) to provide robust sensing of the environment around the robot 100. The first 3-D image sensor 450*a* is mounted on the torso 140 and pointed downward at a fixed angle to the ground G. By angling the first 3-D image sensor 450*a* downward, the robot 100 receives dense sensor coverage in an area immediately forward or adjacent to the robot 100, which is relevant for short-term travel of the robot 100 in the forward direction. The rear-facing sonar 410*j* provides object detection when the robot travels backward. If backward travel is typical for the robot 100, the robot 100 may include a third 3D image sensor 450 facing downward and backward to provide dense sensor coverage in an area immediately rearward or adjacent to the robot 100.

The second 3-D image sensor 450*b* is mounted on the head 160, which can pan and tilt via the neck 150. The second 3-D image sensor 450*b* can be useful for remote driving since it allows a human operator to see where the robot 100 is going. The neck 150 enables the operator tilt and/or pan the second 3-D image sensor 450b to see both close and distant objects. Panning the second 3-D image sensor 450b increases an associated horizontal field of view. During fast travel, the robot 100 may tilt the second 3-D image sensor 450b downward slightly to increase a total or combined field of view of both 3-D image sensors 450a, 450b, and to give sufficient time for the robot 100 to avoid an obstacle (since higher speeds generally mean less time to react to obstacles). At slower speeds, the robot 100 may tilt the second 3-D image sensor 450b upward or substantially parallel to the ground G to track a person that the robot 100 is meant to follow. Moreover, while driving at relatively low speeds, the robot 100 can pan the second 3-D image sensor 450b to increase its field of view around the robot 100. The first 3-D image sensor 450a can stay fixed (e.g., not moved with respect to the base 120) when the robot is driving to expand the robot's perceptual range.

In some implementations, at least one of 3-D image sensors 450 can be a volumetric point cloud imaging device (such as a speckle or time-of-flight camera) positioned on the robot 100 at a height of greater than 1 or 2 feet above the ground (or at a height of about 1 or 2 feet above the ground) and directed to be capable of obtaining a point cloud from a volume of space including a floor plane in a direction of movement of the robot (via the omni-directional drive system 200). In the examples shown in FIGS. 1 and 3, the first 3-D image sensor 450a can be positioned on the base 120 at height of greater than 1 or 2 feet above the ground and aimed along the forward drive direction F to capture images (e.g., volumetric point cloud) of a volume including the floor while driving (e.g., for obstacle detection and obstacle avoidance). The second 3-D image sensor 450b is shown mounted on the head 160 (e.g., at a height greater than about 3 or 4 feet above the ground), so as to be capable of obtaining skeletal recognition and definition point clouds from a volume of space adjacent the robot 100. The controller 500 may execute skeletal/digital recognition software to analyze data of the captured volumetric point clouds.

Referring again to FIGS. 2 and 4A-4C, the sensor system 400 may include an inertial measurement unit (IMU) 470 in communication with the controller 500 to measure and monitor a moment of inertia of the robot 100 with respect to the overall center of gravity $CG_R$ of the robot 100.

The controller 500 may monitor any deviation in feedback from the IMU 470 from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

Since robot 100 may operate in a human environment, it may interact with humans and operate in spaces designed for humans (and without regard for robot constraints). The robot 100 can limit its drive speeds and accelerations when in a congested, constrained, or highly dynamic environment, such as at a cocktail party or busy hospital. However, the robot 100 may encounter situations where it is safe to drive relatively fast, as in a long empty corridor, but yet be able to decelerate suddenly, as when something crosses the robots' motion path.

When accelerating from a stop, the controller 500 may take into account a moment of inertia of the robot 100 from its overall center of gravity $CG_R$ to prevent robot tipping. The controller 500 may use a model of its pose, including its current moment of inertia. When payloads are supported, the controller 500 may measure a load impact on the overall center of gravity $CG_R$ and monitor movement of the robot moment of inertia. For example, the torso 140 and/or neck 150 may include strain gauges to measure strain. If this is not possible, the controller 500 may apply a test torque command to the drive wheels 210 and measure actual linear and angular acceleration of the robot using the IMU 470, in order to experimentally determine safe limits.

During a sudden deceleration, a commanded load on the second and third drive wheels 210b, 210c (the rear wheels) is reduced, while the first drive wheel 210a (the front wheel) slips in the forward drive direction and supports the robot 100. If the loading of the second and third drive wheels 210b, 210c (the rear wheels) is asymmetrical, the robot 100 may "yaw" which will reduce dynamic stability. The IMU 470 (e.g., a gyro) can be used to detect this yaw and command the second and third drive wheels 210b, 210c to reorient the robot 100.

Referring to FIGS. 3-4C and 6, in some implementations, the robot 100 includes multiple antennas. In the examples shown, the robot 100 includes a first antenna 490a and a second antenna 490b both disposed on the base 120 (although the antennas may be disposed at any other part of the robot 100, such as the leg 130, the torso 140, the neck 150, and/or the head 160). The use of multiple antennas provide robust signal reception and transmission. The use of multiple antennas provides the robot 100 with multiple-input and multiple-output, or MIMO, which is the use of multiple antennas for a transmitter and/or a receiver to improve communication performance. MIMO offers significant increases in data throughput and link range without additional bandwidth or transmit power. It achieves this by higher spectral efficiency (more bits per second per hertz of bandwidth) and link reliability or diversity (reduced fading). Because of these properties, MIMO is an important part of modern wireless communication standards such as IEEE 802.11n (Wifi), 4G, 3GPP Long Term Evolution, WiMAX and HSPA+. Moreover, the robot 100 can act as a Wi-Fi bridge, hub or hotspot for other electronic devices nearby. The mobility and use of MIMO of the robot 100 can allow the robot to come a relatively very reliable Wi-Fi bridge.

MIMO can be sub-divided into three main categories, pre-coding, spatial multiplexing or SM, and diversity coding. Pre-coding is a type of multi-stream beam forming and is considered to be all spatial processing that occurs at the transmitter. In (single-layer) beam forming, the same signal is emitted from each of the transmit antennas with appropriate phase (and sometimes gain) weighting such that the signal power is maximized at the receiver input. The benefits of beam forming are to increase the received signal gain, by making signals emitted from different antennas add up constructively, and to reduce the multipath fading effect. In the absence of scattering, beam forming can result in a well defined directional pattern. When the receiver has multiple antennas, the transmit beam forming cannot simultaneously maximize the signal level at all of the receive antennas, and pre-coding with multiple streams can be used. Pre-coding may require knowledge of channel state information (CSI) at the transmitter.

Spatial multiplexing requires a MIMO antenna configuration. In spatial multiplexing, a high rate signal is split into multiple lower rate streams and each stream is transmitted from a different transmit antenna in the same frequency channel. If these signals arrive at the receiver antenna array with sufficiently different spatial signatures, the receiver can separate these streams into (almost) parallel channels. Spatial multiplexing is a very powerful technique for increasing channel capacity at higher signal-to-noise ratios (SNR). The maximum number of spatial streams is limited by the lesser in the number of antennas at the transmitter or receiver. Spatial multiplexing can be used with or without transmit channel knowledge. Spatial multiplexing can also be used for simultaneous transmission to multiple receivers, known as space-division multiple access. By scheduling receivers with different spatial signatures, good separability can be assured.

Diversity Coding techniques can be used when there is no channel knowledge at the transmitter. In diversity methods, a single stream (unlike multiple streams in spatial multiplexing) is transmitted, but the signal is coded using techniques called space-time coding. The signal is emitted from each of the transmit antennas with full or near orthogonal coding. Diversity coding exploits the independent fading in the multiple antenna links to enhance signal diversity. Because there is no channel knowledge, there is no beam forming or array gain from diversity coding. Spatial multiplexing can also be combined with pre-coding when the channel is known at the transmitter or combined with diversity coding when decoding reliability is in trade-off.

In some implementations, the robot 100 includes a third antenna 490c and/or a fourth antenna 490d and the torso 140 and/or the head 160, respectively (see e.g., FIG. 3). In such instances, the controller 500 can determine an antenna arrangement (e.g., by moving the antennas 490a-d, as by raising or lowering the torso 140 and/or rotating and/or tilting the head 160) that achieves a threshold signal level for robust communication. For example, the controller 500 can issue a command to elevate the third and fourth antennas 490c, 490d by raising a height of the torso 140. Moreover, the controller 500 can issue a command to rotate and/or the head 160 to further orient the fourth antenna 490d with respect to the other antennas 490a-c.

Figure 14:
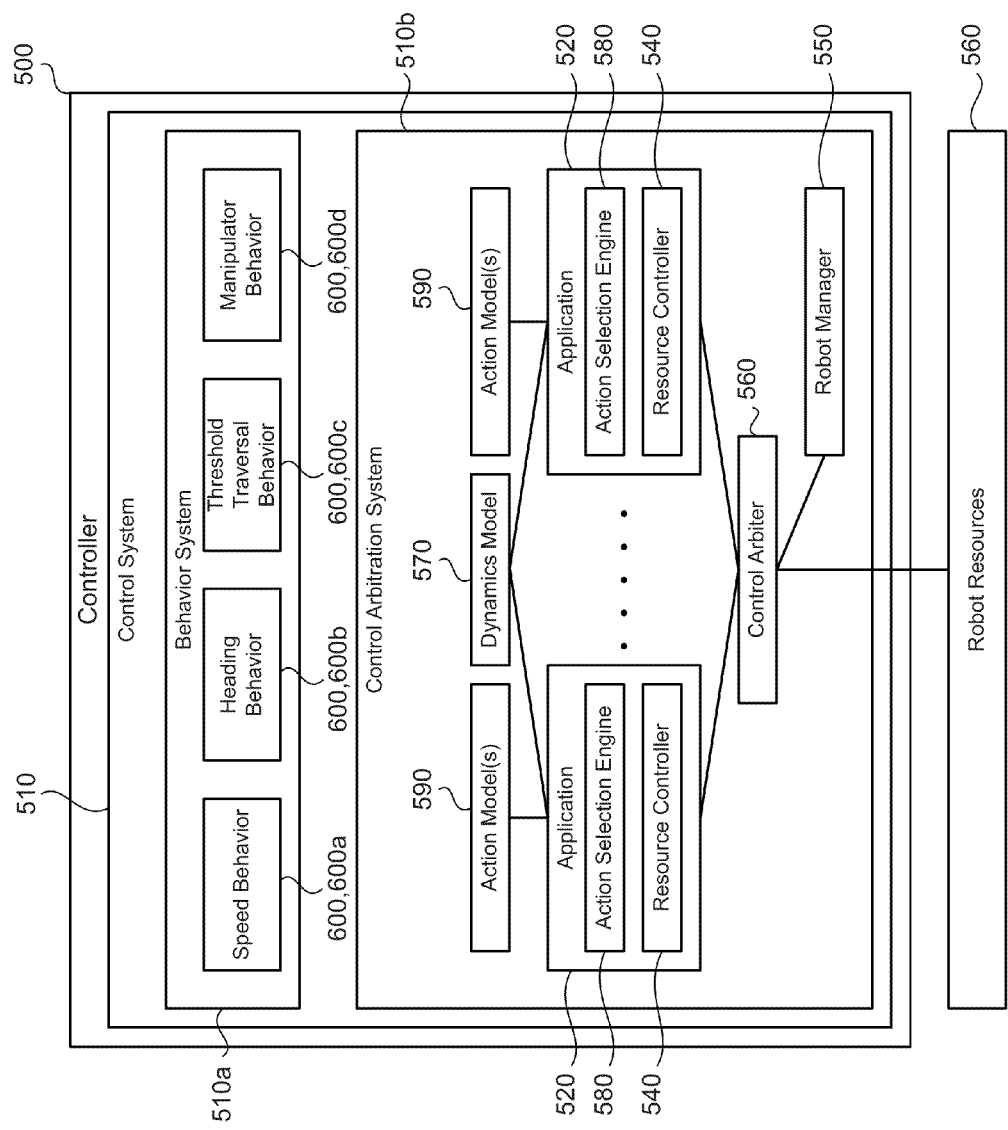
FIG. 14 is a schematic view of an exemplary control system executed by a controller of a mobile human interface robot.

Referring to FIG. 14, in some implementations, the controller 500 executes a control system 510, which includes a control arbitration system 510a and a behavior system 510b in communication with each other. The control arbitration system 510a allows applications 520 to be dynamically added and removed from the control system 510, and facilitates allowing applications 520 to each control the robot 100 without needing to know about any other applications 520. In other words, the control arbitration system 510a provides a simple prioritized control mechanism between applications 520 and resources 530 of the robot 100. The resources 530 may include the drive system 200, the sensor system 400, and/or any payloads or controllable devices in communication with the controller 500.

The applications 520 can be stored in memory of or communicated to the robot 100, to run concurrently on (e.g., a processor) and simultaneously control the robot 100. The applications 520 may access behaviors 600 of the behavior system 510b. The independently deployed applications 520 are combined dynamically at runtime and to share robot resources 530 (e.g., drive system 200, arm(s), head(s), etc.) of the robot 100. A low-level policy is implemented for dynamically sharing the robot resources 530 among the applications 520 at run-time. The policy determines which application 520 has control of the robot resources 530 required by that application 520 (e.g. a priority hierarchy among the applications 520). Applications 520 can start and stop dynamically and run completely independently of each other. The control system 510 also allows for complex behaviors 600 which can be combined together to assist each other.

The control arbitration system 510a includes one or more resource controllers 540, a robot manager 550, and one or more control arbiters 560. These components do not need to be in a common process or computer, and do not need to be started in any particular order. The resource controller 540 component provides an interface to the control arbitration system 510a for applications 520. There is an instance of this component for every application 520. The resource controller 540 abstracts and encapsulates away the complexities of authentication, distributed resource control arbiters, command buffering, and the like. The robot manager 550 coordinates the prioritization of applications 520, by controlling which application 520 has exclusive control of any of the robot resources 530 at any particular time. Since this is the central coordinator of information, there is only one instance of the robot manager 550 per robot. The robot manager 550 implements a priority policy, which has a linear prioritized order of the resource controllers 540, and keeps track of the resource control arbiters 560 that provide hardware control. The control arbiter 560 receives the commands from every application 520 and generates a single command based on the applications' priorities and publishes it for its associated resources 530. The control arbiter 560 also receives state feedback from its associated resources 530 and sends it back up to the applications 520. The robot resources 530 may be a network of functional modules (e.g. actuators, drive systems, and groups thereof) with one or more hardware controllers. The commands of the control arbiter 560 are specific to the resource 530 to carry out specific actions.

A dynamics model 570 executable on the controller 500 can be configured to compute the center for gravity (CG), moments of inertia, and cross products of inertia of various portions of the robot 100 for the assessing a current robot state. The dynamics model 570 may also model the shapes, weight, and/or moments of inertia of these components. In some examples, the dynamics model 570 communicates with the inertial moment unit 470 (IMU) or portions of one (e.g., accelerometers and/or gyros) disposed on the robot 100 and in communication with the controller 500 for calculating the various center of gravities of the robot 100. The dynamics model 570 can be used by the controller 500, along with other programs 520 or behaviors 600 to determine operating envelopes of the robot 100 and its components.

Each application 520 has an action selection engine 580 and a resource controller 540, one or more behaviors 600 connected to the action selection engine 580, and one or more action models 590 connected to action selection engine 580. The behavior system 510b provides predictive modeling and allows the behaviors 600 to collaboratively decide on the robot's actions by evaluating possible outcomes of robot actions. In some examples, a behavior 600 is a plug-in component that provides a hierarchical, state-full evaluation function that couples sensory feedback from multiple sources with a-priori limits and information into evaluation feedback on the allowable actions of the robot. Since the behaviors 600 are pluggable into the application 520 (e.g., residing inside or outside of the application 520), they can be removed and added without having to modify the application 520 or any other part of the control system 510. Each behavior 600 is a standalone policy. To make behaviors 600 more powerful, it is possible to attach the output of multiple behaviors 600 together into the input of another so that you can have complex combination functions. The behaviors 600 are intended to implement manageable portions of the total cognizance of the robot 100.

The action selection engine 580 is the coordinating element of the control system 510 and runs a fast, optimized action selection cycle (prediction/correction cycle) searching for the best action given the inputs of all the behaviors 600. The action selection engine 580 has three phases: nomination, action selection search, and completion. In the nomination phase, each behavior 600 is notified that the action selection cycle has started and is provided with the cycle start time, the current state, and limits of the robot actuator space. Based on internal policy or external input, each behavior 600 decides whether or not it wants to participate in this action selection cycle. During this phase, a list of active behavior primitives is generated whose input will affect the selection of the commands to be executed on the robot 100.

In the action selection search phase, the action selection engine 580 generates feasible outcomes from the space of available actions, also referred to as the action space. The action selection engine 580 uses the action models 590 to provide a pool of feasible commands (within limits) and corresponding outcomes as a result of simulating the action of each command at different time steps with a time horizon in the future. The action selection engine 580 calculates a preferred outcome, based on the outcome evaluations of the behaviors 600, and sends the corresponding command to the control arbitration system 510a and notifies the action model 590 of the chosen command as feedback.

In the completion phase, the commands that correspond to a collaborative best scored outcome are combined together as an overall command, which is presented to the resource controller 540 for execution on the robot resources 530. The best outcome is provided as feedback to the active behaviors 600, to be used in future evaluation cycles.

Received sensor signals from the sensor system 400 can cause interactions with one or more behaviors 600 to execute actions. For example, using the control system 510, the controller 500 selects an action (or move command) for each robotic component (e.g., motor or actuator) from a corresponding action space (e.g., a collection of possible actions or moves for that particular component) to effectuate a coordinated move of each robotic component in an efficient manner that avoids collisions with itself and any objects about the robot 100, which the robot 100 is aware of. The controller 500 can issue a coordinated command over robot network, such as an EtherIO network, as described in U.S. Ser. No. 61/305, 069, filed Feb. 16, 2010, the entire contents of which are hereby incorporated by reference.

The control system 510 may provide adaptive speed/acceleration of the drive system 200 (e.g., via one or more behaviors 600) in order to maximize stability of the robot 100 in different configurations/positions as the robot 100 maneuvers about an area.

In some implementations, the controller 500 issues commands to the drive system 200 that propels the robot 100 according to a heading setting and a speed setting. One or behaviors 600 may use signals received from the sensor system 400 to evaluate predicted outcomes of feasible commands, one of which may be elected for execution (alone or in combination with other commands as an overall robot command) to deal with obstacles. For example, signals from the proximity sensors 410 may cause the control system 510 to change the commanded speed or heading of the robot 100. For instance, a signal from a proximity sensor 410 due to a nearby wall may result in the control system 510 issuing a command to slow down. In another instance, a collision signal from the contact sensor(s) due to an encounter with a chair may cause the control system 510 to issue a command to change heading. In other instances, the speed setting of the robot 100 may not be reduced in response to the contact sensor; and/or the heading setting of the robot 100 may not be altered in response to the proximity sensor 410.

The behavior system 510b may include a speed behavior 600a (e.g., a behavioral routine executable on a processor) configured to adjust the speed setting of the robot 100 and a heading behavior 600b configured to alter the heading setting of the robot 100. The speed and heading behaviors 600a, 600b may be configured to execute concurrently and mutually independently. For example, the speed behavior 600a may be configured to poll one of the sensors (e.g., the set(s) of proximity sensors 410, 420), and the heading behavior 600b may be configured to poll another sensor (e.g., the kinetic bump sensor).

Figure 15:
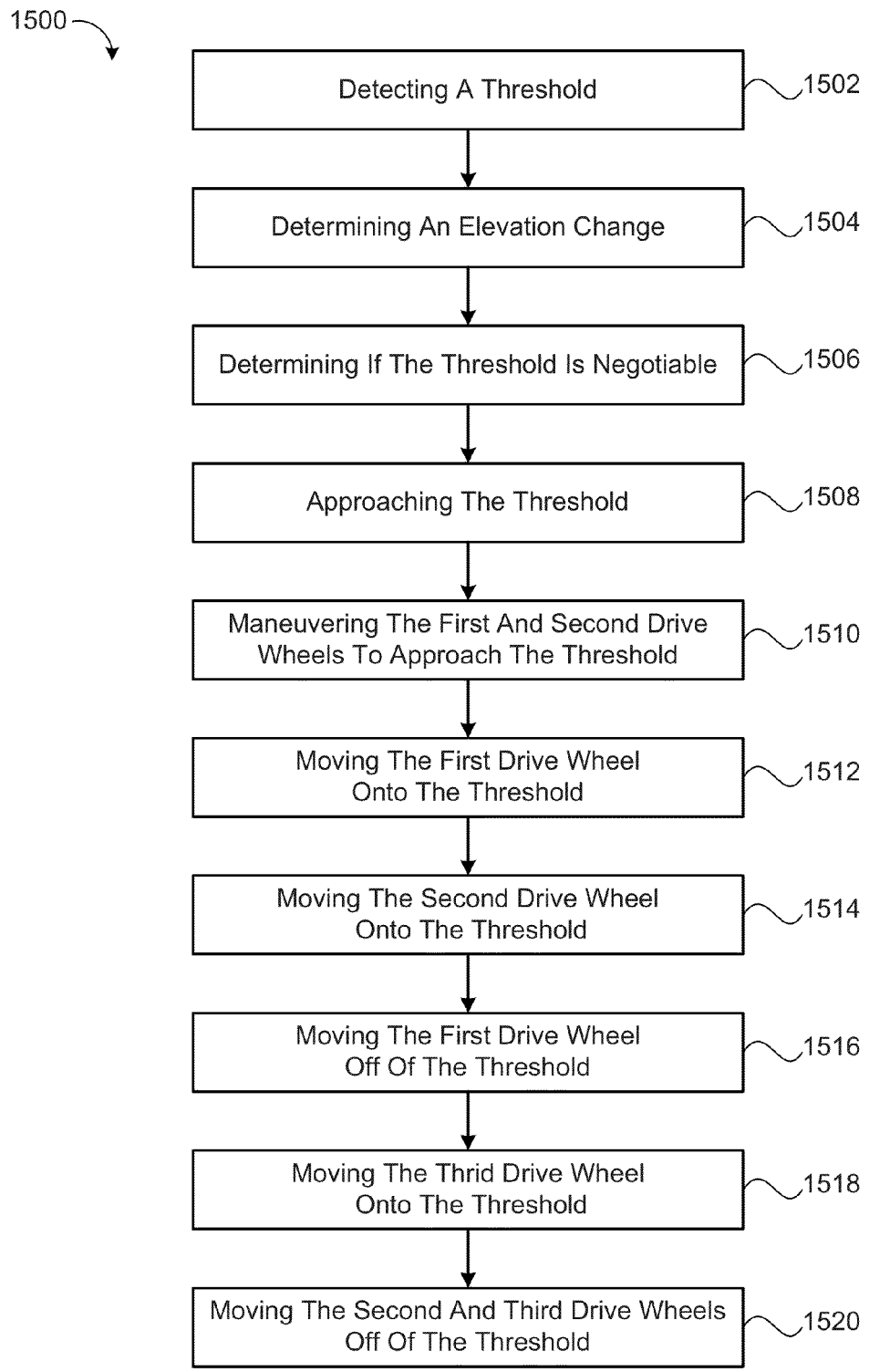
FIG. 15 is a schematic view of an exemplary arrangement of operations for maneuvering a mobile human interface robot to negotiate a threshold on the ground.
Figure 16:
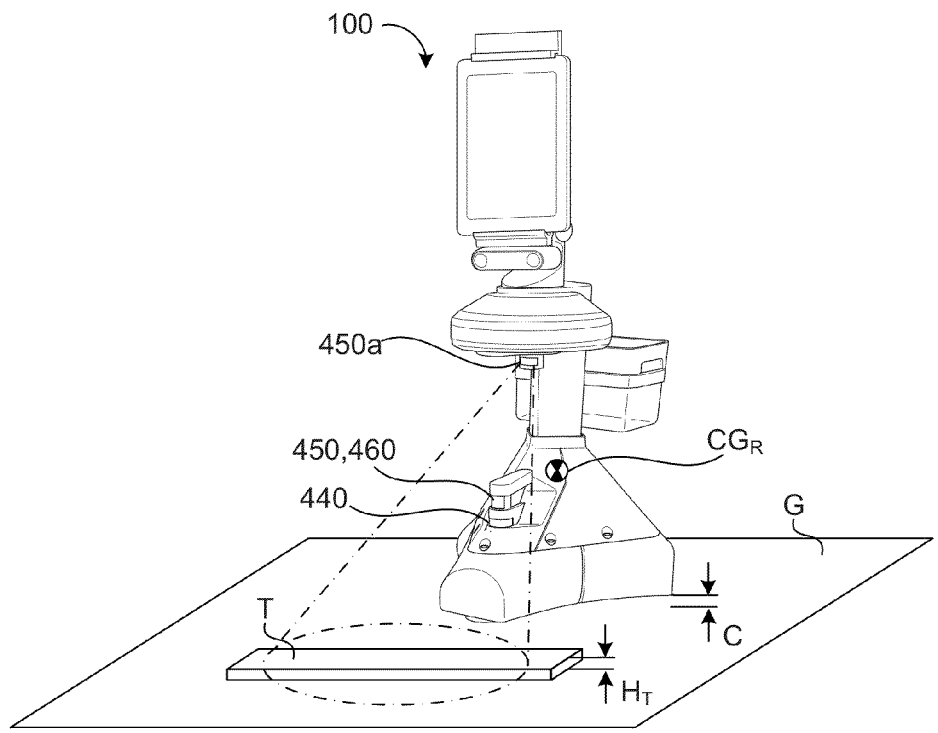
FIG. 16 is a perspective view of an exemplary mobile human interface robot having a downward pointed sensor for detecting obstacles proximate the robot.

Referring to FIGS. 15 and 16, while maneuvering about a work area, the robot 100 may encounter a threshold T on the floor, which may be any raised element or a small step from one level to another. In some examples, the threshold T can be a long, thin, usually fixed object on the floor, with its long dimension perpendicular to the direction of travel of the robot 100. Other arrangement are possible as well. For example, the robot 100 does not necessarily need to approach the threshold T with the long dimension of the threshold T perpendicular to the forward drive direction F of the robot 100. For example, the robot 100 may approach the threshold T in an oblique manner. Although the threshold T is shown as a straight object, it doesn't necessarily need to be straight, rectangular or of any particular shape.

Smooth threshold or level change traversal can be important to maximize robot stability. For example, the control system 510 may execute applications 520 and/or behaviors 600 that prevent or minimize the probability of allowing the robot 100 to run into a threshold T at particular angle with respect to the forward drive direction F or above a threshold velocity, either of which may cause the robot 100 to tilt forward suddenly, pop a wheelie (e.g., if the first drive wheel 210a hits an up-ramp straight on), or suddenly tip forward when dropping a drive wheel 210 off a threshold.

In some implementations, in order for the robot 100 to safely traverse the threshold T, the threshold T can be no taller than a clearance height C (e.g., greater than about 2 inches or 4 inches) between the bottom of the base 120 and the ground G to avoid robot high centering. Depending on a height $H_T$ of the threshold T and the overall center of gravity $CG_R$ of the robot 100, the control system 510 may choose to reduce a drive speed of the robot 100 as well as lower its overall center of gravity $CG_R$, if possible, while traversing the threshold T.

FIG. 15 provides an exemplary arrangement 1500 of operations, executable by one or more behaviors 600, such as a threshold traversal behavior 600c, for operating a mobile robot to negotiate a threshold T. With additional reference to FIGS. 16-17G, in some implementations, a method of negotiating a threshold T (e.g., moving onto either a higher or lower level with respect to a current ground level) includes detecting 1502 a threshold T (e.g., using the sensor system 400) and determining 1504 an elevation change (e.g., a positive or negative height $H_T$ of the threshold T) associated with the threshold T. The method further includes determining 1506 if the threshold T is negotiable by the robot 100 using the sensor system 400. For example, based on images captured by the 3-D image sensor 450a mounted on the torso 140 (or another 3-D image sensor 450 mounted elsewhere), the control system 510 can determine the positive or negative height $H_T$ of the threshold T. If the height $H_T$ of the threshold T is within a threshold height range (e.g., a height that will not cause high centering of the robot 100 and/or is not greater than the drive wheel radius R or a radius of a drive ball 258), the control system 510 can determine that it is safe to proceed with negotiating the threshold T. The robot 100 may continue to actively track the threshold T using the sensor system 400, for example, to store a location and dimensions of the threshold T, in case the threshold T enters a blind spot of the sensor system 400 (e.g., as when the threshold T is under the robot during traversal).

Figure 17A:
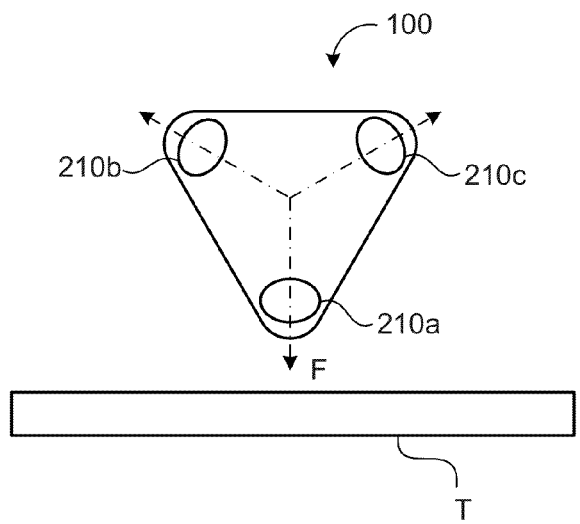
FIG. 17A is a schematic view of an exemplary mobile human interface robot approaching a threshold.

The method includes approaching 1508 the threshold T. Although FIG. 17A provides a schematic view of the robot 100 approaching the threshold T with the drive direction F perpendicular or substantially perpendicular to a longest dimension of the threshold T, the robot 100 may approach the threshold T at other angles as well.

Figure 17B:
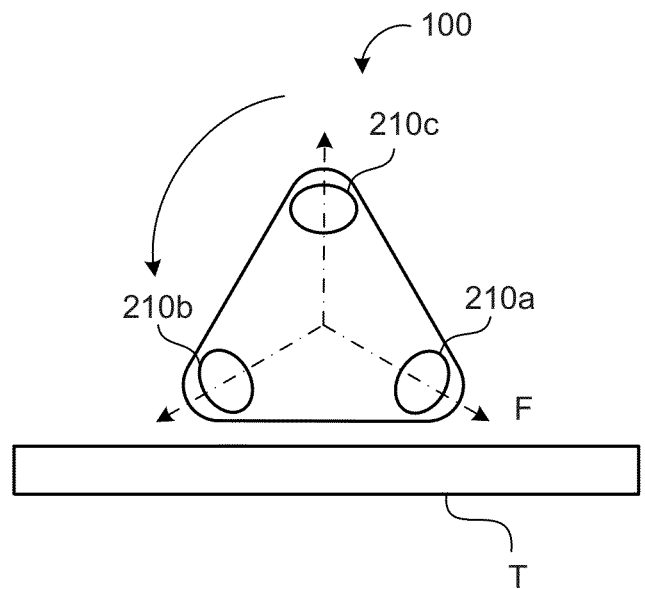
FIG. 17B is a schematic view of an exemplary mobile human interface robot moving first and second drive wheels toward a threshold.
Figure 17C:
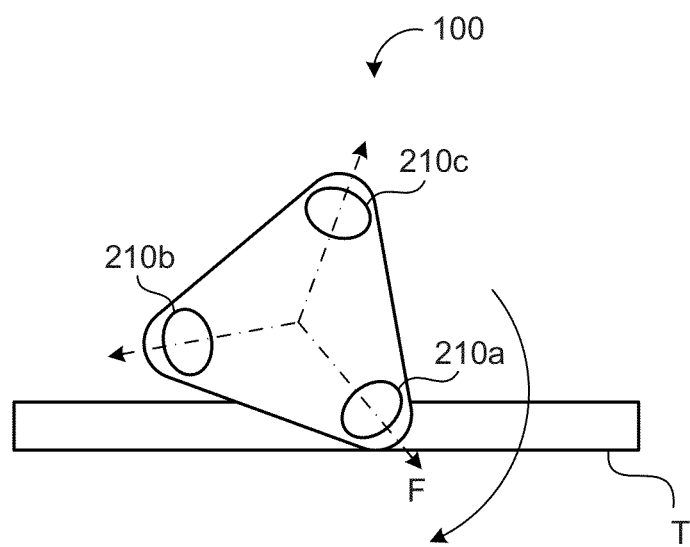
FIG. 17C is a schematic view of an exemplary mobile human interface robot moving a first drive wheel onto a threshold.
Figure 17D:
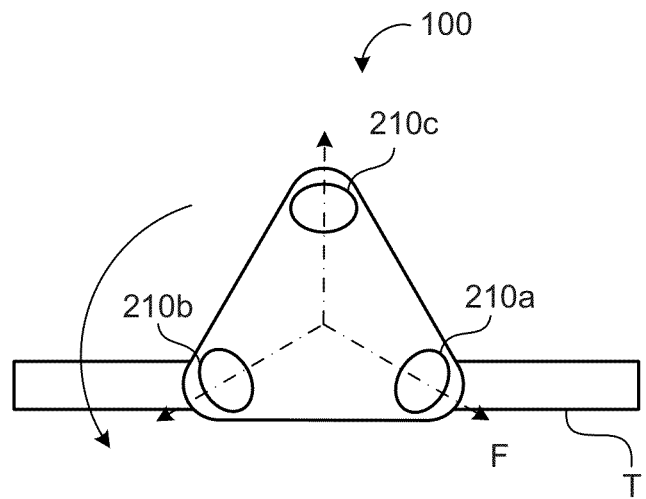
FIG. 17D is a schematic view of an exemplary mobile human interface robot moving a second drive wheel onto a threshold, while maintaining a first drive wheel on the threshold.
Figure 17E:
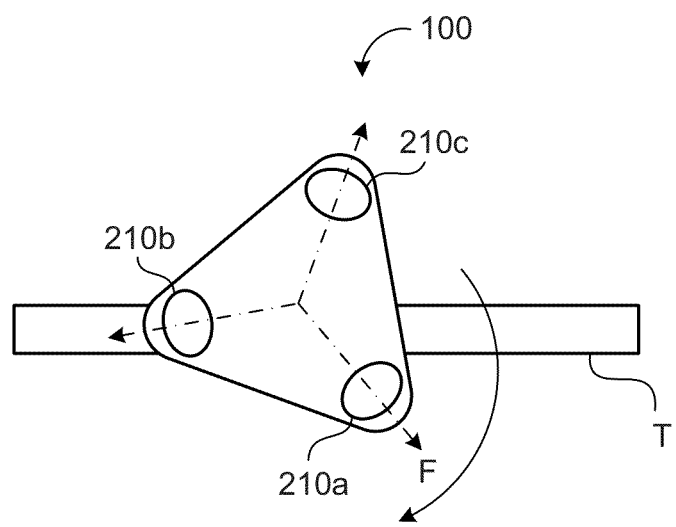
FIG. 17E is a schematic view of an exemplary mobile human interface robot moving a first drive wheel off of a threshold, while maintaining a second drive wheel on the threshold.
Figure 17F:
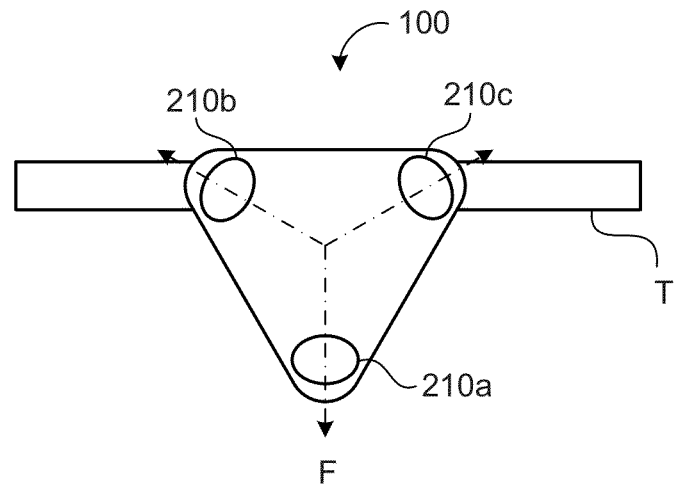
FIG. 17F is a schematic view of an exemplary mobile human interface robot moving a third drive wheel onto a threshold, while maintaining a second drive wheel on the threshold.
Figure 17G:
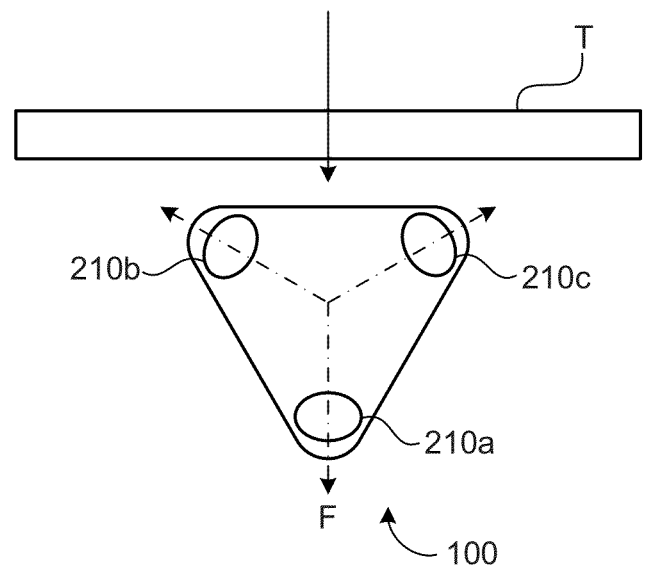
FIG. 17G is a schematic view of an exemplary mobile human interface robot moving second and third drive wheels off of a threshold.

To negotiate the threshold T, the method includes maneuvering 1510 the first and second drive wheels 210a, 210b or first and second drive balls 258a, 258b (e.g., rotating and/or translating the robot 100) to approach the threshold T equidistantly (i.e., so that the first and second drive wheels 510a, 510b (or drive balls 258a, 258b) are both the same distance or substantially the same distance from the threshold T), as shown in FIG. 17B. The method includes moving 1512 the first drive wheel 210a (or drive ball 258a) onto the threshold T (using the rollers 230 (of radius r), if necessary, as treads), as shown in FIG. 17C. For example, the robot 100 may pivot about the second drive wheel 210b (or drive ball 258b) to move the first drive wheel 210a (or drive ball 258a) onto the threshold T. While holding the first drive wheel 210a (or drive ball 258a) in place (i.e., as a pivot), the method includes moving or pivoting 1514 the second drive wheel 210b (or drive ball 258b) onto the threshold T, as shown in FIG. 17D. The first and second drive wheels 210a, 210b (or drive balls 258a, 258b) are now both on the threshold T. While holding the second drive wheel 210b (or drive ball 258b) in place (i.e., as a pivot), the method includes moving or pivoting 1516 the first drive wheel 210a (or drive ball 258a) off of the threshold T, as shown in FIG. 17E, and continuing 1518 to pivot the robot 100 about the second drive wheel 210b (or drive ball 258b) to move or drive the third drive wheel 210c (or drive ball 258c) onto the threshold T, as shown in FIG. 17F. The second and third drive wheels 210b, 210c (or drive balls 258b, 258c) are now both on the threshold T. The method includes continuing forward and driving away from the threshold T to move or drive 1520 both the second and third drive wheels 210b, 210c (or drive balls 258b, 258c) off the threshold T and resume maneuvering about the area on the ground G, as shown in FIG. 17G.

In some implementations, when the first and second drive wheels 210a, 210b (or drive balls 258a, 258b) are both on the threshold T, as shown in FIG. 17D, the method includes accelerating the first and second drive wheels 210a, 210b (or drive balls 258a, 258b) off the threshold T at the same time, pulling the third drive wheel 210c (or drive ball 258c) over the threshold T. Moreover, the robot 100 does not necessarily need to hold any drive wheel 210a-c (or drive balls 258a-c) as a fixed pivot on the threshold T while traversing the threshold T. Instead, the robot 100 can smoothly and continuously rotate and translate across the threshold T in the manner described and shown in FIGS. 17A-17G. Although the operations have been described with respect to a drive system 200 employing drive wheels 210 or drive balls 258, the operations may be executed for traversing a threshold using other types of three point drive systems (i.e., drive systems having three supporting drive elements).

Figure 18:
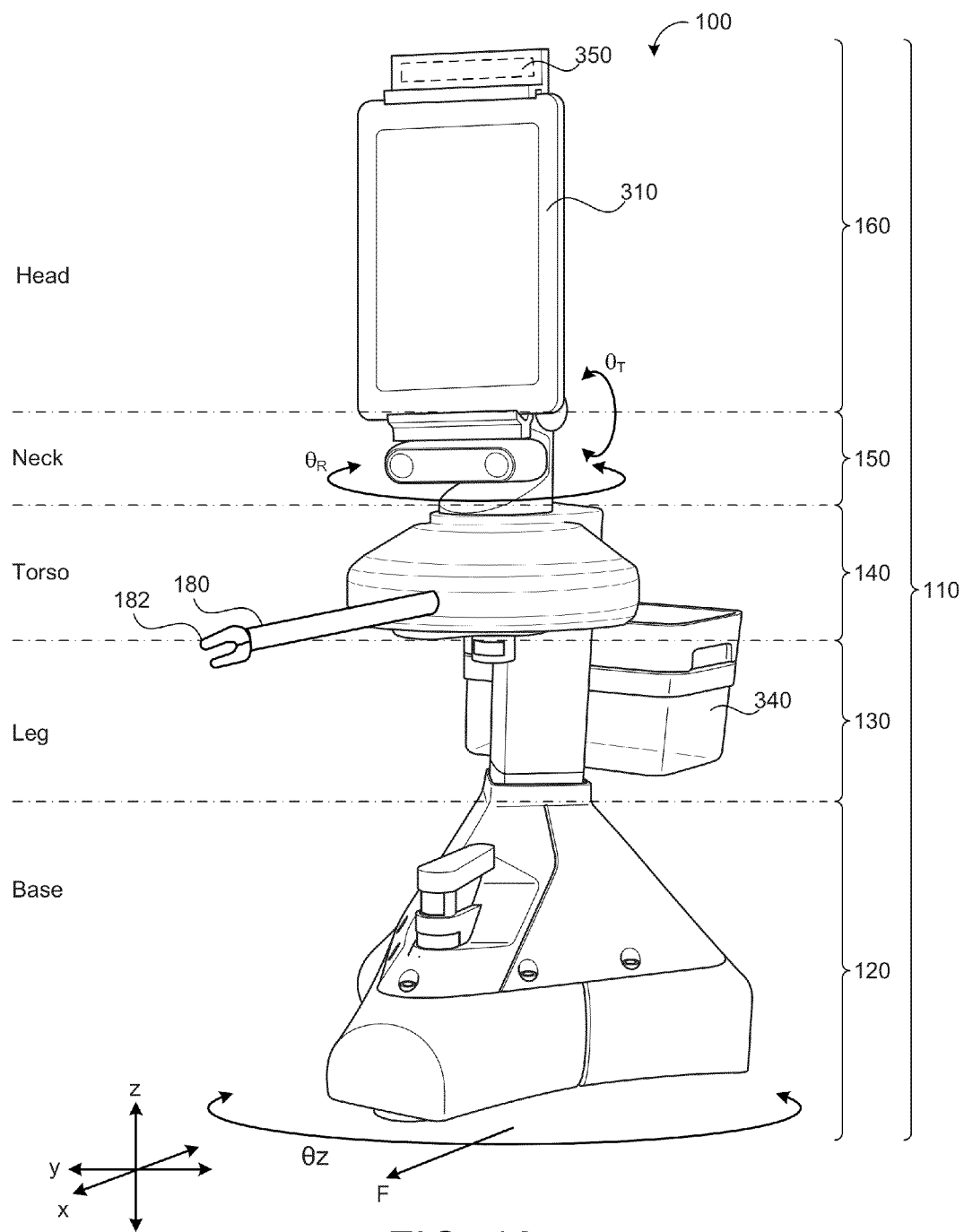
FIG. 18 is a perspective view of an exemplary mobile human interface robot with a manipulator mounted on a torso of the robot.

Referring to FIG. 18, in some implementations, the robot 100 includes a manipulator 180 (e.g., articulated or non-articulated) with an end effector 182. If the manipulator 180 is mounted on a fixed base (i.e., non-movable base), the manipulator 180 must include joints, any one of which having at least one if not more degrees of freedom, to allow movement of the end effector 182 with multiple degrees of freedom. Multiple joints with multiple motors, however, increases the cost and complexity of the manipulator 180.

Mounting the manipulator 180 to a mobility platform can ease this problem, since some degrees of freedom will be accounted for by the mobility of the platform itself. However, if the mobility paradigm is based on tracked or parallel wheeled approaches, the manipulator 180 will still require some joint articulation in order to able to move the end effector 182 in any direction while maintaining any orientation of the mobility platform. For example, if the manipulator 180 is pointing straight forward on a tracked vehicle and there is a desire to move the end effector 182 directly sideways while maintaining the orientation of the tracked vehicle, some articulation in the manipulator 180 is required without moving the tracked vehicle, as the tracked vehicle cannot move directly sideways (i.e., perpendicular to a drive direction of the tracks).

The holonomic drive system 200 in conjunction with the variable height of the torso 140 (via actuation of the leg 130) allows infinite degrees of freedom of movement of a non-articulated manipulator 180 disposed on the torso 140, so that the end effector 182 can be moved along any vector in true space, while maintaining any given robot orientation. Moreover, mounting the manipulator 180 on the head 160, which can be moved with the neck 150, provides additional movement and reach of the manipulator 180. The holonomic mobility of the base 120 provides x, y, and θz degrees of freedom. Vertical actuation of the leg 130 moves the torso 140 in the Z direction for a "z" degree of freedom. Therefore, the robot 100 can provide x, y, z, and θ movement of the end effector 182 without any articulation of the manipulator 180 itself.

In addition to the reduced cost and complexity of the manipulator 180, this approach greatly simplifies the computer processing necessary to control the end effector 182 in various directions. Resolved motion, or the ability to move an end effector 182 in a particular direction by controlling multiple joints with multiple degrees of freedom, requires complex logic and control algorithms. However, mounting the manipulator on the torso 140 of the disclosed robot 100 allows for independent control of each degree of freedom (x, y, z, and θz), rather than relying on controlling joints which impact more than one of those degrees, makes the math behind the resolved motion algorithms relatively easier. This further allows relatively lesser requirements for computer processor overhead, reducing cost and increasing reliability.

Traditionally, methods of opening and/or passing through a door or doorway for a robot include keeping a door open using a "chock" or using a multiple degree of freedom, large range of motion manipulator to continuously keep the door open (which requires custom corrugated motion) while the robot maneuvers through the doorway (e.g., using non-holonomic motion (y and θz only)). The holonomic drive system 200 allows the robot 100 to open a door (free hung or self-closing) and pass through the corresponding doorway.

Figure 19A:
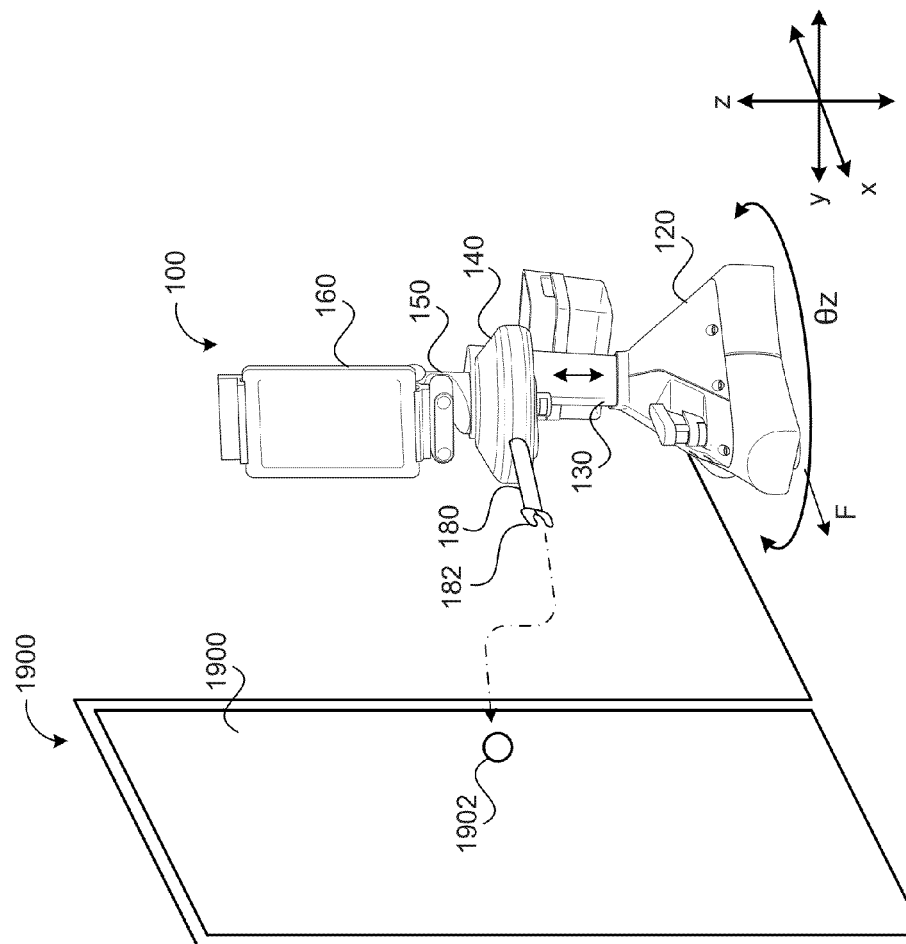
FIG. 19A is a perspective view of an exemplary mobile human interface robot with a manipulator approaching a doorknob.
Figure 19C:
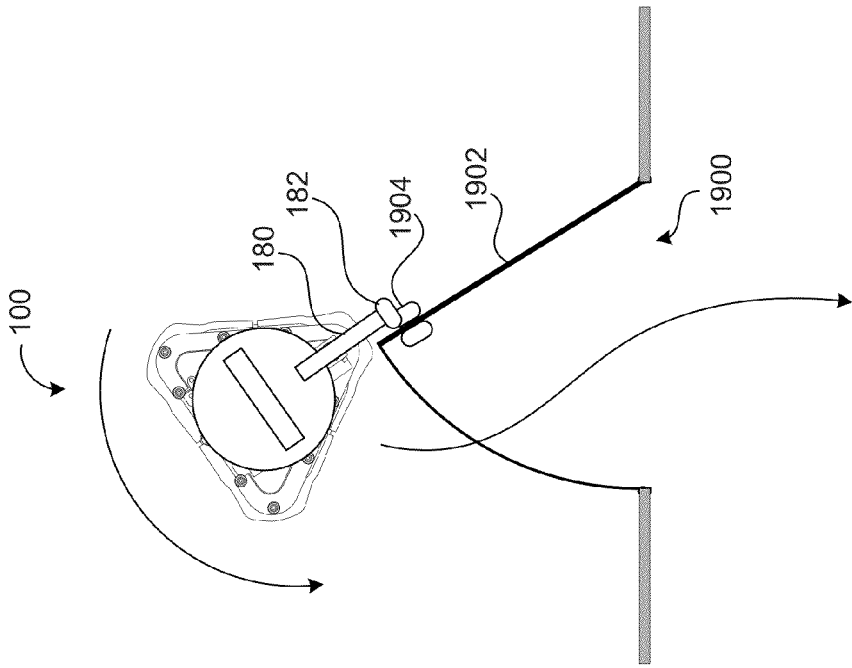
FIG. 19C is a perspective view of an exemplary mobile human interface robot with a manipulator releasing a doorknob and moving through a doorway of a corresponding open door.
Figure 19B:
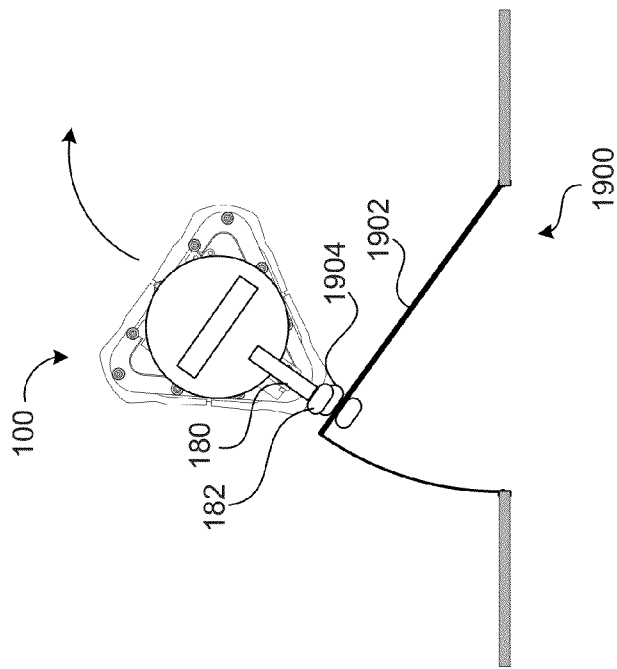
FIG. 19B is a perspective view of an exemplary mobile human interface robot with a manipulator grasping a doorknob and opening a corresponding door.

Referring to FIGS. 19A-19C, in some implementations, the behavioral system 410a includes a manipulator behavior 600d (e.g., a routine executable on a computing processor) that causes the control system 510 to issue commands to open a door 1902 and negotiate a corresponding doorway 1900. A method of opening a door 1902 includes maneuvering the robot 100 (e.g., rotating and/or translating) to orient and position the end effector 182 of the manipulator 180 so that the end effector 182 can manipulate a door knob 1904 of the door 1902. The end effector 182 may be configured to open and close to grasp an object and rotate (e.g., about an axis of the manipulator 180, such as twisting). The method includes grasping the door knob 1904 with the end effector 182 and twisting the door knob 1904 (or raising or lowering the torso 140 to toggle/actuate the lever 1904), so as to disengage the door knob 1904. The method further includes maneuvering the robot 100 to pull/push the door 1902 open and then maneuver the robot holonomically through the corresponding doorway 1900. The robot 100 can grasp the door knob 1904 on the opposite side of the door and then pull/push the door 1902 closed.

For opening/closing a relatively heavy door 1902 with a relatively small, lightweight robot 100, after disengaging the door knob 1904 (e.g., by turning the door knob or toggling the lever), maneuvering the robot 100 as close as possible to the door knob 1904 while decreasing an extension length of the manipulator 180 to minimize a distance between door knob 1904 and the base 120. The method further includes pushing up on the door knob 1904 (e.g., by lifting the torso 140, as by extending the leg 130) to increase the normal force on the drive wheels 210*a-c*, thereby increasing traction.

For negotiating past a self-closing door 1902 (from either direction), once the door 1902 is open, robot 100 is already close to the door 1902 and can rotate and/or traverse the base 120 to act as a chock. In some examples, the manipulator 180 includes a passive or active pan degree of freedom (DOF) to maintain contact between the end effector 182 and the door knob 1904. Once through the doorway 1900, the method includes releasing the end effector 182 and retracting the manipulator 180 (e.g., by using the x, y, and θz DOF's of the base 120) to smoothly pass through the doorway 1900 while maintaining continuous contact with the door 1902 and the robot base 120. No sliding contact motion against the door 1902 is required, thus avoiding scratching the robot 100 or the door 1902 and avoiding any friction therebetween, which would increase robot effort. Since the robot 100, in some implementations, maintains all associated components above the base 120 within a vertical volume defined by the base 120, the only contact with the door 1902 is with the base 120. Since the contact with the door 1902 is close to the ground, traction and stability of the robot 100 can be maximized.

Figure 19D:
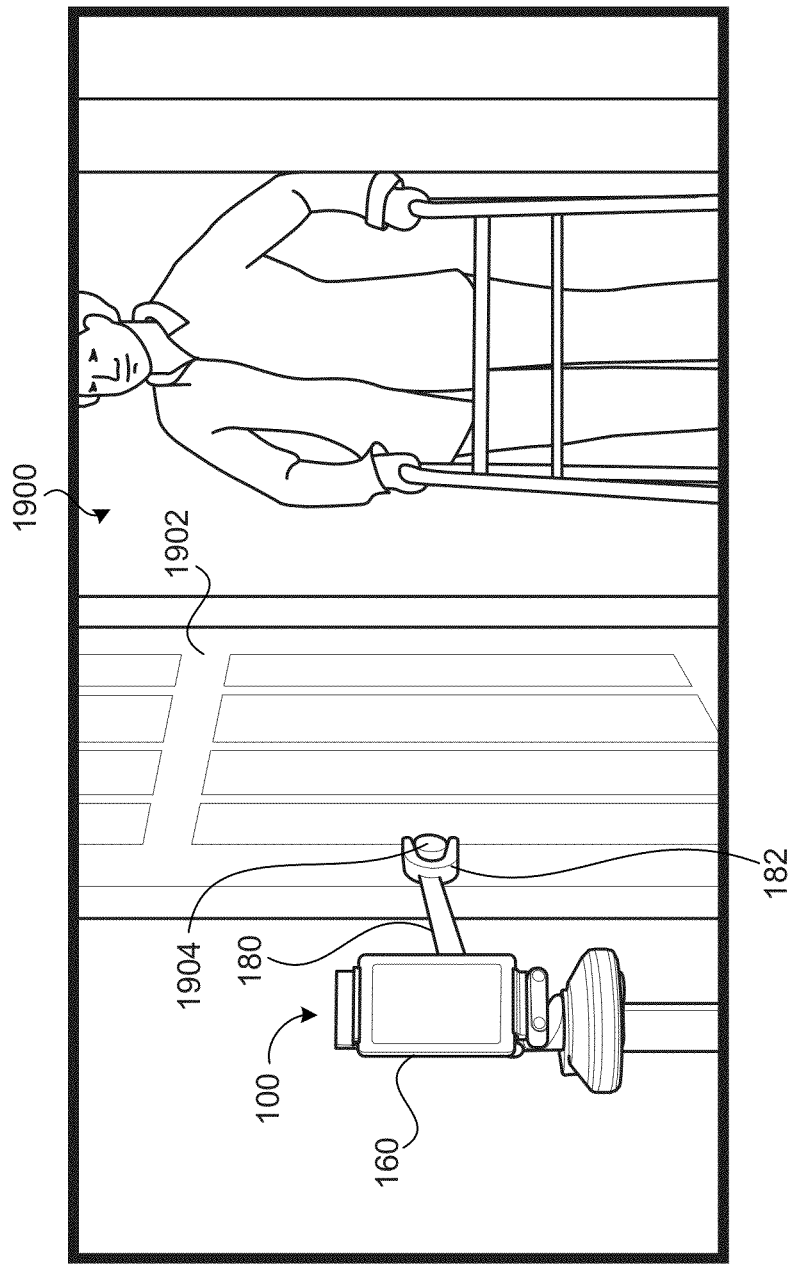
FIG. 19D is a perspective view of an exemplary mobile human interface robot with a manipulator holding a door open for a person.

In the example shown in FIG. 19D, the robot 100 includes an extendable manipulator 180 attached to the head 160. The robot 100 can maneuver (e.g., holonomically) while grasping and disengaging the door knob 1904, pushing the corresponding door 1902 open, and then maneuvering out of the doorway 1900 to aside to allow a person to pass therethrough while holding the door 1902 open.

Referring to FIG. 20, in some implementations, the robot 100 includes a robot body 110 having a base 120, at least one leg 130 extending upwardly from the base 120, and a torso 140 supported by the at least one leg 130. The base 120 may support at least portions of the drive system 200. The robot body 110 also includes a neck 150 supported by the torso 140. The neck 150 supports an arm 190 (which may be articulated), which supports a head 160. The head 160 can support at least a portion of the interfacing module 300. The arm 190 allows the robot 100 to move the head 160 into elevated positions above and away from the neck 150. In the example shown, the robot 100 can move the head 160 over a conveyor belt so that the robot 100 can view items on the conveyor belt using a camera 320 or a 3-D image sensor 450 on the head 160. During a videoconferencing session with a remote user, the robot 100 and a local user adjacent the robot 100, the remote user and/or the local user can direct the robot 100 to achieve a pose that will allow the robot 100 to sense and/or view an object of interest. Moreover, the control system 510 may limit movement of the head 160 away from the neck 150 so as to maintain stability of the robot 100. In some examples, the control system 510 maintains the head 160 within a perimeter of the base 120, so as not to move the overall center of gravity $CG_R$ beyond the perimeter of the base 120.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a mobile robot to traverse a threshold, the method comprising:
    detecting a threshold proximate the robot, the robot comprising a drive system having first, second, and third drive elements;
    moving the first drive element onto the threshold from a first side;
    moving the second drive element onto the threshold to place both the first and second drive elements on the threshold;
    moving the first drive element off a second side of the threshold, opposite to the first side of the threshold;
    moving the third drive element onto the threshold, placing both the second and third drive elements on the threshold; and
    moving both the second and third drive elements off the second side of the threshold.

2. The method of claim 1, further comprising determining an elevation change associated with the threshold and continuing to traverse the threshold when the elevation change is within a threshold elevation range.

3. The method of claim 2, wherein the threshold elevation range prevents high centering of the robot.

4. The method of claim 2, wherein the threshold elevation range is less than a radius of the drive elements.

5. The method of claim 1, further comprising maneuvering the first and second drive elements to approach a first side of the threshold at least substantially equidistantly before moving the first drive element onto the threshold.

6. The method of claim 1, further comprising pivoting about the second drive element to move the first drive element onto the threshold.

7. The method of claim 1, further comprising holding the first drive element stationary while moving the second drive element onto the threshold to place both the first and second drive elements on the threshold.

8. The method of claim 1, further comprising holding the second drive element stationary while moving the first drive element off the second side of the threshold.

9. The method of claim 1, further comprising continuing to pivot the robot about the second drive element after moving the first drive element off the second side of the threshold to move the third drive element onto the threshold.

10. The method of claim 1, further comprising moving both the second and third drive elements off the second side of the threshold at substantially the same time.

11. The method of claim 1, further comprising moving the first and second drive elements off the threshold at the same time, pulling the third drive element over the threshold.

12. The method of claim 1, wherein the drive system comprises first, second, and third drive wheels, each drive wheel spaced about a vertical center axis and having a drive direction perpendicular to a radial axis with respect to the vertical center axis.

13. The method of claim 1, wherein the drive system comprises first, second, and third holonomic drive balls.

14. The method of claim 1, wherein the drive system comprises first, second, and third drive ball assemblies, each drive ball assembly comprising:
a drive ball;
a transmission roller in continuous contact with the respective drive ball, the transmission roller actively rotating about a first axis and passively rotating about a second axis; and
a drive mechanism rotating the transmission roller to rotate the drive ball.

15. A mobile robot comprising:
a drive system having first, second, and third drive elements; and
a controller in communication with the drive system, upon detecting a threshold proximate the robot, the controller issuing commands to the drive system to:
move the first drive element onto the threshold from a first side;
move the second drive element onto the threshold to place both the first and second drive elements on the threshold;
move the first drive element off a second side of the threshold, opposite to the first side of the threshold;
move the third drive element onto the threshold, placing both the second and third drive elements on the threshold; and
move both the second and third drive elements off the second side of the threshold.

16. The mobile robot of claim 15, further comprising:
a base supporting the drive system;
a leg extending upward from the base and having a variable height;
a torso supported by the leg, the torso defining a shoulder having a bottom surface overhanging the base; and
a torso imaging sensor disposed on the bottom surface of the torso and pointing downward along a forward drive direction of the drive system, the torso imaging sensor capturing three-dimensional images of a scene about the robot.

17. The mobile robot of claim 16, wherein the torso imaging sensor is recessed within a body of the torso while maintaining its downward field of view.

18. The mobile robot of claim 15, further comprising a volumetric point cloud imaging device in communication with the controller and capable of obtaining a point cloud from a volume of space adjacent the robot.

19. The mobile robot of claim 18, wherein the volumetric point cloud imaging device scans side-to-side with respect to the forward drive direction to increase a lateral field of view of the volumetric point cloud imaging device.

20. The mobile robot of claim 18, wherein the volumetric point cloud imaging device is positioned at a height of greater than 2 feet above the ground and directed to be capable of obtaining a point cloud from a volume of space that includes a floor plane in a direction of movement of the robot.

21. The mobile robot of claim 15, further comprising a laser scanner in communication with the controller and having a field of view centered on the forward drive direction and substantially parallel to a work surface supporting the robot.

22. The mobile robot of claim 15, wherein the controller determines an elevation change associated with the threshold based on a sensor signal of at least one sensor in communication with the controller and issues a command to the drive system to continue to traverse the threshold when the elevation change is within a threshold elevation range.

23. The mobile robot of claim 22, wherein the threshold elevation range prevents high centering of the robot.

24. The mobile robot of claim 22, wherein the threshold elevation range is less than a radius of the drive elements.

25. The mobile robot of claim 15, wherein the controller issues a command to the drive system to maneuver the first and second drive elements to approach a first side of the threshold at least substantially equidistantly before moving the first drive element onto the threshold.

26. The mobile robot of claim 15, wherein the controller issues a command to the drive system to pivot the robot about the second drive element to move the first drive element onto the threshold.

27. The mobile robot of claim 15, wherein the controller issues a command to the drive system to hold the first drive element stationary while moving the second drive element onto the threshold to place both the first and second drive elements on the threshold.

28. The mobile robot of claim 15, wherein the controller issues a command to the drive system to hold the second drive element stationary while moving the first drive element off the second side of the threshold.

29. The mobile robot of claim 15, wherein the controller issues a command to the drive system to continue to pivot the robot about the second drive element after moving the first drive element off the second side of the threshold to move the third drive element onto the threshold.

30. The mobile robot of claim 15, wherein the controller issues a command to the drive system to move both the second and third drive elements off the second side of the threshold at substantially the same time.

31. The mobile robot of claim 15, wherein the controller issues a command to the drive system to move the first and second drive elements off the threshold at the same time, pulling the third drive element over the threshold.

32. The mobile robot of claim 15, wherein the drive system comprises first, second, and third drive wheels, each drive wheel spaced about a vertical center axis and having a drive direction perpendicular to a radial axis with respect to the vertical center axis.

33. The mobile robot of claim 15, wherein the drive system comprises first, second, and third drive balls, each drive ball spaced about a vertical center axis.

34. The mobile robot of claim 15, wherein the holonomic drive system comprises first, second, and third drive ball assemblies, each drive ball assembly comprising:

a drive ball;

a transmission roller in continuous contact with the respective drive ball, the transmission roller actively rotating about a first axis and passively rotating about a second axis; and a drive mechanism rotating the transmission roller to rotate the drive ball.

* * * * *